United States Patent
Hunn et al.

(10) Patent No.: US 11,836,817 B2
(45) Date of Patent: Dec. 5, 2023

(54) SYSTEM FOR AN ELECTRONIC DOCUMENT WITH STATE VARIABLE INTEGRATION TO EXTERNAL COMPUTING RESOURCES

(71) Applicant: DocuSign, Inc., San Francisco, CA (US)

(72) Inventors: Peter Geoffrey Lerato Hunn, Dallas, TX (US); Houman Brian Shadab, New York, NY (US)

(73) Assignee: DocuSign, Inc., San Francisco, CA (US)

( * ) Notice: Subject to any disclaimer, the term of this patent is extended or adjusted under 35 U.S.C. 154(b) by 218 days.

(21) Appl. No.: 17/105,147

(22) Filed: Nov. 25, 2020

(65) Prior Publication Data

US 2021/0192653 A1    Jun. 24, 2021

Related U.S. Application Data

(63) Continuation of application No. 15/476,791, filed on Mar. 31, 2017, now abandoned.
(Continued)

(51) Int. Cl.
*G06Q 50/18*    (2012.01)
*G06Q 10/10*    (2023.01)
(Continued)

(52) U.S. Cl.
CPC ............ *G06Q 50/18* (2013.01); *G06F 40/12* (2020.01); *G06F 40/166* (2020.01); *G06Q 10/10* (2013.01);
(Continued)

(58) Field of Classification Search
USPC .......................................................... 705/80
See application file for complete search history.

(56) References Cited

U.S. PATENT DOCUMENTS 7,433,838 B2    10/2008    Welsh et al.
7,756,772 B1    7/2010    Konopnicki et al.
(Continued)

FOREIGN PATENT DOCUMENTS

CN    1625743 A    6/2005
CN    102855304 A    1/2013
(Continued)

OTHER PUBLICATIONS

P. R. Krishna and K. Karlapalem, "Electronic Contracts," in IEEE Internet Computing, vol. 12, No. 4, pp. 60-68, Jul.-Aug. 2008, doi: 10.1109/MIC.2008.77. (Year: 2008).*
(Continued)

*Primary Examiner* — Michael Young
(74) *Attorney, Agent, or Firm* — KDW FIRM PLLC

(57) ABSTRACT

A system for an electronic document that includes one or more electronic components comprising: natural language content; and a programmable component that comprises computer executable instructions that define: one or more state objects that indicate compliance with the natural language content, wherein a state object comprises a state variable; and logic that programmatically change, based on an application programming interface input, one or more state variables indicating a compliance event effect of the programmable component; an indication of one or more application programming inputs configured to cause execution, based on an input message from an external computing resource, of at least one programmable component of the one or more electronic component; and an indication of one or more contract outputs configured to indicate a value of at least one state variable to an external computing resource.

20 Claims, 30 Drawing Sheets

Related U.S. Application Data

(60) Provisional application No. 62/400,599, filed on Sep. 27, 2016, provisional application No. 62/316,442, filed on Mar. 31, 2016.

(51) Int. Cl.
*G06F 40/166* (2020.01)
*G06F 40/12* (2020.01)
*H04L 9/06* (2006.01)
*H04L 9/00* (2022.01)

(52) U.S. Cl.
CPC ......... *G06Q 50/188* (2013.01); *H04L 9/0643* (2013.01); *H04L 9/50* (2022.05)

(56) References Cited

U.S. PATENT DOCUMENTS

| | | |
|---|---|---|
| 9,483,455 B1 | 11/2016 | Bastide et al. |
| 2002/0091539 A1 | 7/2002 | Yin et al. |
| 2007/0250337 A1 | 10/2007 | Karamchedu et al. |
| 2009/0234662 A1 | 9/2009 | Stieber et al. |
| 2010/0063892 A1* | 3/2010 | Keronen ............. G06Q 30/04 705/26.1 |
| 2010/0268528 A1 | 10/2010 | Raskina et al. |
| 2011/0307278 A1 | 12/2011 | Clarke et al. |
| 2014/0164255 A1 | 6/2014 | Daly et al. |
| 2015/0379510 A1* | 12/2015 | Smith ............. G06Q 20/3829 705/71 |
| 2016/0027135 A1* | 1/2016 | Eicks ................ G06Q 10/00 705/311 |
| 2016/0028552 A1 | 1/2016 | Spanos et al. |
| 2016/0117471 A1 | 4/2016 | Belt et al. |
| 2016/0283941 A1 | 9/2016 | Andrade |
| 2017/0103468 A1 | 4/2017 | Orsini et al. |
| 2017/0236120 A1 | 8/2017 | Herlihy et al. |
| 2017/0331896 A1 | 11/2017 | Holloway et al. |

FOREIGN PATENT DOCUMENTS

| | | | | |
|---|---|---|---|---|
| CN | 104090863 A | 10/2014 | | |
| WO | WO-2008028234 A1 * | 3/2008 | ........... | G06Q 20/322 |

OTHER PUBLICATIONS

Ron White, How Computers Work, Oct. 15, 15 03, Que Publishing, 7th Ed, p. 4 (Year: 2003), 23 pages.
Australian Office Action, IP Australia Patent Application No. 2020203160, dated Feb. 11, 2021, 5 pages.
Extended European Search Report, European Patent Office Application No. EP17776871, dated Jul. 18, 2019, 8 pages.
Grigg, I., "The Ricardian Contract", Proceedings. First IEEE International Workshop on Electronic Contracting, 2004, 10 pages.
International Search Report and Written Opinion, Patent Cooperation Treaty Application No. PCT/US2017/025598, dated Jul. 3, 2017, 14 pages.
United States Office Action, U.S. Appl. No. 15/476,791, dated Jun. 25, 2020, 68 pages.
United States Office Action, U.S. Appl. No. 15/476,791, dated Sep. 16, 2019, 44 pages.
First Office Action and Search Report, China National Intellectual Property Administration Patent Application No. CN 201780033466.3, dated Dec. 2, 2022, 10 pages.
Truong, HL. et al. Data contracts for cloud-based data marketplaces International Journal of Computational Science and Engineering. Jan. 1, 2012;7(4):280-95.

* cited by examiner

Providing a contract management platform S100

Constructing a data-driven contract with a set of programmable clauses S200

Executing the data-driven contract S300

FIGURE 7A

SYSTEM FOR AN ELECTRONIC DOCUMENT WITH STATE VARIABLE INTEGRATION TO EXTERNAL COMPUTING RESOURCES

CROSS-REFERENCE TO RELATED APPLICATIONS

This Application is a continuation application of U.S. patent application Ser. No. 15/476,791, filed on 31 Mar. 2017, which claims the benefit of U.S. Provisional Application No. 62/316,442, filed on 31 Mar. 2016, and U.S. Provisional Application No. 62/400,599, filed on 27 Sep. 2016, which are all incorporated in their entireties by this reference.

TECHNICAL FIELD

This invention relates generally to the field of digital contract management, and more specifically to a new and useful system and method for creating data-driven contracts with programmable clauses.

BACKGROUND

A contract is a legally enforceable agreement to exchange value such as goods, services, or property. Contracts are a fundamental tool for coordinating economic activity. Four of the basic stages of contracting are: formation, performance, renegotiation and amendment, and termination. Written contracts are typically paper-based or computer-based digital representations of paper-based contracts often filed and stored in PDF format. Contracts are made of up numerous distinct clauses that establish basic information and contain the parties' rights and obligations. Clauses may be made up of a single sentence or a paragraph, and are grouped together topically, and often hierarchically, by sections. Contracts are typically structured so that clauses make intra-document references to one another, either in the same section or across different sections. Modern contracts are typically made up of the following clauses and sections: a preamble, identification of the parties, recitals, definitions, the exchange of value and the parties' other obligations (including actions the parties should and should not undertake), representations, warranties, conditions, and several boilerplate clauses such as choice of law, assignment, and entire agreement (merger) clauses. Other clauses may also be used. Contract documents often incorporate by reference into the agreement other documents, laws, and standards.

Contractual clauses are currently static expressions. Although the external environment and the parties' conduct pursuant to the contract may change over time, the terms and conditions of the clauses do not change after the contract is formed unless there is a legal amendment (modification). Contract amendment may require the assent of both parties; but it may be unilateral. Accordingly, under existing technology and practices the contract serves as a static documentary record of the agreement as of the date of execution.

Legal contracts are also typically unable to utilize data, especially: (a) from edge computing devices, databases, the 'Internet of Things', APIs, blockchains/distributed ledgers; and (b) in real-time. The computerization of commerce and commercial activities means that data is increasingly available and used in all aspects of business. This is likely to increase significantly with the advent and maturation of the 'Internet of Things', particularly in industry, which provides real-time or near real-time data as to the state of commercial activities. Legal contracts that are stored on paper are isolated/siloed from data as they have no native means of connecting to any form of electronically stored information or computation. Contracts that are written and stored in electronic form are similarly unable to utilize data; despite being in electronic form, such contracts are nonetheless just as static as paper-based contracts as they have no electronic means of responding to, acting upon, receiving, or sending data after they are formed.

A variety of electronic systems may be used to assemble, manage, and analyze legal contracts. Electronic document assembly programs provide standardized templates that users complete with a contract's specific terms to generate an executable agreement. Software also analyzes contracts terms and conditions to ensure consistency and whether an agreement contains certain contract rights or fulfills specific business objectives. Contract Lifecycle Management (CLM) or contract management software creates a centralized repository of documents that captures/extracts data, often from paper-based documents, relevant to the user's obligations under each legal contract. That data used to monitor the performance of obligations, manage business milestones, and provide some basis for business analytics. CLM software creates a system and layer of software and data separate from the actual contracts the CLM system assists in managing. No aspect of CLM software, by itself, has the ability to constitute or amend legally enforceable contract rights, obligations, or parameters—distinct from the underlying contracts that are managed. Management is largely performed manually by users of the CLM software.

Various initiatives are also underway to automate and execute aspects of contract performance, often by using distributed ledger implementations, sometimes referred to as "smart contracts". Distributed ledgers (also known as "shared ledgers", "replicated ledgers" or, in specific implementations, "blockchains"), are a type of database architecture where a single record of data is spread throughout and viewable by numerous entities, and typically updated according to a robust consensus protocol/algorithm. Despite many of these more recent developments, legal contracts are still executed and managed in their static states (with the same terms and conditions as they are initially formed). In addition, despite the use of the term 'contract', "smart contracts" are often simply coded scripts (often with state) that execute and perform processes or transactions on a blockchain or distributed ledger and are divorced from any legally enforceable contract and the contractual rights and obligations of any party. The term 'contract' in the foregoing sense may therefore be somewhat of a misnomer.

Thus, there is a need in the digital contract management field to create a new and useful system and method for data-driven legal contracts that can use and respond to data. This invention provides such a new and useful system and method.

BRIEF DESCRIPTION OF THE FIGURES

FIGS. 7A-7E are flowchart representations of a method of a preferred embodiment and variations;

DESCRIPTION OF THE EMBODIMENTS

Figure 1A:
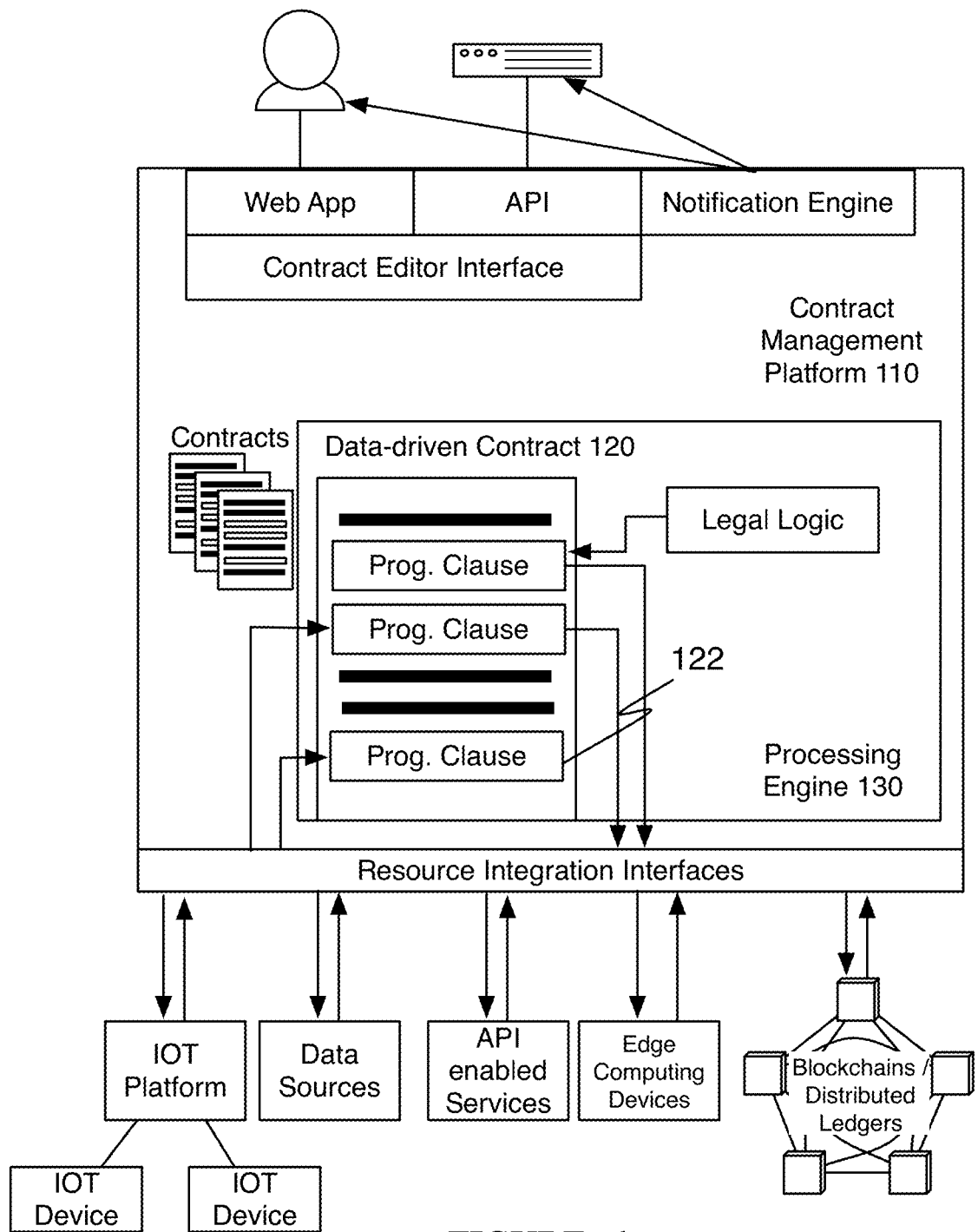
FIGS. 1A and 1B are schematic representations of variations of a system of a preferred embodiment.

The following description of the embodiments of the invention is not intended to limit the invention to these embodiments but rather to enable a person skilled in the art to make and use this invention.

1. Components

The system and method for creating, executing, and managing data-driven contracts with programmable clauses of preferred embodiments may be comprised of a number of components, including (but not limited to): programmable clauses; complex event processing engine ('CEP Engine'); event stream versioning system; state transitioning and storage system; and a contract management platform.

The aforementioned components may be used interchangeably in any suitable combination. Not all components may be used in a given implementation or embodiment. Additional components may also be used.

'Programmable clauses' are components of a data-driven contract that at least partially define dynamic operations of a data-driven contract and additionally may service as legal contractual clauses. Programmable clauses may possess several core attributes, including but not limited to the following.

Firstly, programmable clauses may potentially be formed, expressed, programmed, written, or otherwise configured for using various programming paradigms or languages. Potential programming paradigm or language embodiments can include (but are not limited to) object-oriented languages, metaprogramming, functional languages, procedural languages, or declarative languages; either using domain specific languages or high-level (general) languages (including extension of a high-level language). Programmable clauses written in a declarative language may use the defeasible reasoning process of a rules engine to determine the steps taken to perform, execute, or implement contract actions and operations. A programmable clause is predominantly formed of programmable logic, preferably in an object-oriented paradigm (e.g., or other options such as metaprogramming and the like). Programmable clauses also interact/integrate with IoT platforms, internet-connected (or other network connected) devices (e.g., IoT devices) APIs, external systems, applications, protocols, edge computing devices, CEP data/engines, data and other resources to drive actions under the contract and/or on external systems.

Secondly, programmable clauses may additionally interface with distributed ledgers in various ways. They may interact with blockchains/distributed ledgers by embedding or otherwise integrating code of a BDL script (e.g., "smart contract" code) and operation of the BDL script with operations of a programmable clause, by calling BDL scripts that exists on a blockchain/distributed ledger, by compiling programmable logic to a blockchain/distributed ledger (e.g. to virtual machine bytecode), or by other suitable applications of distributed ledgers/blockchains (as well as other similar databases and architectures). In addition, programmable clauses may have a related rules engine run on a blockchain/distributed ledger, or have the conclusions of a rules engine relating to the actions or operations of the clauses stored on a blockchain/distributed ledger. Alternatively, the state of programmable clauses may be updated on a peer-to-peer basis solely between the parties with only specific transactions recorded on a distributed ledger and more specifically a blockchain. Herein blockchain/distributed ledger (BDL) is used herein to refer to distributed ledgers and/or more specific consensus-based blockchain solutions, wherein any suitable variation of such systems may be used. References to BDL systems, platforms, integrations, transactions and the like could be distributed ledger variations or blockchain variations. Centralized BDL implementations, cryptographic databases, and/or other suitable systems with BDL-like features may be additionally or alternatively be used in a similar manner as the BDL components.

Thirdly, programmable clauses can be dynamic in nature; meaning that a programmable clause may change or update its state, or the state of another programmable clause and/or data-driven contract, in response to data, changes in other clauses, and/or other data-driven contracts. For example, a price clause may change its state in response to changes in temperature/humidity from edge computing devices if the price of a good is contingent upon weather conditions (e.g. a crop). Another such example may involve credits/discounts being issued if performance requirements are not met (e.g. service credits in a Service Level Agreement). Contract state updates may take place continuously and in real-time or near real-time. The state of the logic may be changed/updated or data may be stored that is used by the logic of clause(s) to affect or otherwise reflect a change in state. Other appropriate methods may also be used. The 'CEP Engine' may be integrated with programmable clauses to enable complex events to be inputs to programmable clauses and data-driven contracts.

Figure 18:
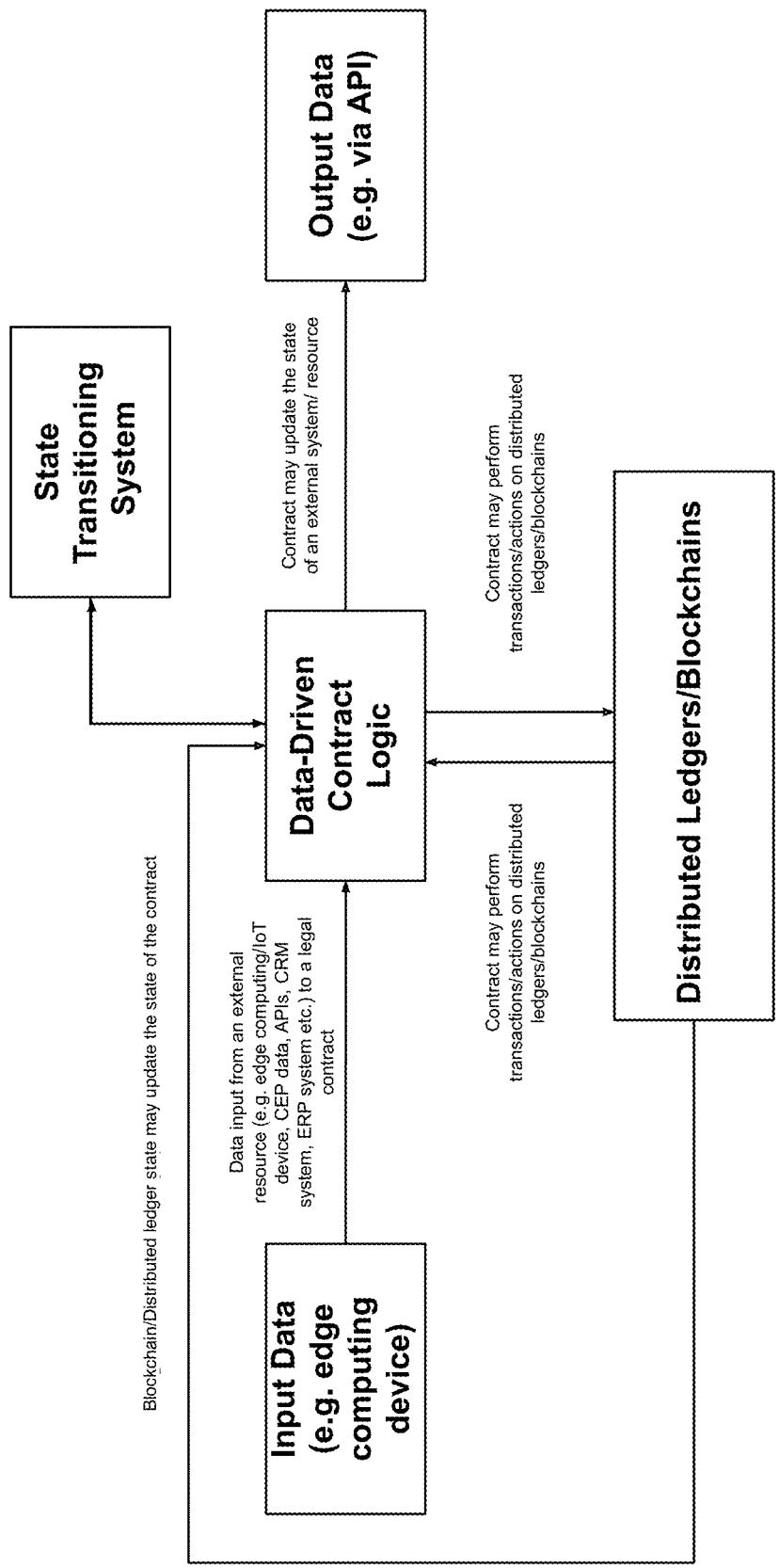
FIG. 18 is a schematic representation of illustrating the 'self-managing' functionalities of data-driven contract.

Fourthly, programmable clauses give contracts a substantially 'self-managing' or at least partially 'self-managing' quality. This can be achieved at least in part by: (a) the 'dynamic' functionality; and (b) having both input and output to external and/or internal resources. For example, data input to a programmable clause from an edge computing device or API may update the contractual logic (or otherwise store data relating to a change) such as the grant of a discount/credit and this may output to another external system (e.g. an invoice on an accounting system). The result of this is that the contract is essentially 'self-managing' in nature; both in respect of its state and updating/reconciling with external systems/resources, as shown in FIG. 18.

Fifthly, programmable clauses may be connected to external services, systems, and/or applications used by either party, 'party-side'. This means that as an alternative or in addition to a data-driven contract responding to data that affects the state of the contract as between the parties, a party may connect an external system to a programmable clause (or group of programmable clauses or data-driven contracts) to perform operations that affect only that individual party. In this way the party can use the data-driven contract to drive systems relevant only to that party and independent of managing the contract. For example, a contracting party may connect to a currency hedging system to hedge currency exposure in real-time, or a business rules system to automatically perform actions in respect of the contract based upon pre-defined rules (e.g. if a price decreases to a given level then to order more of certain goods under a given contract, or to terminate—if termination is available—if minimum stock level metrics/conditions are exceeded based upon ERP or other appropriate data), or an accounting system to update ledger, revenue, invoice or other appropriate records.

A 'Complex Event Processing Engine' ('CEP Engine') processes complex events for integration into or use by 'programmable clauses'. By enabling complex events to form the basis of contractual obligations, data-driven contracts can be used for much more detailed, complex, and granular agreements. 'Contract rules' may be used to query the CEP engine for events, which may either be integrated into programmable clauses directly, form the basis of programmable clauses, or feed events to programmable clauses. Alternatively, any other suitable implementation may be used. A CEP system may be used within an Event Stream Processing system to filter events and data to be used by the CEP Engine. A CEP Engine may incorporate contract logic internally such that the rules engine is comprised of contract rules. Alternatively, the rules engine may be distinct from the contract logic but nonetheless still be integrated with the logic embodying the rules.

Figure 21:
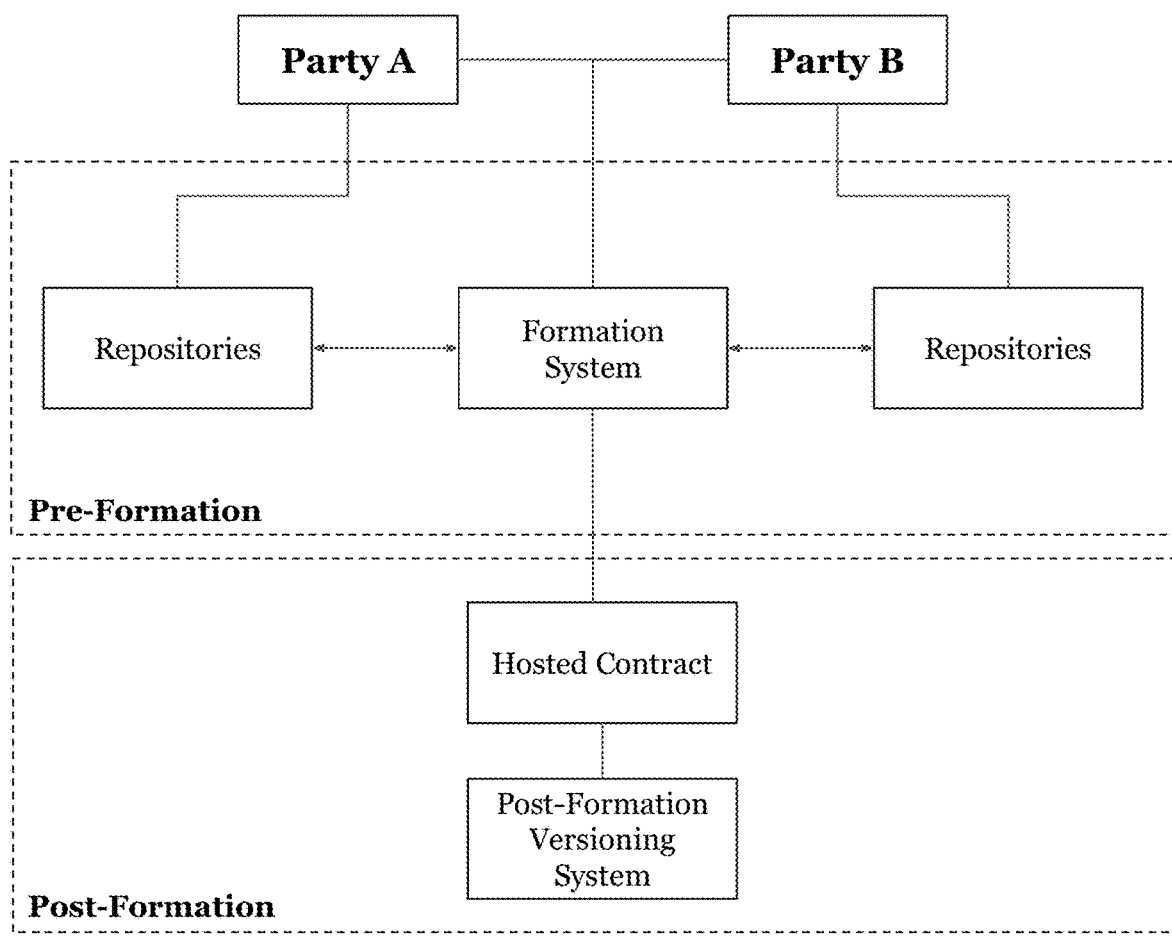
FIG. 21 is a schematic representation of pre-formation.

A 'State Transitioning Engine' provides a system to version each contract in a secure and verifiable manner. The State Transitioning Engine preferably provides a basis for a secure Conflict-Free Replicated Data Type (CRDT) structure, which can enable the contract state/data to be replicated data across multiple computers in a network (e.g. locally or on a public network such as the internet); thereby facilitating distributed/peer-to-peer state sharing of contracts and data pertaining to contract performance and execution. The State Transitioning Engine preferably takes the form of a Directed Acyclic Graph (DAG) comprised of objects that replicate the structure of a legal contract. An object may be the logic of a clause or part of the logic of a clause, parameter, input, or other element of the contract. A DAG will preferably have Merkle links between the objects either to express relationships between objects in clauses (e.g. an object in one clause being referenced in another clause, such as price), and/or store data relating to objects, history of changes to objects, etc. (see FIG. 19). The DAG may be applicable both to the pre-formation stage (i.e., before the contract is executed) and the post-formation stage (i.e. after the contract is executed) (see FIG. 21). When a programmable clause performs an operation (e.g. outputs data to an external system/application via. API) or changes state (e.g. the price decreases as a result of data input to the legal contract), the State Transitioning Engine is updated with this data/metadata. The State Transitioning Engine may be updated either by: (a) the user signing the state update or (b) such updates being automated or substantially automated either by the State Transitioning Engine and/or the logic of the contract. In this form, the State Transitioning Engine provides a cryptographically secure backbone to each data-driven contract, ensuring that the state of the contract is verifiable at any given point in time and that all historical changes to a contract are auditable by the parties or any interested third party. This is especially important in data-driven contracts where the state of a contract may change dynamically and perform operations (especially on external systems, applications, and resources).

A Contract Management Platform component enables parties to negotiate, form, and manage data-driven contracts, including (but not limited to) the visual formation/programming of data-driven contracts, selecting and configuring external integrations (e.g. APIs, ERP/CRM and other systems, analytics services, BDLs etc.), mapping integrations to programmable clauses, adding clauses to contracts (e.g. from clause libraries, using templates, and other appropriate means), and monitoring the post-formation state of a contract via a graphic user interface (GUI) dashboard(s), analytics, notifications, feeds, graphs, charts, and other data visualization techniques. The platform may also integrate with external platforms, systems, and resources to give users access to template clauses and contracts on other systems/resources, as well as to push data and notifications to other systems. More generally a contract management system can incorporate a contract management platform, computing infrastructure in supporting the operation of the system and methods, management of blockchain/distributed ledger systems and other aspects described herein.

2. Overview

A system and method for creating, executing, and managing data-driven contracts with programmable clauses functions to enable contracts to have a range of dynamic, autonomous or 'self-managing' capabilities, and/or interface with outside resources (e.g., devices, services, and the like). A data-driven contract is preferably additionally a data-driven legal contract. In acting as a legal contract, the data-driven contract can include at least one form of representation that is comparable to an agreement that expresses terms and conditions. A secondary or partial representation form of a data-driven contract can be through configuration specification of one or more programmable clauses. A programmable clause is preferably a digitally native contract clause that operates and is embodied as software code written in a high-level language (e.g. JavaScript, Scala, Python etc.), a domain-specific language (proprietary or public/open-source), an extension of such languages, or any suitable language(s). A preferred embodiment utilizes an object-oriented paradigm. A programmable clause can include or be defined through various elements that are used in expressing the intended agreement and in performing the intended operations of a legal clause in a contract. A programmable clause could include contract rules that constitute, are integrated with, and/or processed by a rules engine (such as that underlying a complex event processing system), BDL scripts run on BDL systems/platforms, or other computational logic. A contract rule is a rule that embodies the logic of a contract and that is used by a rules engine. The system and method are preferably applied to legally enforceable contracts.

The terms and conditions of data-driven contracts can update and change in real time, after the contracts are formed, in response to data and external events, and/or an algorithm. A data-driven contract can preferably act as a legal contract that is capable of being at least semi-autonomous or 'self-managing' in nature. Additionally, data-driven contracts can interface with outside systems, applications, protocols, and platforms to drive other operations through various external integrations. External integrations may be used to establish data sources (i.e., inputs) or data destinations (i.e., outputs). These systems and platforms may include, but are not limited to APIs, 'Internet of Things' ('IoT') platforms, 'edge computing devices' (e.g., sensors, actuators, RFID devices etc.), event sourcing and event processing systems/applications (including ESP/CEP systems), Enterprise Resource Planning (ERP) and Customer Relationship Management (CRM) software, BDLs (e.g. to perform transactions), other database architectures, other clauses within the contract, other data-driven contracts, and/or other accessible resources. In one exemplary implementation, a programmable clause can automatically update terms of the clause according to data from an IoT/edge computing device or service. In another exemplary implementation, a programmable clause may direct or be used to deliver data to an outside device, system, or service. As an example of having multiple integrations, information retrievable through a BDL system can be monitored, and based on information of the BDL system, execution of the logic of a programmable clause can direct updating an external API endpoint based on the BDL system. In this way, BDL functionality used in combination with a data-driven contract can also be used to drive other external platform integrations, which may not be readily feasible in other consensus based BDL systems.

One potential benefit of the system and method is providing an easy to use interface for the creation and management of data-driven contracts. In some cases, the system and method may make it easier for users to create a contract that is more dynamic, stateful, and has increased utility. The interfaces used by the system and method may include a Command Line Interface/IDE to form and configure programmable clauses, GUIs such as a 'drag-and-drop' contract/clause building tool. The interface may also include a visual programming language uses to form, program, configure, and display contracts. In such an approach, contract clauses (and/or parts thereof) and respective terms may be represented by any number of geometric figures and shapes, including graphical blocks, and the logic, input/output systems, and relationships, actions, and operators established and displayed with drop down menus, buttons, pointers, connectors, words, and numbers. The interfaces may additionally or alternatively include any number of programmatic interfaces that can enable script-based interfaces, markup language interfaces, command line interfaces, application programming interfaces (API), and/or any suitable type of programmatic interface.

In one usage scenario, persons unfamiliar with contract law or contracting practices may be able to use these interfaces to simply compile a binding contract that not only adheres to legal practice, but also can use data-driven approaches to make the contract a reliable construct around which a relationship operates.

In another usage scenario, lawyers and trained professionals can easily create data-driven contracts. This may relieve legal professionals from depending on experts trained in programming, (including, but not limited to) BDL scripts on BDLs and other systems. This may be useful to creating data-driven contract in particular, including creating connected clauses and establishing the relationships and/or interrelation between any programmable clauses used in a data-driven contract, including the instantiation of a new programmable clause (e.g. on or using a BDL), and data inputs/outputs to and from external resources.

In yet another usage scenario, a service, application, or device can utilize a programmatic interface for seamless usage of data-driven contracts. For example, an outside computing platform may use an API of the system to instantiate a new data-driven contract wherein at least parts of the data-driven contract are defined or configured through a scripting language or other programmatic interfaces.

Another potential benefit is that by providing real-time or near real-time state, data-driven contracts may facilitate real-time analytics at both: (a) contract and (b) multi-contract/enterprise levels. In the former instance, the real-time state of contracts may be used to analyze groups of contracts (e.g. the interrelation of the state of contractual relationships). In the latter instance, the real-time state of contracts may be used in conjunction with other datasets (e.g. ERP systems, IMS systems, SCM systems, CRM systems, accounting systems etc.) to provide insights into the effect of state changes of contracts on enterprise activities and management in real-time or near real-time. Analytics may be predictive (e.g., through use of machine learning technologies), in real-time, or batch processed. The system and method may have additional or alternative benefits such as facilitating contract management, operations oversight, compliance audits, and contract analytics.

Another potential benefit of the system and method is the ability for each contract itself to be managed in real-time rather than managing contracts 'indirectly' with traditional CLM software system. The ability for contracts to be managed, organized, and otherwise integrated into a business or business processes 'directly', without a separate software system, potentially may greatly reduce costs, inefficiencies (e.g., the manual management of contracts and reconciliation on third party systems needed of contract managers), complexities, and operational risks. The contract logic there may act as a form of managerial entity between various data systems used by an enterprise or in commerce; thus bringing the contract closer to an entity managing legal relationships and processes. The system and method may be of particular benefit in this regard when used with NLP processing for natural language contracts.

Another potential benefit of the system and method is to enable a multi-modal contract that provides multiple views of the data-driven contract. The system and method can seamlessly enable different views. For example, the system and method may offer a high-level block-based or other workflow or graphical representation of a clause/contract, an underlying natural language representation (possibly similar to a traditional legal document or a hybrid data/natural language representation), and a programmatic representation (e.g., data object representation, which may include smart contract language scripts). Other representations may also be used.

Another potential benefit of the system and method includes input, output, or other integrations with external or distinct services, applications, platforms, data sources, and/or devices. In particular, clauses and other features of a data-driven contract can utilize or interface with a multitude of data sources and software applications and platforms, including but not limited to: APIs, HTTP clients, edge computing/network-connected devices, IoT platforms, analytics services/platforms, artificial intelligence/cognitive systems, ERP, IMS, SCM, and CRM systems, various databases architectures such as BDLs, event stores, event stream processing systems, and the like. More devices are becoming network connected (e.g., IoT devices) and more services and applications are becoming API-enabled. The system and method can make use of ever increasing availability of data from the physical world and systems. The system and method can be particularly applicable to usage scenarios where the data from such external resources and/or control over such resources can be utilized when executing a data-driven contract. In one implementation, a data-driven contract may interact with data aggregation, event processing or complex event processing systems to provide data inputs to, or otherwise operate, the data-driven contract.

A further potential benefit is that as any suitable data source may be integrated, data-driven contracts may provide a universal, interoperable, extensible/modular, and future-proof method and means of executing and managing legal contracts. The system and method enables new technologies and data sources to be integrated when beneficial to contracting parties. Traditional legal contracts and CLM systems are likely unable to accommodate these in the same manner.

Another potential benefit may be that, data-driven contracts provide a universal legal contract that can interact with generic/computational and specific (e.g., trade finance, supply chains, provenance) BDLs. In particular, the data-driven contract can enable the data-driven contract to operate off-chain but interact with BDL systems with enhanced functionality. This is particularly important as: (a) BDLs seek, in part, to liberate siloed data; (b) BDLs may not have a composite or universal interface with legal contracts, particularly using multiple BDLs and in a data-driven and/or dynamic manner; and (c) BDL scripts on BDLs may not have legal context. Additionally traditional BDL scripts may be limited in functionality due to the scripting language and/or BDL input/output functionality. Some implementations of the system and method may be used to address such existing challenges.

As a related potential benefit, data-driven contracts may be able to use "smart contracts" or BDL scripts in a standardized manner (e.g. through the use of a 'library' of code rather than coding the contract terms and conditions on chain (e.g. code for asset transfer etc., rather than the actual terms and conditions being executed on chain). This may lead to privacy benefits, reduced complexity, improved scaling, and other related benefits. A further potential benefit is that dynamic aspects of data-driven contracts when using/interfacing with "smart contract scripts" on BDLs may also mitigate issues of immutability that may lead to rigidity (i.e., once a BDL script is executed on a BDL it is typically difficult or burdensome to amend. Providing a 'meta-level' data-driven and legal framework within which BDL scripts exist and operate may reduce such difficulties.

As another potential benefit relating to BDLs, data-driven contracts may have native 'off-chain' cryptographic and state transitioning functionalities and can be alleviated to interact with BDLs where and when required such as to perform transactions, share state etc. (e.g. by compiling to virtual machine bytecode, being embedded in the logic of the contract, and various other methods). Consequently, data-driven contracts that may use BDLs may be more computationally efficient.

Yet another potential benefit is that data-driven contracts may facilitate legal agreements to bridge the divide that may currently exist when using traditional legal contracts between the state of the physical world in real-time and the state of the physical world as represented in the legal contract itself. The system and method provides an important means for users to incorporate data and events from a growing range of fragmented services and resources into legal contracts that represent—either in whole or in part—the state of the physical world. This is particularly applicable in respect of IoT data.

As another potential benefit, the system and method may include automated renegotiation/amendment of terms and conditions of a data-driven contract. Parts of a data-driven contract may automatically update the terms and conditions of a contract according to various inputs (e.g., the data sources mentioned herein), logic, rules, and/or algorithms. For example, a pricing agreement of a data-driven contract can alter a price in real-time based on performance data from an external source (e.g., an IoT device or data API) based upon whether conditions defined in the data-driven contract are met.

A further potential benefit is that by being enabled to integrate with data sources, particularly in real-time or near real-time, data-driven legal contracts may potentially create efficiencies that could not be generated through use of traditional legal contracts. Examples of such efficiencies include (but are not limited to): automated and conditional actions such as termination, ordering (which may be achieved through use of business rule systems etc. that are connected to the contract management platform or otherwise to a contract); use the state of a contract in real-time or near real-time to, automatically or otherwise, perform actions on external systems, such as logistics systems to arrange freight forwarding/shipping or purchase goods programmatically (e.g., by using a JSON, or other appropriate, output from the contract); agreements with third parties may be used to reflect business decisions that are based on data (e.g., a contract may be used to reflect data in real-time or near real-time) which may move legal agreements closer to 'outcome' contracts (e.g., that a defined outcome is contracted for rather than goods/services that may not reflect the desired outcome); contracts may display state and update in response to data, meaning that knowledge of, and visibility into, performance, issues, progress etc. may be known, unlike traditional contracts that are static and cannot possess these attributes; and update other contracts that are linked to a contract automatically or with reduced manual intervention.

As yet another potential benefit, the system and method can facilitate the creation and management of cryptographic, auditable, and party-accessible records relating to the execution of legal contracts. In such cryptographic approaches contracts, clauses, related data inputs, and other metadata can be managed in part or whole through a BDL, peer-to-peer computing infrastructure, or an alternative computing infrastructure.

As another potential benefit, the system and method can enable customization of a data-driven to use one or more of the data-driven capabilities described herein such as integration with a BDL, ingest data from an external data source, trigger some action as an output, and other suitable options. Such customization can be tailored to the particular challenges to be addressed by the data-driven contract.

Figure 15:
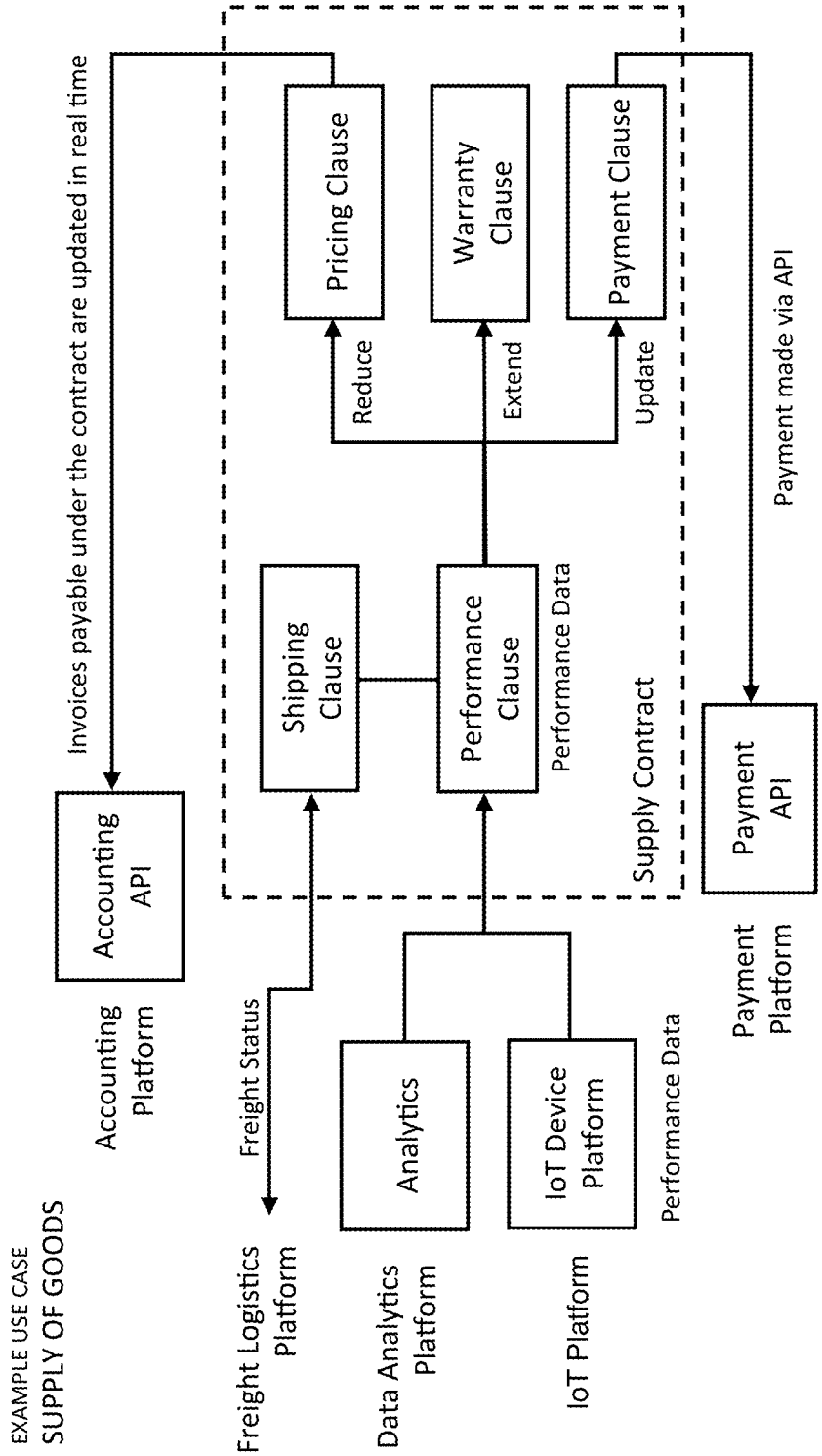
FIG. 15 is a schematic representation of an exemplary use case of a data-driven contract.

The system and method can be applied to a wide variety of use cases. The system and method can have particular applicability to contracts, documentation (including that used alongside or as part of legal contracts such as purchase orders, schedules, and attachments), and management systems. The system and method may be used in fields such as: supply chain and logistics agreements as shown in FIG. 15, supply chain finance, warranties, agriculture, procurement, marketing and promotion (e.g. social media), asset financing/collateral management, employment and freelancer/consultant agreements, software licensing, insurance contracts and policies, service-level agreements, manufacturing contracts, loan agreements, mortgages, trade finance (e.g., letters of credit and related documentation), and/or numerous other fields. Within these fields, numerous potential uses exist.

In one exemplary implementation, the programmable clauses and contracts are modular and can be implemented, used, and interchanged independently with or without any necessary connection to each other. For example, a programmable clause may not be connected to other programmable clauses in a given contract, and/or may be added to a natural language contract in which no other clauses are programmable. In yet another exemplary implementation, the software and data underlying and associated with such contracts or specific clauses may be executed and/or stored on edge computing devices that may themselves be the subject matter of the contract, such as the devices being purchased or leased in a supply or lease agreements. These devices may ultimately be the agents or principals of contracting parties and the devices may form, negotiate, and perform contracts. Edge computing devices enable computing to take place away from the contract. As such, data-driven contracts in this embodiment can operate as a contract management entity on IoT networks, mesh networks, and the like. This may be seen as analogous to CLM for networks of connected devices.

In one exemplary implementation, the contract price of a good in a supply agreement will depend on several sources of real-time data such as performance of the good, shipping conditions, estimated delivery date, and relative cost and performance to industry benchmarks. The contract price would decrease if a specified combination of conditions in respect of the data were triggered (see FIG. 15). In another exemplary implementation, employee/freelancer performance may be monitored by time log inputs, data from IoT-enabled employee badges or similar, and other data measurements relevant to an employee/freelancer's output in determining remuneration and automating payment, satisfaction of a contract, compliance with legal/regulatory obligations, and the like. In a further exemplary implementation, a contract farming agreement may be data-driven through use of a variety of IoT data (e.g., soil moisture content, nitrogen content, soil composition, absence/presence of certain chemical compounds) and analytics data (e.g., yield, field usage, soil maps, etc.).

In another exemplary implementation, business logic rules can be defined in combination with a data-driven contract wherein non-contractual decisions can be made. For example, a data-driven contract may define a programmable clause that depends on an event that enables a contract to be validly terminated upon certain conditions being met. A business rule system may interact with the programmable clause and automatically sends a notification email based on given party-specific rules. For example, a termination notice should automatically be sent where "delivery date to a customer is >X days away" and "projected stock is >Y units", or "stock level>10,000" units and "purchase rate is <500/day". Similarly, predictive or prescriptive analytics may be used. For example, a contract may be terminated using a business rule only where stock is not anticipated to sell out in next 30 days. As another example, a new supplier may be automatically determined by a novation algorithm. For example, business logic could define how, if a contract may be validly terminated, various potential suppliers are queried and compared, before selecting a new supplier.

In one optional variation, the system and method for creating, operating, performing, and managing a data-driven contract can include maintaining event and contract versioning records in combination with utilizing event stream processing (ESP). The system and method enables complex event data to interact with the logic of a legal contract because, in a one embodiment, the contract logic defines and drives the queries, actions, and operations of a rules engine used by a complex event processing system (see FIG. 12) or otherwise enables data to be drawn into the logic of the contract from complex event processing or event streaming systems/engines. The system and method can enable event streams, simple or complex events, rules engines, and/or data-derived inferences to be utilized in, or otherwise implement, the logic of a contract and its legal rights and obligations. For example, a complex event processing system may run through contract rules, select the rules for which an external event condition is true, and then evaluate and undertake the corresponding contract actions or operations, such as payment or release of liability. Alternatively, the programmable clauses may themselves implement the contract rules that interface with the ESP system without use of an external rules engine (e.g., see FIG. 11).

One potential benefit of an ESP system and method is providing the facility to use complex events and patterns in contracts that could not otherwise be monitored or would incur significant transaction and monitoring costs. For example, an ESP can be used to monitor the relationship between multiple events from a multitude of disparate data sources that would traditionally be difficult or infeasible to monitor for compliance. An ESP system and method could enable managing a contract in response to numerous and complex data input conditions.

Another potential benefit of the system and method is the ability to use increasingly granular events as the basis for specifying, customizing, or making highly event-dependent contractual agreements. Just as complex relationships between events may be used, events that occur with great frequency, small values, or small value changes are impossible or prohibitively burdensome to monitor as part of a contractual agreement unless incorporated into a data-driven system able to process complex events. The ESP system and method could additionally enable agreements to be built around complex events but for that contract to be executed in substantially real-time.

Another potential benefit of the system and method may be the ability to form data-driven contracts that incorporate complex calculations or operations on events that would be difficult or impossible to achieve as part of a traditional contractual relationship that is not data-driven or dynamic. For example, the system and method may be used for performing complex conditional actions, detecting event patterns, performing event abstraction, filtering events, aggregating and transforming events, modeling event hierarchies, detecting relationships (e.g., causality, membership, or timing) between events, and abstracting event-driven processes.

Another potential benefit of the system and method can be that complex computation may not occur within the body of the contract itself, but can be delegated to an event processing engine, an outside system and/or any suitable entity. This is particularly important where the logic of the contract may—either in whole or in part—exist on BDLs through various uses of BDL scripts, as mentioned herein. By performing computation 'off-chain', an ESP system and method can reduce complexity in the statement and operation of the BDL script(s), and potentially reduce any computational cost required for use of a BDL. Different embodiments may differ when it comes to the programming paradigm that is used to represent or implement programmable clauses and also what aspects of the computation use a BDL, if any.

Another potential benefit of the system and method can be enhancing usability. Users of differing levels of experience with data science and analysis (including those with little to no experience) may use the system and method for integrating complex data and event stream processing into contracts.

3. System for Implementing a Data-Driven Contract with Programmable Clauses

Figure 1B:
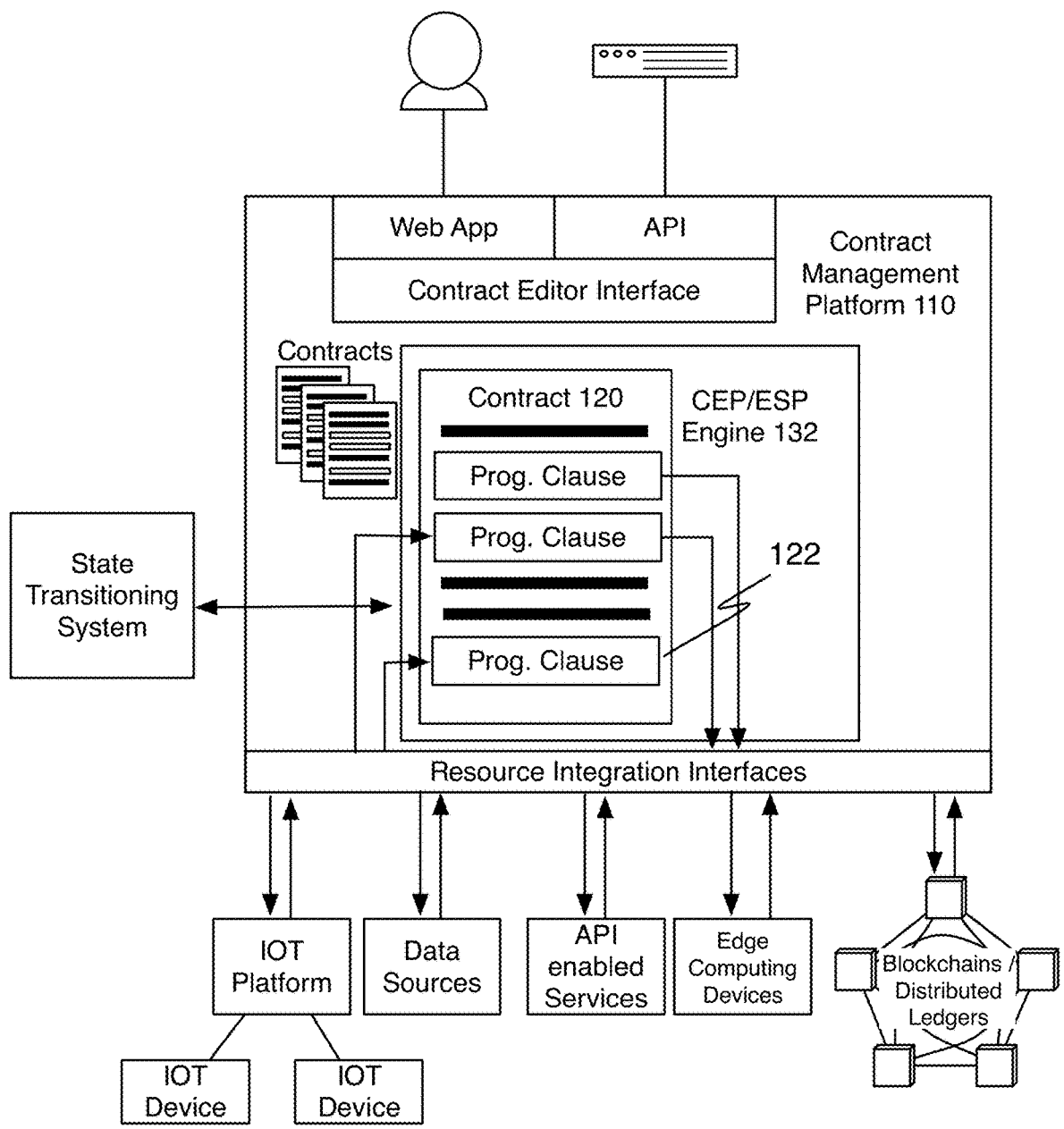

As shown in FIGS. 1A and 1B, a system for implementing a data-driven contract with programmable clauses preferably includes a data-driven contract 120 that includes configuration for at least one programmable clause 122. A programmable clause 120 can be configured for state update integration with BDLs, integration with external resources, integration with legal logic (e.g., part of programmable logic that may characterize conditions, rules, actions, and/or other aspects relating to compliance of a legal or rule-based framework), and/or other components. A system for implementing a data-driven contract can additionally use various processing engines 130 that may include a network for distributed or peer-to-peer processing. One implementation described herein includes a CEP engine 132. The system is preferably used in combination with a system for creating data-driven contracts including a contract management platform as described herein.

3.1 Programmable Clauses

A data-driven contract of a preferred embodiment functions as an agreed arrangement defining the legal relationship between the contracting parties and any other involved entities. The data-driven contract in one mode can serve as an alternative to and/or a supplement to a traditional/static legal contract and, in an alternative or concurrent mode, can serve as an automated machine process for driving and responding to external events and data. A data-driven contract can be used in automatic audits, compliance checks, and fulfillment of the contract obligations based on data provided by a counterparty or other sources, amongst others.

A data-driven contract preferably includes a set of programmable clauses, which can enable the terms and conditions of the data-driven contract to update and change in real time in response to data and external events after the contract is formed. Programmable clauses and data-driven contracts can additionally or alternatively include programmable logic (e.g., business rules, business logic, heuristics, legal logic, and the like), legal references, contract properties, BDL script interfaces, data/resource interfaces, and/or other components. A data-driven contract may also include static clauses. A static clause can be a natural language clause (e.g., a non dynamic clause or portion of a clause with natural language content). A static clause could additionally or alternatively be expressed in a computable form (e.g., not a natural language format. Herein natural language clauses are referenced as the main form of a static clause. Static clauses (whether expressed in computable form or in natural language). The data-driven contract can include a configuration file or data object that defines the set of components and other properties of the data-driven contract, but a data-driven contract may be characterized in any suitable format. The static clauses can function to enable traditional contractual provisions to be incorporated into the data-driven contract. Contract properties may include account or entity associations, a contract name, contract permissions (e.g., who can view and what data they can view, who can edit/amend and when, who can perform certain operations under the contract and when, who can execute, who can update the state of a clause/clauses etc.), and/or other suitable properties of the contract within the system.

A programmable clause may include programmable logic, which functions to enable reactive and dynamic operations to be defined and executed. The programmable logic may be triggered based on input data, event or condition detection in data, a scheduled time period, and/or set to run continuously. Alternative and additional triggers may also be used. The programmable logic may define general business rules, contract rules, logic, and/or processes. The programmable logic can be a processing instruction, which may include conditional statements, data transformations, resource interactions or any suitable processing logic. In one instance, programmable logic may be executed and enforced by the contract management platform. In another instance, programmable logic may be delegated to a BDL or other type of distributed computing system. For example, external data fed into a BDL may facilitate execution of programmable logic used in execution/operation of a programmable clause. In yet another variation, the user interface acts as an abstraction layer to a distributed computing system, and at least a portion of the data-driven contract is executed on a BDL (e.g., compiled to VM bytecode) or other form of distributed computing platform. For example, programmable clauses can output data resulting from a dynamic interaction (e.g., the interaction between two or more clauses) to a BDL script(s) on a BDL to perform or execute an action, a programmable clause may compile to the bytecode of a BDL virtual machine, interact with the Application Binary Interface (ABI) of a BDL, via API, deploy code to and/or call code on a BDL (e.g. from a library of scripts), or any other appropriate means of interaction. In yet another variation, the system is implemented through a partially or fully distributed computing system, a decentralized computing system, or any suitable computing infrastructure.

A programmable clause can preferably provide a natural language contract representation in coordination with a computable representation (e.g. using natural language generation or any similar alternative method), which may be data driven. A programmable clause is preferably integrated into a full contract, and any suitable number of programmable clauses may be used. Additionally, one programmable clause may include one or more nested sub-programmable clause and/or reference, or otherwise link to, other programmable clauses.

Programmable clauses are preferably programmable and configurable. Programmable clauses can additionally autonomously monitor and report the performance or compliance of a counterparty with their contractual obligations based on data provided by the counterparty or other sources (as stated herein). The terms and other aspects of a clause may depend upon, change, or update in response to external data. Such changes may be continuous or made in real-time in response to external data.

Figure 17:
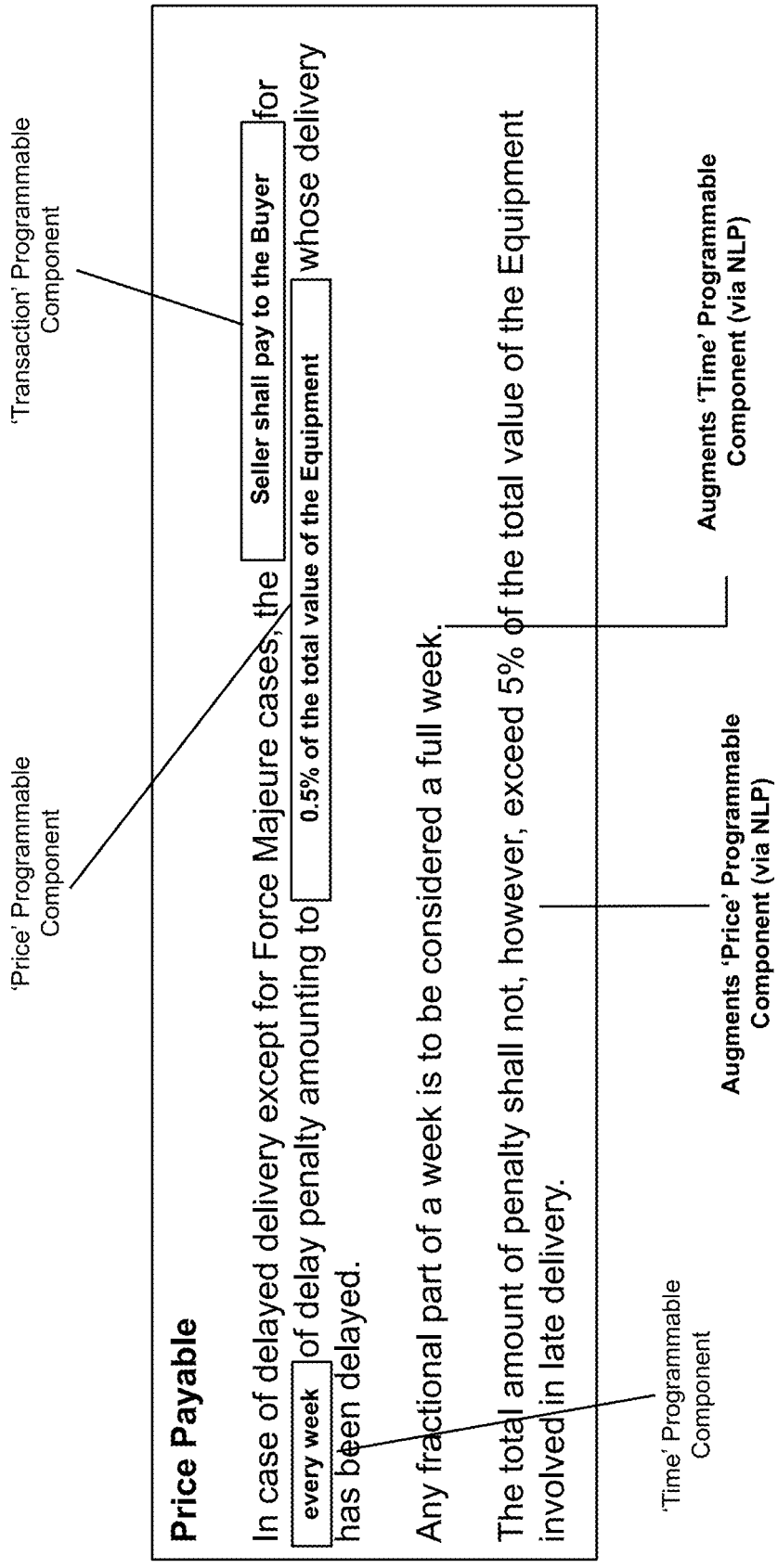
FIG. 17 is a schematic representation of programmable components in a natural language contract.

Programmable clauses and data-driven contracts may be structured and formulated using a variety of approaches. These approaches can differ when it comes to the programming paradigm that is used to represent or implement programmable clauses and also regarding what aspects of the computation use a BDL, if any. In one variation, an object oriented programming approach may be used. In another variation, a hybrid of metaprogramming and a BDL based implementation can be used. Metaprogramming can be particularly useful for dynamic, self-managing contracts for two reasons. First, metaprogramming can enable creating links between programmable clauses and/or contracts. Second, metaprogramming can dynamically create, modify, or update clauses and terms and thereby be used to update the state of a contract. In one variation, a portion or a whole of a programmable clause may be defined in a metaprogramming paradigm/language. In another variation, the programmable clauses can be written in a domain specific language (e.g. Solidity, Business Contract Language, Contract Description Language, or other suitable languages). In another variation, the programmable clauses can be written in a high-level language such as JavaScript, Python, Scala, Go and the like. In yet another variation, programmable clauses may be defined through natural language with 'programmable component' objects as shown in FIG. 17. 'Programmable components' are data objects that operate like programmable clauses in that they are programmed to respond in response to data in the manner mentioned herein, but are embedded in natural language contracts (e.g., a 'price' object that is programmed to change in response to an event occurring such as if the temperature in shipping container breaches a defined range). 'Programmable components' can be embedded into, or otherwise used by, a natural language clause. A natural language clause is preferably a static clause or subsections of a clause that includes natural language content. The natural language content is preferably not dynamic. For example, a 'price' component that operates to dynamically adjust the price of a good provided under a supply agreement may be embedded into a pricing natural language clause. Multiple programmable components may be added into a given clause and multiple clauses in a contract may utilize programmable components. Programmable components may be connected, interdependent, or otherwise reference one another in the same clause or across multiple clauses in the same manner as programmable clauses. For example, a price clause may update a warranty clause. A potential benefit of using programmable components is that data-driven functionality (as stated herein) can be introduced into natural language content of data-driven contracts. Such a hybrid clause structure may be more accessible and easier for some users. Programmable components may be used in at least two ways. Firstly, to create or use natural language contract templates that are augmented with data-driven functionality. In one such embodiment, programmable components may be used to generate a data-driven contract with dynamic functionality that users are able to autofill with data and configure. For example, users may set a 'price' programmable component to $1000 per unit subject to a metric measurable by an edge computing/IoT device to fall between variable X and variable Y. Programmable components can be configured to update another programmable component based on defined conditions (e.g., for every price decrease of 3%, the warranty period is extended by 2 months). Programmable components could be easily embedded in natural language contracts through drag and drop or other suitable user interfaces. Secondly, programmable components may be used in conjunction with NLP functionalities.

3.2 Programmable Clauses, State Updates, and Blockchains/Distributed Ledgers

A programmable clause may be implemented as a BDL script on a BDL, include one or more BDL scripts as an element, reference a BDL script, and/or compile to one or more BDLs (e.g. virtual machine bytecode), generate/manage or pass data to one or more BDL script on a BDL, deploy and/or invoke a BDL script (e.g. from a library). Alternatively, other integration mechanisms for interacting with or utilizing BDL scripts on a BDL may be used. Multiple BDL scripts and/or BDLs may be used per clause/contract. Additionally, multiple types of BDL systems/protocols may be integrated such that a programmable clause is not limited to one type or protocol of BDL or one implementation of a BDL (e.g. multiple BDL instances may be used per clause/contract). Use of a BDL may include pushing data to be stored on a BDL (e.g. a state update such as a price change, the state of a clause, multiple clauses or the contract to a BDL), drawing in data from one or more BDLs (e.g. transaction data, stored data such as), performing a transaction on a BDL pursuant to the contract such as the transfer of a tokenized asset, and many other applications.

Integration or interactions with a BDL may be with an external BDL system. However, a BDL may not be external. For example, the system and method can include running a BDL system with a VM, compiler, and other suitable components to compile to VM bytecode and execute through an "internal"/managed BDL system.

When implemented on a BDL, the data associated with a transaction implementing, using, executing, or changing a programmable clause may use particular methods of encoding and decoding data. In one potential implementation, an Application Binary Interface (ABI) may be used to serve as a mechanism for encoding and decoding data into and out of transactions by creating a JSON-ified representation of a compiled contract's variables, events, and methods. In a preferred implementation, the ABI is interoperable and/or integrated with a BDL system/virtual machine.

As discussed, in one variation, the generation and management of one or more BDL scripts on a BDL may be an element of a programmable clause in a data-driven contract. In a second variation, a programmable clause of a data-driven contract may be fully implemented as a BDL script or series of scripts on a BDL. A BDL script may additionally or alternatively be an output of a programmable clause to other applications, platforms, or networks. For example, a programmable clause may set up/deploy and invoke (e.g. from a script library or engine), call, pass data to, compile to the bytecode of a BDL virtual machine, or otherwise use, a BDL script on a BDL for a tokenized asset transfer.

Utilizing a BDL can include using BDL(s) to initiate, process, record, store, transmit, authenticate and/or verify data-driven changes to the legal terms and conditions of a contract as detailed above. This may include the entire contract or a portion of the contract being persisted or otherwise stored on a BDL. This may alternatively include individual programmable clauses, BDL scripts, event or input data, or other aspects being persisted, executed, or stored on a BDL. Several potential methods of a BDL implementation for dynamic legal terms and conditions may be used.

One approach can include a process for initiating a new BDL record/transaction for each update to the contract by updating the corresponding code on the BDL.

Another possible BDL implementation for a data-driven contract is for a programmable clause to have embedded functionality to automatically create a new version of a BDL script (or scripts) with an updatable address parameter(s) when any of terms or conditions of the contract and/or the BDL script update or otherwise require a change. The updated address parameter(s) will reflect the updated state of the data-driven contract (e.g., changed to the state of one or more programmable clauses). Alternatively, a programmable clause may call or deploy such a script. Alternatives may also be used.

A related method can use a versioning system that, in one instance, uses an entryway script that treats changes to the data-driven contract as calls, and forwards the calls in a way to update the contract as it persists or is represented on a BDL. In that instance, the forwarding of the calls to update one or more programmable clauses may be defined by an updatable address parameter.

Another method of reflecting updated terms and conditions where a BDL is used is by connecting separate on-chain code (e.g., BDL scripts) such that the current representation of a data-driven contract on a BDL calls another contract, which then becomes the operating representation on the distributed ledger. One exemplary method of implementing this is to change what code is executed on a BDL when the function is called that is implementing the terms and conditions of a legal contract; in this instance, updated legal terms and conditions will cause the function to call different code on the BDL that reflects the new terms and conditions. Yet another method is to change the contract, script, or code that the BDL contract references. These methods are non-exhaustive; others may also be used.

3.3 Contract Rules, Rules Engines, and 'On-/Off-Chain' Blockchain Implementation 1. A programmable clause preferably includes, or is implemented through, one or more contract rules, which may be structured and formulated through one of the approaches above. A contract rule can be a procedural contract script or a declarative contract script or any other suitable type of script. Other types of contract rules may similarly be used. The system can include various approaches to implementing a contract rule depending on the contract rule type and particular objectives of the system. A single programmable clause could also utilize multiple types of contract rules. Similarly, a data-driven contract may have programmable clauses that includes different types of contract rules and/or is implemented in various manners.

2. A procedural contract script is one optional type of a contract rule that can be set for a programmable clause. A procedural contract script can utilize procedural logic wherein defined processes are executed in a defined sequence. A procedural contract script may utilize a BDL script (e.g. by reference, inclusion or other appropriate means such as those stated herein). A procedural contract script may define a state machine of logical states and transitions between those states.

3. A declarative contract script is a preferred type of contract rule that may define by the actions to be done without specifying defined sequencing. A rules engine can reason upon a contract rule defined by a declarative contract script and determine a proper sequence of steps to carry out. A declarative contract script may be defined by explicit formal statements. A logic-based programming language may be particularly well suited for declarative contract scripts and in implementing legal contracts because the particular order of the facts and other information as they are stored in the knowledge base is not relevant due to the defeasible inference process being able to determine the proper order of contracting processes, operations, and actions.

4. In a preferred implementation, a process of inferential reasoning on declarative contract scripts will help determine how contract logic processes external events that lead to contract state changes, operations, outcomes, and other conclusions. A defeasible inference process may be used with contract rules using declarative contract scripts to determine what contract (or related) actions or operations to take to execute the contract, and in what particular order to take such actions or operations. One benefit of a contract rule using defeasible logic may be that issues of functional ordering or multi-threading may be mitigated as state-flow of code can be defined two dimensionally. An example of a defeasible logic rule-engine can be SPINdle or other defeasible logic frameworks and/or other appropriate languages or domain specific languages. In a defeasible representation of contract logic, conclusions may be made through dialectic proofs. A rule engine to make inferences may occur 'on-chain' (i.e. on a BDL) or 'off-chain', or any suitable alternative or variation.

5. A defeasible logic rule engine can be deployed on or off a BDL. In one variation, defeasible logic inferences are made within a BDL system (e.g., 'on-chain'). In another variation, defeasible logic inferences are made outside a blockchain system (e.g., 'off-chain'). Defeasible logic inferences made outside of a BDL system may be made on a centralized server (e.g., a third party server), a distributed computing system, a peer-to-peer system, and/or any suitable system. One 'off-chain' variation option can include recording contract logic and the inferential conclusions on a BDL.

6. Programmable clauses may also differ with respect to how they are expressed as or related to the rules in a rules engine (such as a CEP rules engine). In one potential implementation, programmable clauses can be: (a) written directly as complex event processing rules; or (b) function as complex event processing rules in a hybrid logic/rule implementation; and (c) either (a) or (b) with or without interfacing with one or more BDL scripts. Option (a) is preferably used in an implementation where rules operate within the CEP engine. Option (b) is preferably used in an implementation where the rules and triggered actions are separate from (external to) the engine. Alternative approaches may similarly be used and any suitable combination can additionally be used.

7. In another variation, the contract rules may also or alternatively be represented as a hierarchical state machine (HSM). Contract logic may be defined in pure defeasible logic that can be interpreted and executed by a hierarchical state machine logic engine. A HSM can be used to ensure the interpretation and execution environment is mathematically provable and therefore more secure and efficient.

As described, a programmable clause can be implemented in a variety of ways. At least three implementation options include: (a) an 'on-chain' declarative and procedural contract rules option; (b) a compiled contract logic option; and (c) an 'off-chain' option. As described herein, the system and method may be used in combination with an event processing system (e.g., with a CEP engine). The various types and implementations of programmable clauses may be used with or without such an event processing system.

In an 'on-chain' declarative and procedural contract rules option, inferential conclusions can be stored on a BDL and procedural contract logic may be executed on a BDL. In one variation of an 'on-chain' variation, meta-programs can be written with a procedural language. A rule engine could be used with a contract rule to make a conclusion around a knowledge base. A resulting action from a procedural contract rule could act on that knowledge. An 'on-chain' solution may potentially enable intermediation services to be eliminated, and a rule engine can be established in the BDL for more trustworthy inferences.

In a compiled contract rule option, a data-driven contract, in whole or in part, can be compiled onto a BDL for storage and execution. A hybrid implementation option can convert a knowledge base to a lower-level representation, which can function to increase the speed of inferential computation. The compiled code or script can be part of the contract rule that may be recompiled to run on a virtual machine (or similar component) of a BDL system. The bytecode may be compiled for a particular environment. In one variation, multiple types of bytecode for utilizing multiple different kinds of BDLs. The compiled bytecode may be generated 'on-' or 'off-chain'. In an 'on-chain variation', involved parties may examine the compiler to establish trust. An 'off-chain' variation may utilize third party services. When a contract is modified, contract rules and/or relevant portions may be recompiled. Alternatively or additionally, 'on-chain' code may be compiled when the function(s) of a programmable clause are called. A contract rule may be updated without interrupting related processes if the knowledge base is updated.

In an 'off-chain' option, parties to the contract sign updates to the state of the contract. These state updates may be recorded in the State Versioning System.

3.4 Network and Computing Environment

The system can be implemented using any suitable computing environment or may use multiple computing environments. In one variation, the system (or part thereof) can run on a virtual machine, container or series of containers, or sandbox environment. A virtual machine is preferably configured to enable interactions with outside applications and services through application layer protocols or other suitable communication channels.

A peer-to-peer protocol (e.g. RPC over HTTP/2 or other appropriate standard) may be used to execute contracts between contracting parties (e.g. to send state updates to contracts, form and manage contracts, etc.).

In one particular 'off-chain' computing environment, servers or virtual machines (VM) are communicatively connected together. Each server/VM may be containerized, and may have a multitude of clients connected. Each server/VM can be a, likely federated, node on the network and may be seen to represent a contracting entity, individual enterprise, company, group, or similar. Each client may be a user acting on behalf of each contracting entity. Alternative execution environments may include (but are not limited to): (a) running the contract on a trusted third party service which performs contract execution on behalf, and independently, of the contracting parties; and (b) arbitrarily consensus algorithm/logic (where appropriate) to automate the state transition, including (but are not limited to) Practical Byzantine Fault Tolerance (PBFT), PAXOS, RAFT, between contracting parties or all users of the system to validate state changes to contracts. Non-contracting parties may validate. In one embodiment, a BDL may be used to store and validate all state changes to a contract using a consensus algorithm/logic. Data committed to the BDL may use sophisticated key derivation functions or another appropriate mechanism to encrypt data (e.g. content, functions, invocations, etc.) so that non-contracting and non-permitted parties may not view the data committed from the contract to the BDL.

3.5 Contract State Updates

A 'State Transitioning System' provides a system to version each data-driven contract or programmable clause in a secure and verifiable manner as its state changes (e.g., terms update, obligations are performed, outputs from the contract are performed). The contract State Transitioning System functions as a record of state changes in a contract. The contract State Transitioning System preferably stores version changes in different programmable clauses, and other data pertaining to the execution of one or more contracts. More specifically, a contract state object recorded by the State Transitioning System can include metadata relating to any change or action of a data-driven contract including data inputs used in driving a decision, active contract rules of a programmable clause, substantive changes to terms and conditions, and/or data outputs or actions resulting from some condition. The contract State Transitioning system may function with or be used in conjunction with a BDL for this purpose. For example, a BDL may be used to expose data (encrypted or otherwise) that may be accessible to non-contracting parties and/or may benefit from validation through use of a consensus protocol. Additional components may be added to the State Transitioning System to provide further functionality or incidents.

Figure 19:
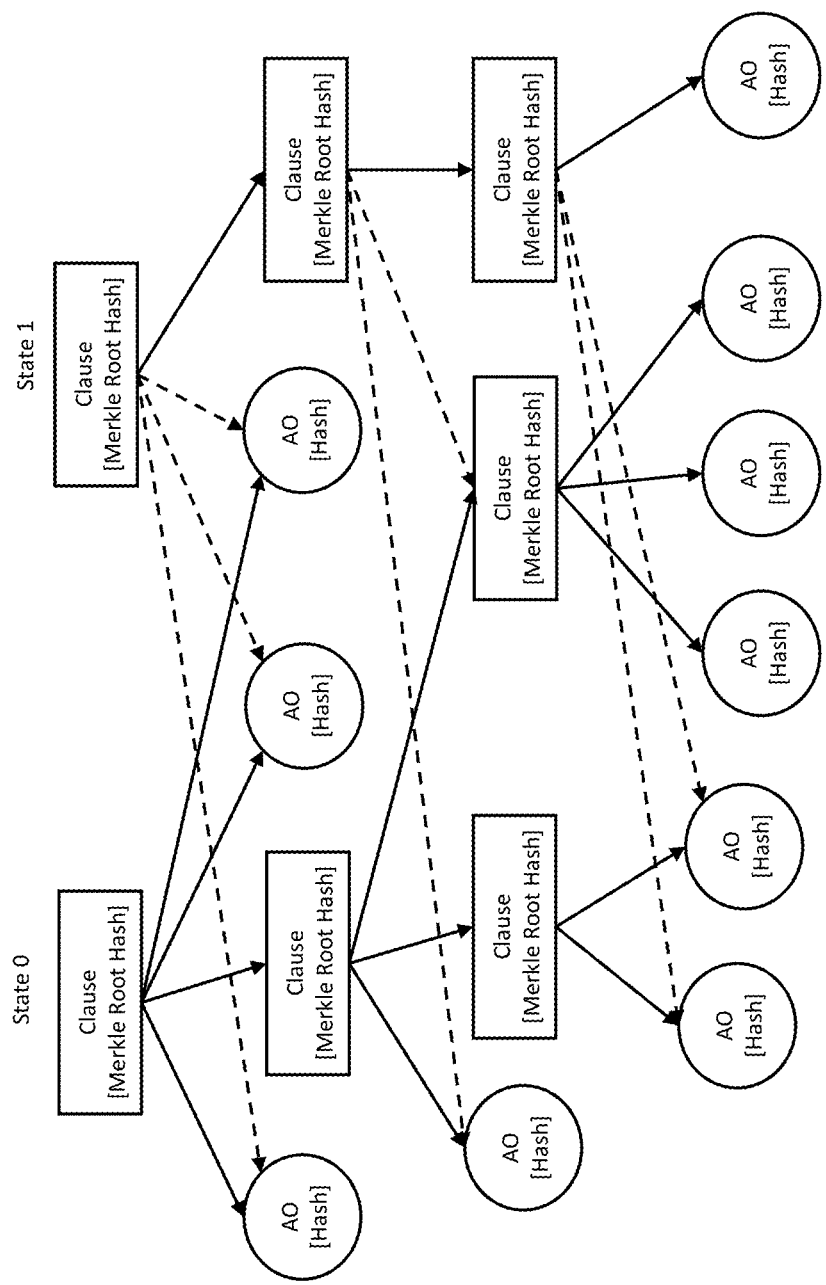
FIG. 19 is a schematic representation of a post-formation example update to a clause using the State Transitioning System.

The state transitioning system can include a data modeling system that takes the form of a Merkle tree or, preferably, a Directed Acyclic Graph (DAG) comprised of objects (nodes and edges/links) that replicate the structure of a legal contract (as shown in the example of FIG. 19). A node may represent any piece of data that pertains to the contract (e.g. an object of contract code, a state change, current state, data input to or output by a contract/clause to an external resource including a BDL, a transaction performed on an external system that pertains to the contract such as an asset transfer on a BDL or payment via API, etc.). Each node is preferably immutable, identified and content-addressed by a cryptographic hash of its contents. A DAG will have edges/links between the objects. When a programmable clause or programmable component performs an operation (e.g. outputs data to an external API) or changes state (e.g. the price decreases), the State Transitioning System is updated with this data/metadata. Preferably a new node object is added for each operation, update, event etc. Each change is preferably linked to nodes representing previous states as well as to atomic objects on which it depends for input (and metadata relating to the change/new event), thereby providing a complete immutable chronological record of the state of a data-driven contract as it changes over time. Contracting parties are therefore able to verify and 'replay' the cause of any changes to the state of the contract. In a given embodiment, any object type, data, properties, metadata pertaining to objects, may be stored in the DAG. A Merkle edge/link is a cryptographic graph edge hash (e.g., SHA-3, SHA-256) referencing or otherwise defining a relationship with another object and represented by the hash of the target object, and embedded in the source object. Other types of edges may be used in alternative embodiments. Any suitable form of relationship between objects may be represented (e.g. transactions, amendments, events, inputs, outputs, state updates, and many more). Each relationship type may have sub-types (e.g. 'events' may be further divided into contract events such as termination, processing events such as data being pushed to an external resource, etc.). A 'Merkleized' data structure may be used to verify the integrity of the data stored in a distributed manner across multiple hosts in a network (i.e., detect inconsistencies between replicas), to reduce the amount of data transferred to compare the data blocks (i.e., the entire data set does not need to be transferred between machines to compare), and to efficiently check that a set of files or one very large file has not been modified (e.g., in a peer to peer scenario, being able to query a trusted host to ensure that the data being receiving from a peer has not been modified).

A DAG storage system is preferably physically stored at a location accessible to each involved party. Storage may be centralized, federated, or fully decentralized and replicated as in the case of permissionless BDLs. The storage medium may take any appropriate form but may include (but is not limited to): databases, graph databases, Interplanetary File System (IPFS), and others. The DAG may be hosted on centralized server, server cluster, or may use a decentralized protocol/architecture (e.g. IPFS), or any other appropriate mechanism. A DAG storage system is preferably configured such that: the data stored is content-addressable through universally unique identifiers (UUIDs) or other suitable uniquely identifying mechanisms; the UUIDs have Merkle links between relevant data objects; and involved parties have same or similar access to the data storage medium.

The objects stored in the Merkle DAG storage systems are preferably static and immutable. As such, the versioning systems preferably stores objects that are atomic in nature (see FIG. 19), meaning that they represent the smallest indivisible and persistent piece of data related to executing the contract (e.g., the input used in executing the contract and changing the state of the contract that defining logic and actions). When contracts get updated, only the atomic objects change, while the remainder of the data stays unchanged. When contracts update, a new Merkle root is created by the versioning server which links to all new/updated objects. A Merkle root is a node in a hash tree that may be used to verify integrity of other objects.

Preferably all data is added in an 'append-only' manner. Data may be queried via API (or any other appropriate means) for display on contract management platform dashboards, use by contract logic (e.g. where current and historical data is needed), and other applications.

Data from the State Transitioning System (e.g. state updates objects, transactions etc.) may be added to one or more BDLs to share state with other parties/systems, to perform transactions (e.g. by passing objects to BDL code), or any other suitable application. Alternatively, where a State Transitioning System is not used in a given implementation, data may be passed added to one or more BDLs.

Figure 14A:
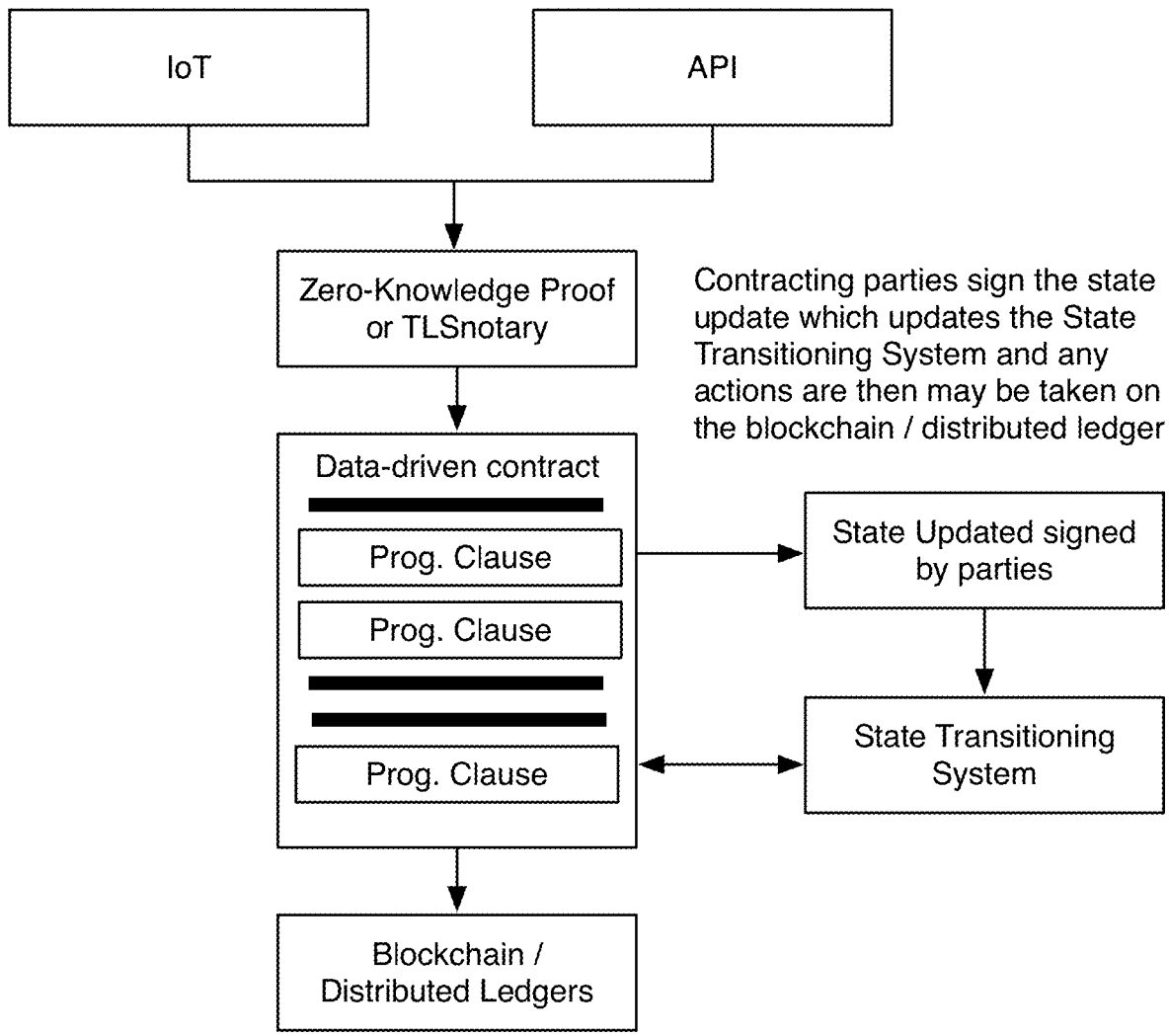
FIGS. 14A and 14B are flowchart representations of variations of implementing contract state changes.

The DAG structure enables 'transactions' that occur as a result of the interaction between programmable clauses and data inputs (e.g. function calls by external data, state updates from contracting parties, updates triggered by another clause, etc.) to be stored in a manner that records the chronological history of the data-driven contract in 'real-time'. Atomic objects whose versioning depends on contract logic can be automatically changed and versioned by the system. Objects which depend on external data (such as, API integrations, BDL scripts on BDLs etc.) are changed and versioned depending on the provider of the external data. External data can drive internal contract data changes. Changes may be automated or require the permission of one or more contracting parties and/or third parties before taking effect. The event stream versioning system can act as a record of the external data used in determining contract state. Where a BDL is used in a given State Transitioning System implementation, an 'off-chain' option may operate by locking part of the BDL state through multisignature or a form of 'on-chain' permissioning or other logic so that a specific set of participants must agree with each other to update a BDL state. Participants then update the state amongst themselves by constructing and signing transactions and other contract updates that could be submitted to the BDL, but instead are held temporarily. Each new update may override previous updates. These update the corresponding versioned contract data stored on the State Transitioning System as described herein. This may be used for transactions between contracts and APIs (e.g., web-service APIs, IoT platforms etc.). The contracting parties (or any other third party permitted to do so) then submit the state back to the BDL, which unlocks the state again (usually in a different configuration than it started with). An indicative example of this process is shown in FIG. 14A, contracting parties may cryptographically sign updates through contract state updates. A contract state update can act as messages sent to programmable clauses and that act as function calls to perform actions. Parties sign the state or state transition, which when valid according to the logic of the state update accordingly updates the State Transitioning System, and any actions are then taken on the BDL, where applicable.

Figure 14B:
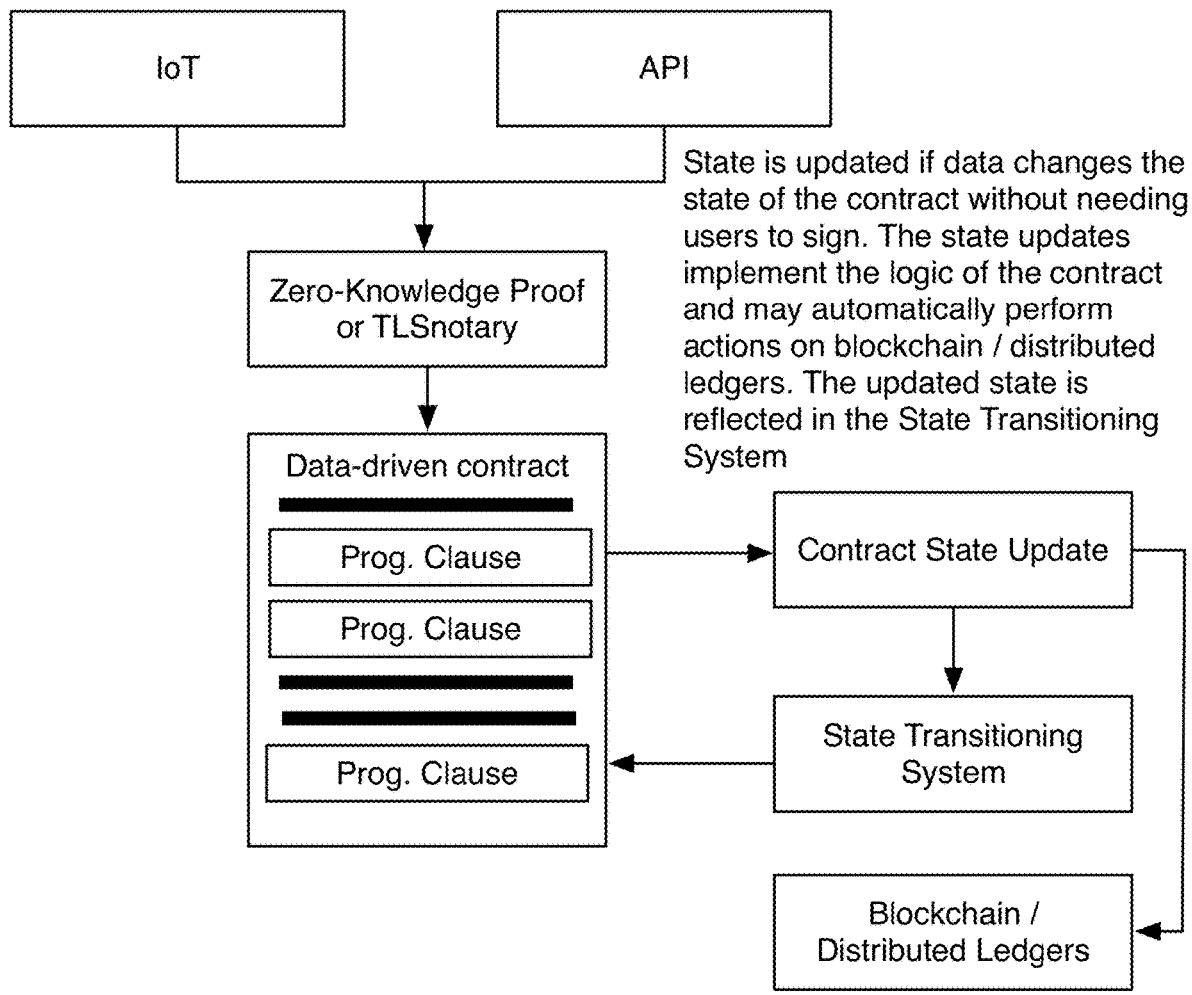

In another variation shown in FIG. 14B, contract state updates may be programmable. Contract state updates can be automatically and/or conditionally updated if data changes the state of the contract. There may be no need for parties to manually sign each state change. The contract state updates implement the logic of the contract and automatically performs actions on a BDL if necessary. The updated state is reflected in the State Transitioning System.

A party or entity with access to the contract may not be authorized or permitted to know some set of state information and/or data input information. Selective state sharing can be used so that a party is shared the appropriate information and visibility into the data-driven contract and its associated data inputs, events, and actions. In some variations, a party may be requested to verify if states consumed by a given transaction (e.g. in a UTXO BDL model) have previously been consumed as opposed to the validity of the transaction, which may enable enhanced privacy and scalability of the design. The external data that is input to the data-driven contract may be verified through using zero-knowledge proofs (or similar) by which one party (the prover) can prove to another party (the verifier) that a given statement is true, without conveying any information apart from the fact that the statement is indeed true. A process using zero-knowledge proofs can function to prevent sensitive data from being shared with other parties of the contract.

In one implementation, the external data may integrate with the data-driven contract by means of event streaming processes and/or Complex Event Processing ('CEP') that enable real-time intelligence to streaming data, making it easy to identify complex sequences of atomic events, such as aggregates, derivations, patterns, abstractions, relationships (e.g., causality).

3.6 Programmable Clauses and Legal Logic

The programmable logic may, in part, also include legal logic, which may characterize conditions, rules, actions, and/or other aspects relating to compliance of a legal or rule-based framework. The legal logic may make use of legal references. The programmable logic and/or legal references may function to ensure the contract is not only maintained based on agreement between the parties, but that the terms and conditions of the contract are maintained in compliance with relevant laws and regulations. For example, changes in one programmable clause can result in the updating or otherwise changing of other programmable clauses. The augmentation of one or more clause may be based on predefined conditions or dynamically detected conditions (e.g. from an event streaming engine). Changes, updates to the contract may be treated as state updates, and thus may: (a) be permissioned (e.g. requiring m-of-n parties to sign off); (b) may use a BDL for this purpose; and (c) state updates relating to legal logic may also be pushed to a BDL. The legal and/or business logic can be used in verifying compliance and updating the contract or individual clauses. Conditions and functionality of the contract may be limited by the system's pre-set requirements based on internal company approvals, applicable law (e.g. standards from statute and/or case law), and other external standards embedded in the clauses through legal logic. For example, a programmable clause may include a legal logic reference to the U.S. Bankruptcy Code to determine whether the contract should notify parties to perform some action terminate based on data from an accounting API integrated into the programmable clause. Parties may reflect a change by way of state update (e.g. specifying a new applicable interest rate). Updates to the programmable logic may then be reflected in the logic of the contract (e.g. a change in a legally permitted interest rate when signed off by the parties may update the payments calculated in the programmable clauses and paid under the contract e.g. via a payments API or pushed to external systems.

In one variation, a programmable clause can include legal logic that is configured to import language or data from a legal reference, wherein the imported language may change in response to changes in law. The mechanism for processing legal logic can be achieved through various approaches. In one variation, legal logic can be implemented through programmable logic of a programmable clause. For example, a creator(s) of a data-driven contract may set programmable logic of a programmable clause to pull data or information from one or more outside regulatory sources (e.g. via API, a Legal Logic engine, etc.). In another variation, a contract management platform may facilitate a more readily accessible mechanism for specifying legal logic. In this version, updates may be more seamlessly applied to all contracts on the platform. For example, the contract management platform may provide modular components that if used within a programmable clause will automatically (either with or without party sign-off) update the programmable clauses as they are found within contracts (e.g., for the involved parties and optionally in other contracts of other user accounts) accounts when a law or regulation changes. The legal references can be used to import and update appropriate portions of the data-driven contract. Similarly, portions of a first data-driven contract can be referenced in a second data-driven contract.

3.7 External Resource Interfaces

Similarly, aspects of a programmable clause may result in updates to an external resource. For example, an external third party service may be updated by the contract (e.g., via API or other appropriate method or means) when the state of a clause changes. In another example, an accounting and/or invoicing system may be updated when the price/value in a data-driven contract changes. Changes in external data may also automatically cause new clauses or other objects to be added to, edited, or removed from a contract, including changing a party to a contract (novation). Changes in one clause may cause change in other clauses or objects according to a predetermined relationship.

Figure 2:
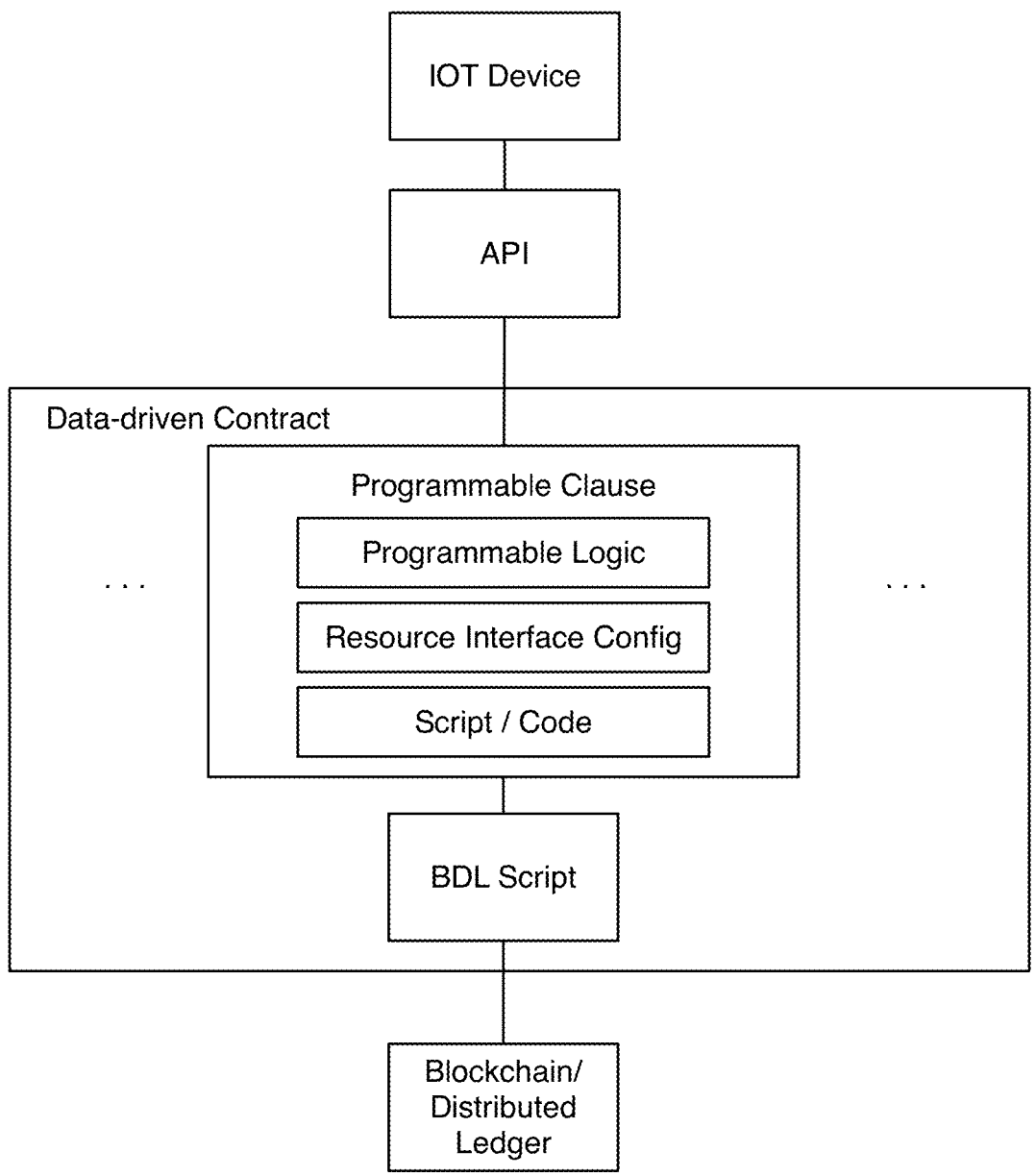
FIGS. 2-5 are block schematic representations of elements of a data-driven contract.

Additionally or alternatively, a programmable clause can include a resource interface as shown in FIG. 2, which functions to reference or link to a service or computational resource. The resource could be an external service, device, BDL, API, network, system, application, a network-connected device (e.g. an IoT sensor), or other appropriate resource. The resource may alternatively be another programmable clause or component of the data-driven contract. A resource interface can be a data input, which may fetch, retrieve, or otherwise receive external data. The external data can be a data (e.g., transactions) from BDL(s), connected clause(s), a network connected device (e.g., IoT/edge computing device), a third party service or application, a software platform, or any suitable data source. A data source can be accessed via an API, a notification service, an application layer protocol request-response transaction (e.g., an HTTP-based request), or accessed in any suitable manner. TLSnotary (or a similar form of cryptographic proof mechanism) may be used to verify the data input to a data-driven contract. Data input may be logged so as to provide verification of compliance to the terms and conditions of a clause. In one variation, data can be logged and securely stored in a trusted database of the platform or of an external data warehousing system. Such trusted data storage may be useful for particularly large datasets. In another variation, data can be logged to a BDL, which can mitigate dependence on entity trust. For example, data can be exported as a transaction on a BDL.

A resource interface can additionally be an output wherein data or directives can be transmitted to another resource. Output data and/or directives may be transmitted to a network-connected device, to a third party service via an API (e.g., an accounting service, payment service, analytics service, etc.), a BDL, database, and/or any suitable resource. For example, a clause determining payment may update accounting software (e.g., via an API) if the pricing changes (e.g., in response to changes to a delivery clause or another clause) and/or may send payment via a payments service (e.g., see FIG. 15). The system and method can utilize various approaches to addressing concerns of automated payments or other actions based on an automatically updating and executing data-driven contract, including through use of manual state update signatures, programmable state update signatures, and use of a State Transitioning System.

A resource interface can additionally connect a first clause to at least a second clause. This connectivity can enable a natural language reference to other clauses as may be done in static, traditional contracts, but also enabling changes in one clause to automatically update and/or trigger operations under the logic, possibly in real-time, based on changes to another clause. Connecting clauses in real-time may also be effectively achieved with a set of separate clauses connected to the same external resource so that each clause is updated in response to new data from the resource.

Figure 3:
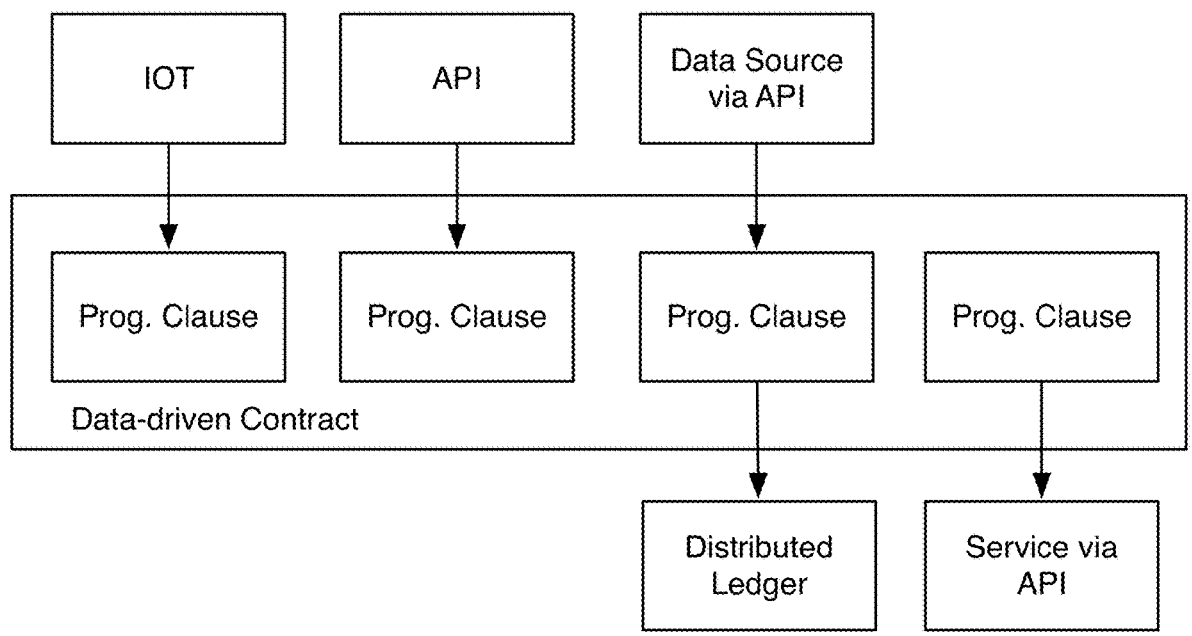

Each of the programmable clauses can be individually configured with different resource interfaces (e.g., various data inputs and/or outputs as shown in FIG. 3) configurable components, and/or properties. Additionally, a data-driven contract may be configured with any suitable set of clause types. Within the set of clauses in a data-driven contract, a subset of programmable clauses may be implemented in association with a contract and a second subset of programmable clauses may provide other functionality (e.g., IoT device integration, API integration, self-managing functionality, inter-clause functionality, and/or other types of functionality). The data-driven contract can additionally include static or natural language clauses.

3.8 Use Cases

Figure 4:
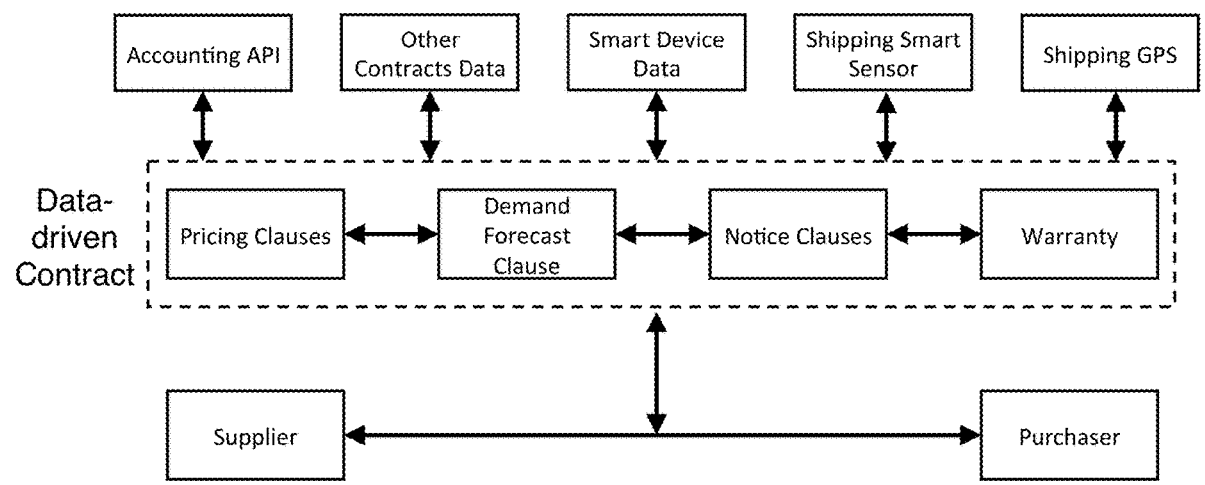

Programmable clauses can be used for a variety of use cases as discussed above. In one example shown in FIG. 4, a data-driven contract can be established between a supplier and a purchaser of goods. As a first exemplary programmable clause, a pricing clause can adjust in response to delivery conditions (e.g. delivery date, vibration, temperature and humidity in a shipping container as measured by IoT-enabled sensors) or device failure rate/performance. As a second exemplary programmable clause, a notice of delivery or rejection updates a purchaser based on data about the geolocation and shipping conditions (e.g. temperature, humidity etc.); which may be an input to the first clause. As a third exemplary programmable clause, warranty terms can adjust based on device performance data. In yet another exemplary programmable clause, supplier stock requirements can adjust based on previous demand forecasts, inventory costs, or shipment times. Programmable clauses may be used for a wide variety of applications.

Figure 5:
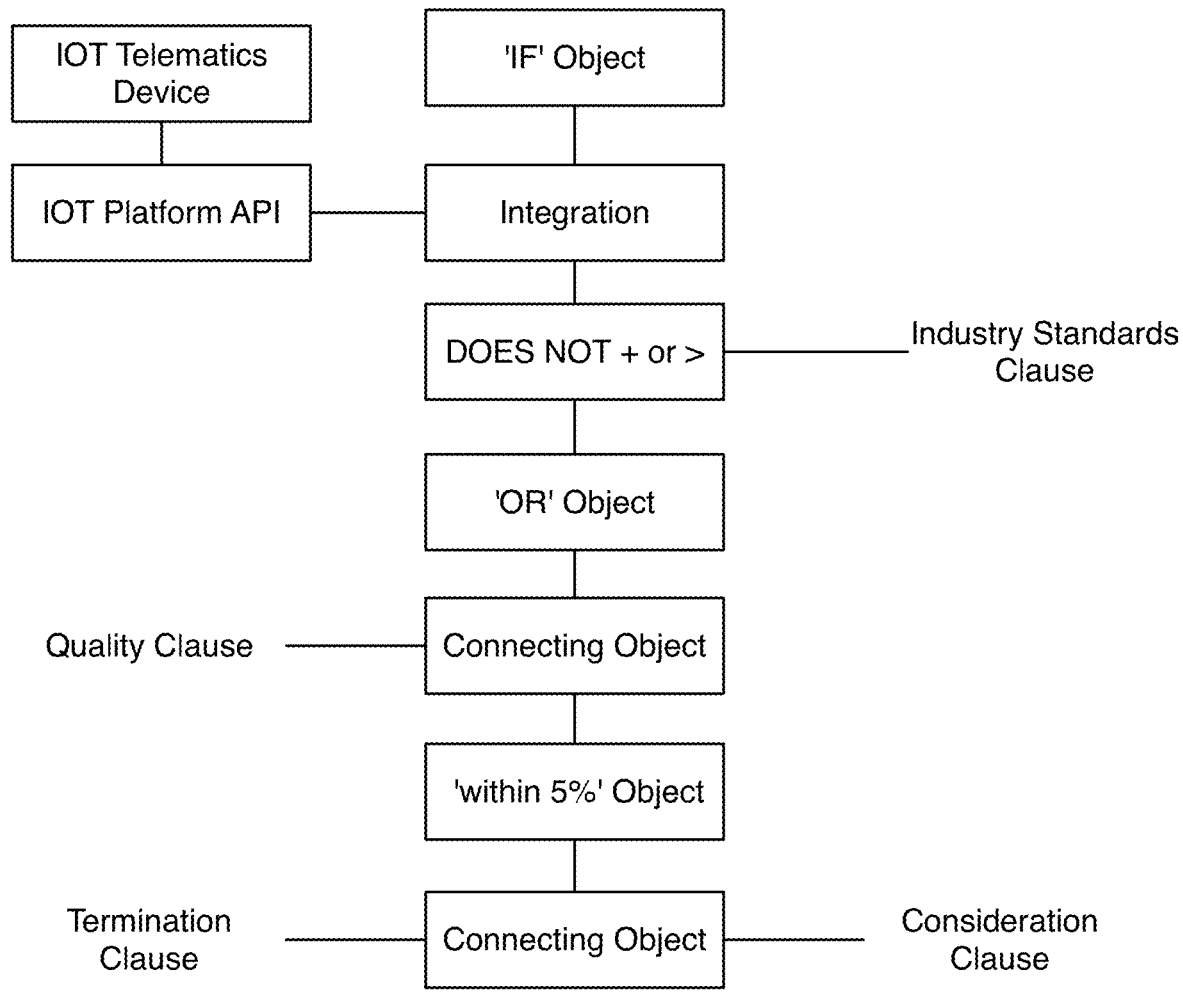

In another example, a data-driven contract can be applied to a warranty agreement. As shown in an exemplary representation of FIG. 5, a data-driven contract can address the contractual obligations of delivering goods through conditional statements that can be used for customizing a data-driven contract. Such a user interface is one optional implementation and is not intended to limit the system and method. In this example, if goods purchased from a third party are stored in conditions that do not meet criteria set out in industry guidelines or consistent with a quality clause, then the consideration payable under the pricing clause in the contract may be reduced (e.g. by 5%) in accordance with the provisions set out in the consideration clause or the contract may be terminated at the election of the counterparty.

Another example may be a Service Level Agreement (SLA) for a IT infrastructure. Application health data and/or server uptime data may be used to assess compliance with a 'performance requirements' clause. Where a breach of a performance requirement occurs, this may update a second, 'service credits', clause to issue a discount/credit. This may in turn be used by a third, pricing, clause, that applies the credit against the price payable under the contract based upon the logic.

Yet another example may be an employment contract or contract for services in which a first clause uses data about hours worked (e.g. from a time tracking application/service or device) to calculate a worker's payable compensation under the contract. Data from the contract may then be pushed via API through to a payroll system and payments may be automated or triggered by users of the contract management system.

4. Contract Management Platform and Contract Creation

As shown in FIGS. 1A and 1B, a system for creating data-driven contracts with programmable clauses can include a contract management platform configured for the creation and management of a data-driven contract. The system can facilitate the formation of a data-driven contract and/or the performance management of the contract. The system can additionally address other portions of a contract lifecycle including re-negotiation and amendment and/or termination of a contract. The system can function to enable contracts to be at least partially autonomous or self-managing, and the system can facilitate the creation and operation of legally enforceable contracts with data-driven and dynamic terms and conditions. The system may be used to at least partially automate business decisions, workflows, and other processes analogously to business process management systems. The dynamic contract terms and conditions can be integrated with a multitude of data sources, software applications, devices, business process management systems, and/or other systems. The system can additionally function to provide a more accessible interface for utilizing data-driven contractual agreements between contracting parties and other entities.

Figure 20:
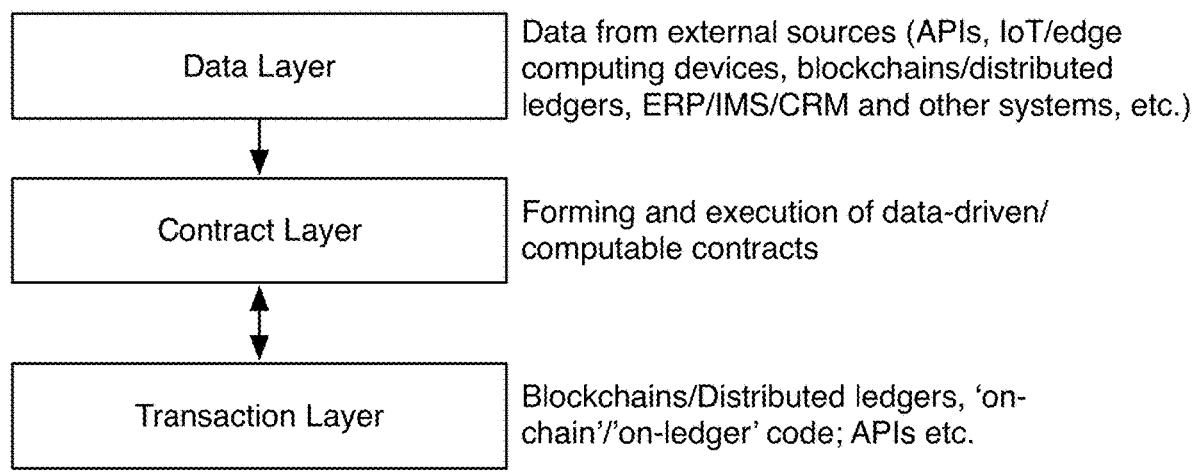
FIG. 20 is a schematic representation of a layers of the system.

As shown in FIG. 20, a system for data-driven contract can function to facilitate interactions of a data-driven contract across different layers of a system stack: a data layer, contract layer, and a transaction layer. A data layer can include data or functional calls coming from a variety of sources such as internal sources, external sources, BDLs, party-initiated function calls or state updates, and the like. The contract layer can manage the formation and execution of the data-driven contract and interactions with the data layer and a transaction. The transaction layer may be used in managing transactions with BDL systems, BDL scripts, APIs, and the like.

A contract management platform of a preferred embodiment functions as a system for creating, managing, and enabling data-driven contracts. The contract management platform is preferably a multitenant cloud hosted platform. Alternative implementations may be a peer-to-peer computing infrastructure with client applications facilitating user interface interactions. In another version, the contract management platform can be a cloud hosted platform that oversees, manages or interfaces with a peer-to-peer networking solution used in executing a data-driven contract. The contract management platform can include an account system such that various parties can create and manage data-driven contracts. Preferably, an external identity system may be used to verify users (e.g., a BDL/decentralized application or App) or centralized system (e.g. professional social network, single sign on system, 2FA system, etc.). Alternatively, the contract management platform could be an on-premise or private cloud computing system. For example, an enterprise may implement the contract management platform for internal usage. In another variation, the contract management platform may be an application or tool used and operated by a single entity. In yet another variation, the contract management platform and/or parts of the contract management platform may be implemented through a distributed computing architecture or peer-to-peer infrastructure (e.g., InterPlanetary File System and/or the server/VM architecture mentioned above). The contract management platform may include a user interface. The contract management platform may alternatively include or be implemented through an API. In some variations, the contract management platform may be optional.

An account holder preferably initiates the creation of a data-driven contract. Other contracting parties, participants and involved stakeholders can be invited and permitted to edit/negotiate, comment, sign/execute, view, or otherwise interact with the contract. The contract management platform preferably includes a contract editor interface for the creation of a contract and a contract execution system for processing, monitoring, or enforcing the active use of the data-driven contract. Permissioning may be implemented to manage rights to edit the contract and its configuration. In a preferred embodiment, contracts are formed using a version control system.

Figure 6:
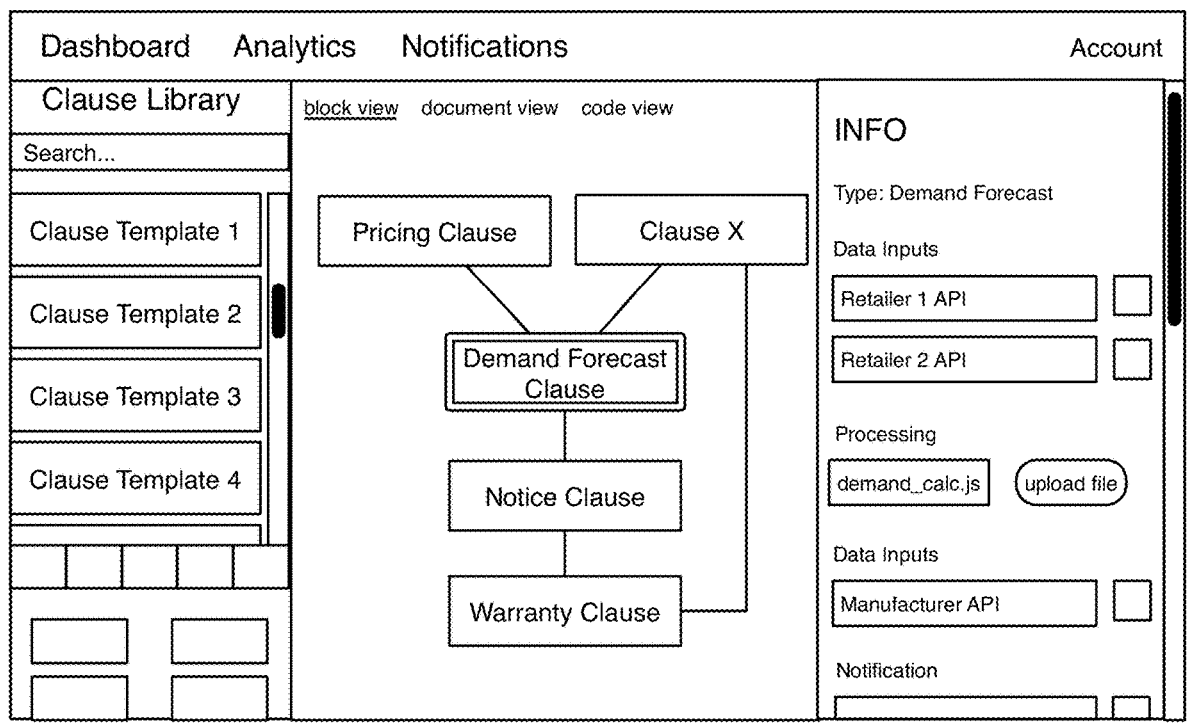
FIG. 6 is a schematic representation of an exemplary graphical user interface.

As described above, the contract editor of a preferred embodiment functions to create a data-driven contract. A contract editor can utilize a variety of user interface approaches. One embodiment of the contract editor is a graphical user interface, which may utilize a drag and drop interface in constructing a data-driven contract. A graphical and/or programmatic interface can enable users to create contracts by either selecting from a library of contract and/or clause templates, editing a contract template, or creating a contract de novo by selecting clauses and other objects and connecting and configuring them using the interface such as the example shown in FIG. 6.

The contract editor interface can include a set of selectable contract and/or clause templates, components, samples, or patterns that can be selected and used within a contract. Additionally, a clause may be created manually without the use of a template, including through use of NLP processing. In one variation, a user (e.g. a contract manager or legal professional) may use natural language tools to draft a document with integrated programmable clause functionality (e.g., through use of programmable components or by integrating programmable clauses with natural language clauses). In another variation, a user proficient in programming may build a contract using programming interface tools (e.g. an IDE). Templates may be used by any suitable interface. The template elements can be provided by the platform, offered within a marketplace or exchange, external platform or code hosting system (e.g. Github), or account created.

A data object or model for a programmable clause will generally include a set of properties and/or configuration options. A user can set those various attributes through the user interface. As an alternative to a drag and drop interface, the graphical user interface may alternatively use input forms, a text editor, or other suitable forms of user interfaces. The graphical user interface may be accessible through a browser based application or website, a native application, API, or any suitable application.

The text editor user interface may include natural language processing, a scripting language syntax, or other text-based directives for incorporating programmable clause component. In one variation, a clause can be constructed with written language. The programmable components can be integrated by using particular syntax markers to invoke functionality. For example, a forward slash mark may trigger display of a variety of programmable clause functionality. A user may type a forward slash, followed by the name of a data input module to setup a data input, add a programmable component, or otherwise define programmable clause functionality. Programmable clause functionality may involve specifying conditional statements, importing data from a particular source, exporting data to a particular source, performing a calculations or routines, configuring the programmable clause, or using any suitable programmable clause feature.

The user interface can additionally support a programmatic interface, which may use predefined programming syntax for defining, constructing, or otherwise interacting with a contract or clause. The programmatic interface may utilize script interpretation, program language interpretation, natural language processing, markup language interpretation, and/or any suitable programmatic mechanism. The programmatic interface can be a command line interface, programmatic document processing interface (e.g., an IDE), or an API. Outside services, applications, or devices may generate, instantiate, and initialize execution management of a contract through use of the programmatic interface. A user could additionally use a programmatic interface in editing or constructing a contract.

In one variation, a set of different types of interfaces can be used within a platform. Furthermore, more than one type of interface may be used in creating a single data-driven contract. For example, an initial data-driven contract may be established using a programmatic interface, but an administrator may subsequently review and edit a subset of the programmable clauses using a graphical user interface.

The contract editor interface may include an entity approval system, which can be used to manage versioning, negotiation, and eventual agreement on a set of clauses and/or the contract. Cryptographic or other digital signatures, initials, and information can be collected from the involved parties and recorded as electronic signatures. Upon approval of one or more clauses, portions of the contract may be committed as a transaction to one or more distributed ledgers or version controlled within the platform. Renegotiation or amendments can additionally be facilitated by the entity approval system.

The contract management platform may also include a system for viewing contracts in source code, natural language or a hybrid. The contract may be displayed in any suitable way and may be augmented by graphic to display data pertaining to the contract. For example, up/down 'ticker' arrows, and trend lines may be used to display movement in values (e.g. prices). Contracts may also make use of markup languages for formatting, Markup may be defined without option by the contract management platform, set by users in the contractor editor, or alternatively defined programmatically (e.g. through use of the IDE).

In some embodiments, the platform may be used exclusively for the creation of data-driven contracts or for the execution of existing data-driven contracts. Preferably, the platform facilitates creation, editing, and execution of the contracts. The platform can additionally include a contract execution system, which functions to enforce or otherwise process a data-driven contract. The contract execution system facilitates the collection of data, the verification of programmable clause business logic, updating of legal contracts and their clauses, storage of data, exporting of data, and communication with external resources/services. The contract execution system can include a platform service and/or a BDL interface. The platform service can be used in processing and managing a programmable clause or data-driven contract within a trusted computing architecture, such as within the cloud hosted computing platform or distributed/P2P architecture. The BDL interface can commit informational transactions and/or logic execution to a BDL. The platform service and the BDL interface may be applicable to different scenarios depending on the data volume, computational complexity, party trust scenarios, and/or other aspects. A platform service may be particularly applicable for contracts that are dependent on large amounts of data or computationally intensive tasks.

A BDL interface (e.g., a distributed ledger interface or a blockchain interface) may be particularly useful in decentralizing trust and ensuring verification of data. The contract management platform provides an abstraction layer for interacting and interfacing with the distributed computing system. In another variation, aspects of a contract or clause may be converted to a cryptographic receipt of some portion of the contract. For example, a hash of an agreed upon clause, or a hash of a block of data may be committed to a BDL as verification of the state without exposing sensitive information. The contract execution system may be a hybrid contract execution system where a subset of programmable clauses is processed within a platform service and a second subset of programmable clauses utilize a distributed ledger. Multiple BDL instances and/or protocols may be used by any given contract.

All or part of a clause can be automatically configured for execution by a platform service or a BDL. In one variation, the use of a BDL for execution may be a user configurable option within the contract editor interface.

The system can additionally include a platform account portal, which functions to enable administrators and involved parties to review and manage one or more data-driven contracts. The platform account portal can provide contract lifecycle management, contract analytics, and other management functionality. For example, an administrator may be able to query active contracts based on state of a warranty programmable clause, changes in certain metrics (e.g. price, humidity, temperature, time outstanding until delivery etc.) directly from the contracts. The same may also apply to historical datasets (e.g. non-active contracts). The State Transitioning System may be used to provide such data.

Figure 16:
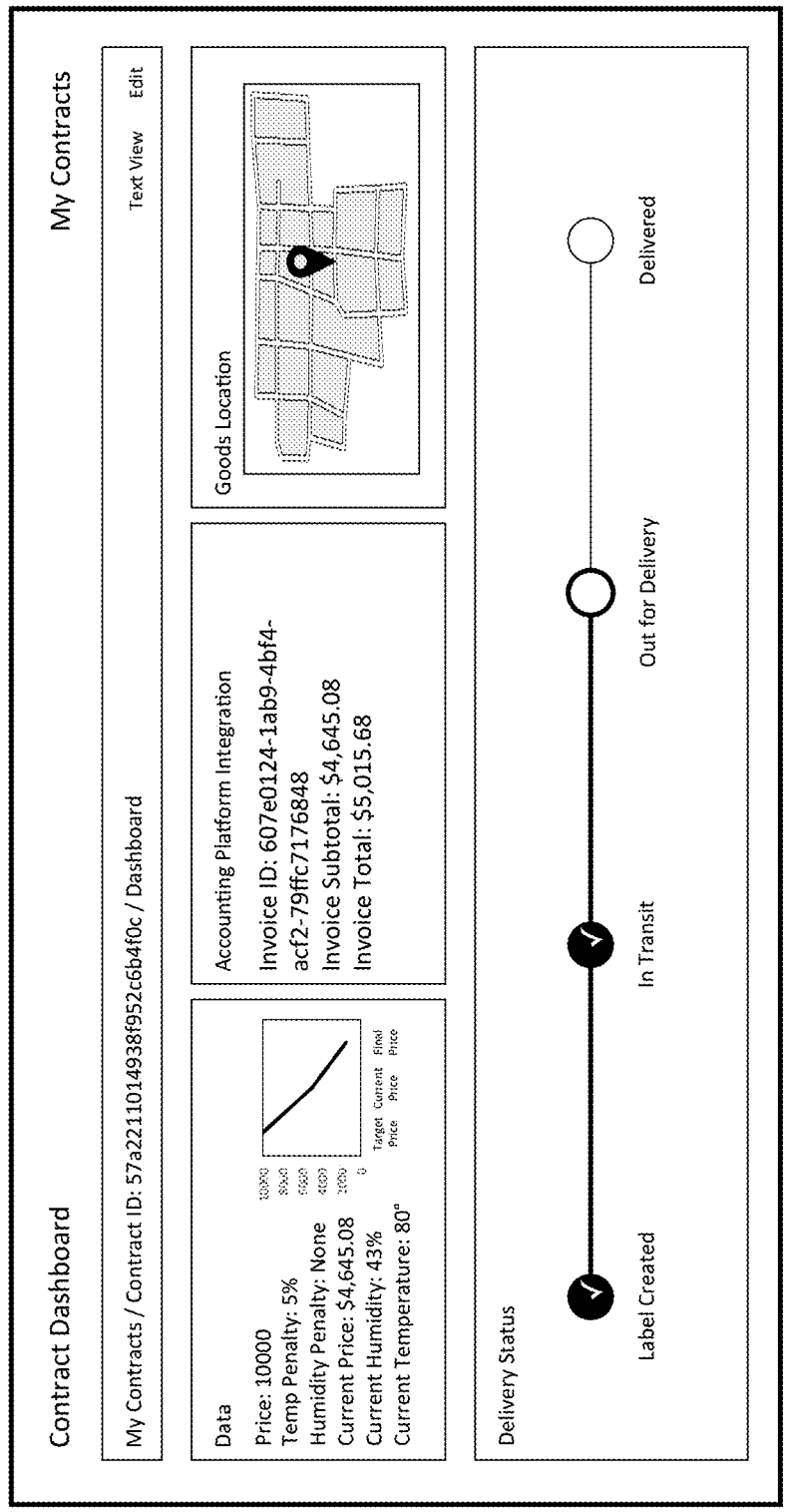
FIG. 16 is a graphical representation of an exemplary GUI dashboard for a data-driven contract.

The platform may also provide a dashboard view of the state of a given contract (see FIG. 16) based on the interaction between the contract and the input/output data sources and resources. For example, a contract dashboard may display the geolocation of goods, the inputs to a price clause and the effect on the price, as well as the relationships between clauses e.g. the effect of the change of state of one clause on other clauses. This may be preferably displayed as a GUI dashboard composed of various 'widgets', graphs, charts, and graphics representing data for each clause (e.g. temperature (shipping clause), geolocation (delivery clause), invoice value on an accounting system (price clause). GUI dashboards may also be used to provide aggregated data of a defined corpus of contracts (e.g. all active contracts, active contracts with a given counterparty, contracts with penalties, delayed contracts, completed contracts, etc). Parameters to define the corpus may be set by the user through the contract management platform.

The contract management platform preferably also includes a notification engine that pushes notifications to users pertaining to state changes to contracts (e.g. price changes), occurrence of contract events (e.g. breaches of terms and conditions), and other events (e.g. invoice updates). Notifications may be provided natively on the contract management platform (e.g. in a notification feed and/or via 'pop-up' messages) subscribable to via webhooks, be pushed (e.g. via API) to external systems (e.g. communication platforms, management platforms, Internet Relay Chat (IRC) applications, via email, or any other suitable means. More than one approach may be used in any given implementation.

5. Complex Event Processing Contract Execution

Figure 8:
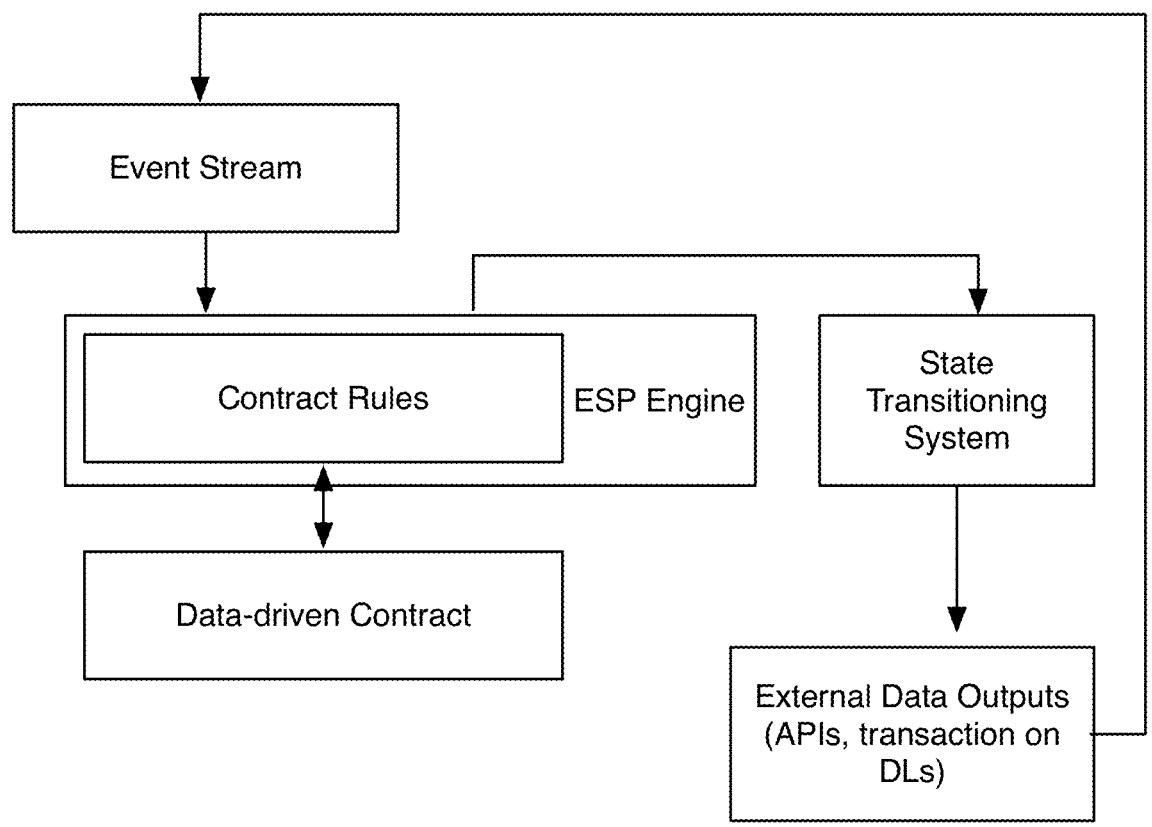
FIG. 8 is a schematic representation of a contract event processing embodiment.

As shown in FIG. 8, a contract event processing embodiment of the system can include event stream processing (ESP)-based system configured to provide data to, execute and manage a data-driven contract. The ESP-based embodiment preferably includes an event stream versioning system, a contract state versioning system, and an event processing engine that operates on contract rules.

The contract event processing embodiment is preferably used in combination with the data-driven contract and the contract management platform described herein. Alternatively or additionally, the contract event processing system may be used independently as a way of processing data-driven contracts, BDL scripts, or other forms of computable contracts. Other forms of computable contracts may be generated or formed through any suitable process or system.

The ESP embodiment functions to utilize computing technologies in the event-driven information system space to managing execution of a data-driven contract. In ESP, events are preferably atomic, where an atomic event can be characterized as an atomic state or state transition. For example, the reading of a temperature sensor from an edge computing device or a change in temperature, a notification of a transaction, and other events could be potential atomic events.

The ESP-based embodiment preferably utilizes complex event processing (CEP), which can enable the system to apply real-time intelligence to streaming data. CEP can enhance ESP by identifying complex sequences of atomic events such as (but not limited to) aggregates, derivations, patterns, abstractions, and/or relationships (e.g., causality). A CEP system can operate by performing continuous queries against incoming atomic data streams to detect predefined complex events and, upon detection, typically perform a range of given actions and operations according to predefined rules. In a preferred embodiment, predefined contract rules stem from the logic embedded in programmable clauses and drive the queries, actions, and operations of the CEP system. In an ESP embodiment, the CEP engine can process data input from IoT devices, APIs, BDLs, third party services/systems, or other suitable sources. A CEP engine can include an event receptor, an event processor, and an event reporter, and operate on an event stream. An event reporter receives events that are coming to the CEP engine. Different Event Receptor types are needed to receive events in different formats. An event stream can be streams of atomic events connected to an event. An event processor manages processes events based upon the contractual logic by getting a set of event streams from the Event Stream Manager and processes and triggers new events on different event streams back to the Event Stream Manager. An event reporter reports events to the contract, the State Transitioning System, external APIs, BDLs and systems, and stores data to databases for future analysis. In a preferred embodiment, the events are reported to the contract, which, in turn, updates the State Transitioning System and the aforementioned resources.

In one variation, semantic CEP can be utilized to further enhance CEP functionality within a data-driven contract. For example, with semantic CEP, event data can become declarative knowledge while conforming to an underlying formal semantics. As another exemplary benefit, semantic CEP can be used in improving machine understanding of various situations and states. As another exemplary benefit, semantic CEP may facilitate declarative processing of events and reactions to situations. As another exemplary benefit, semantic CEP may improve an understanding of the relationships between events.

In a first CEP implementation, a CEP engine can be fully-integrated with contract rules in programmable clauses, as shown in FIG. 13. Actions may or may not be executed within the CEP engine. In a second alternative implementation, an external system can be acted on by the logic embedded in a contract rule of the CEP engine, as shown in FIG. 14. The external system preferably drives related operations.

The event stream versioning system functions as a record of data input that can potentially be used by a data-driven contract. Data inputs to a contract can include data from APIs, HTTP clients, data from BDLs, databases, event stores, BDL 'oracles', BDL scripts, edge computing devices, analytics services, ERP, IMS, SCM, and CRM systems, IoT/edge computing devices, and/or any suitable data source. The data input sources used by a contract are preferably defined during the creation and management of a data-driven contract.

The event stream versioning system can include event filters, which function to filter out input data. One exemplary scenario use case can be for a contract farming agreement. Temperature and crop yield may be inputs to a performance programmable clause, while weight may be used for a altering price in a price clause. The weighting clause and price clause may relate to the performance clause, which relates to a termination clause. The event filters preferably decrease computational load of the event processing engine. In a first variation, an event filter can be a pre-versioning filter. A pre-versioning filter filters out data inputs prior to committing the data input to the data storage of the event stream versioning system. In a second variation, an event filter can be a post-versioning filter. A post-versioning filter, filters data input that is committed to the data storage of the event stream versioning system, but removes data input prior to deliver to the event processing engine. In this variation, a record of the data input is maintained but a subset of data input is dropped to reduce computational load of the event processing engine. Pre- and post-filters may be used independently or in combination. Other filters may be used where users deem appropriate.

The event stream versioning system and the contract State Transitioning System may operate together to provide a data record of event and contract state. The system uses the event and contract versioning systems to maintain a verifiable record of how a data-driven contract is executed. More specifically, the data inputs delivered as an event stream are stored and the state of a contract and changes in various clauses are stored. A legally enforceable contract will generally involve multiple parties with interests that are not mutually aligned. Thus the system preferably offers a reliable and trusted mechanism that a contract is executed in a trusted manner. This can be made more complex when a contract or clause depends on data that is not to be shared with another party, as aforementioned.

Figure 9:
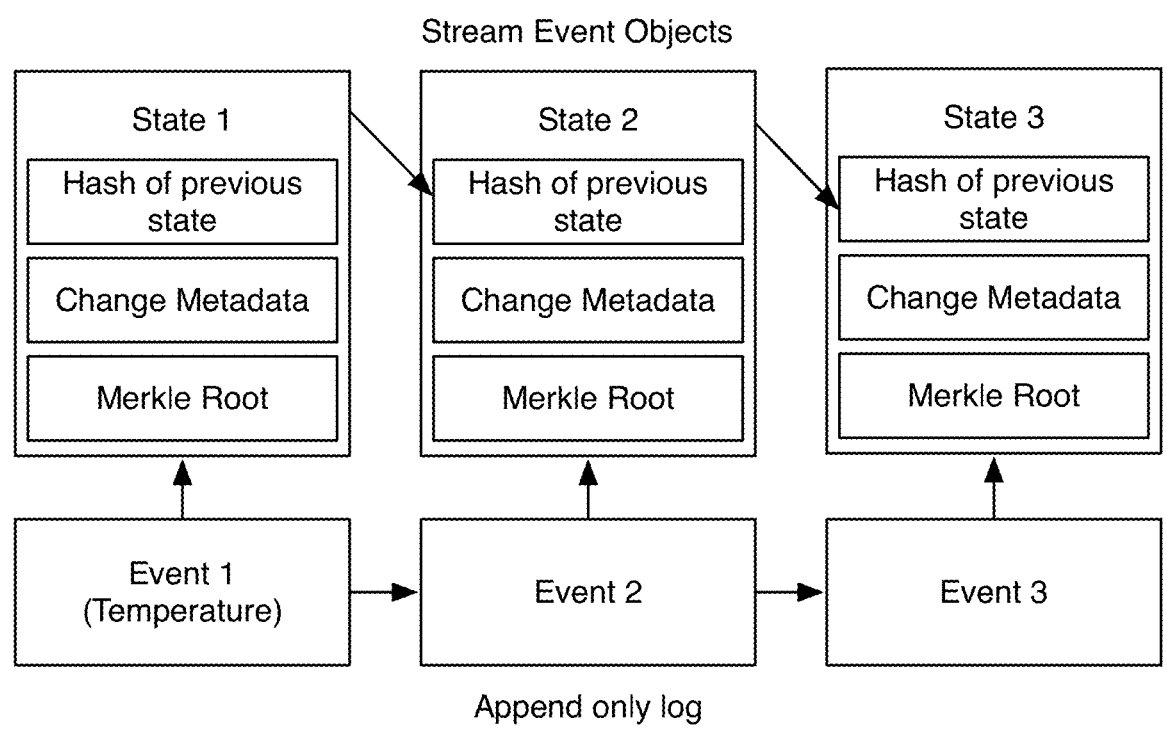
FIGS. 9 and 10 are schematic representations of a preferred Merkle DAG implementation of an event stream processing system.
Figure 10:
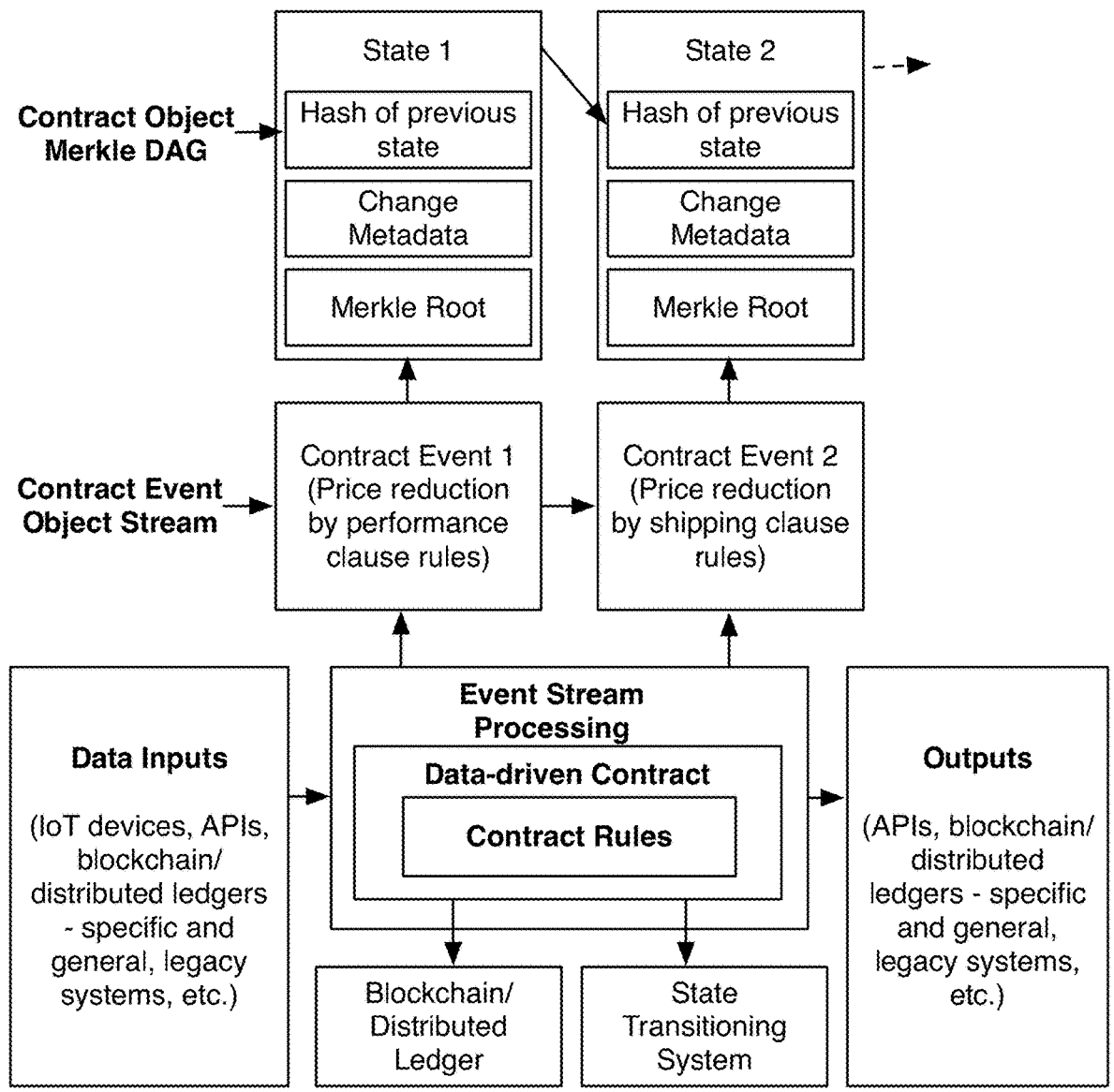

The two versioning systems are preferably cryptographically secured and auditable. Various approaches may be used, but the event stream versioning system, similar to the contract State Transitioning System, uses a Merkle tree or, preferably, a Directed Acyclic Graph (DAG) that includes content-addressed objects with Merkle links connecting the objects, as indicatively shown in FIGS. 9 and 10. As such, the event streaming versioning system and the contract state versioning system are preferably distinct data storage solutions for their associated purpose, but preferably share similar data storage structure system architectures and approaches. Alternatively, different data storage systems and approaches can be used for the event stream versioning system and the contract state versioning system. For example, event streaming data may be committed to a BDL and used as an input for contracts. More than one approach may be used in a given implementation.

The event processing engine functions to ingest data input from the event data stream and contract rules and generates an output. The output of the event processing engine can be changes in contract state and/or actions taken within the system or with an outside system (e.g., triggering an action with a third party service over an API). Preferably, the event processing engine is a CEP engine. A set of contract rules is preferably configured within a rules repository of the CEP engine.

Contract rules are preferably derived primarily, if not exclusively, from a contract and the contract logic. Primary contract rules preferably embody terms and conditions, obligations, and the like that typically form the basis of a traditional contract. Primary contract rules include background and structural rules that establish the parties and boundary assumptions of the contract such as the parties, recitals, definitions, choice of law, conflicting rules/agreements. Primary contract rules are also derived from the legally enforceable rights and duties of the parties of the agreement. Secondary contract rules help determine the primary rules and operation of data-driven contracts. Secondary contract rules may include how a change in one clause may change other clauses (or the terms and conditions contained therein) and how contract rules may be changed with "change rules", how clauses are interconnected (e.g. how the state/output of one clause is used by another clause). Other types of rules may also be used.

The contract rules are preferably generated by a contract management platform as discussed above. The contract rule may be explicitly defined by a user, but a contract rule may be automatically generated. For example, a clause template may be represented with a user interface, and a predefined contract rule template can be used to establish a contract rule based on user input to the clause template.

A contract rule preferably includes configuration specifying data input sources that can define which event stream sources are relevant to a particular contract rule. A contract rule may depend on a plurality of data input sources/resources.

Additionally, the contract rule can define the conditions and logic. In one variation, the contract rule can be a production/inference rule. An inference rules can represent behaviors of the type 'IF condition THEN' action e.g. "IF some-condition THEN extend-the-warranty-term". A second type of contract rule could be a reaction/event condition action rule. A reactive rule can involve detecting and reacting to incoming events and process event patterns. For example, a reactive rule engine could be used to alert a buyer when a shipment of goods is behind the agreed upon schedule. Different event processing engines may include different rules engines used to process such rules.

In one use case, a set of contract rules may be from a data-driven supply agreement with dynamic terms and conditions. A rule management system would manage the supply agreement's contract rules within the event processing engine. Some of the rules that comprise the rules engine would incorporate dynamic terms and conditions such that the state of the contract would change in response to data. For example, one contract rule may be that a contract's warranty extends from 12 months to 18 months in response to an external event that includes data about the quality or performance of the good and data about a relevant industry benchmark regarding the performance of similar goods. In response to data about the quality of the event and industry performance, the warranty will increase to 18 months.

As a result, the event processing engine would change the state of the contract, and the system could initiate actions and operations on external systems which may include updating an accounting ledger or warranty management system that tracks the current state of the warranty. The same data-driven supply agreement may have a contract rule that adjusts the relationship between the warranty length and data about performance/quality and industry benchmark. For example, the contract rule may extend the warranty from 12 months to 24 months if the performance/quality and industry benchmark data cross certain thresholds indicate a higher level of poor absolute and relative performance.

As another example, a programmable clause in a supply agreement may provide that a 12 month warranty be extended by 6 months if a collision sensor indicates that the goods have been in more than 5 collisions while being shipped to the buyer, but cap the maximum warranty at 24 months regardless of how many collision. Such a programmable clause may result in a contract rule that functions like: If COLLISION NUMBER from a collision sensor surpasses 5 then warranty is extended 6 months unless WARRANTY EXPIRATION is already at 24 months from date of delivery as indicated by an external API.

Another potential result of using a contract rules engine is the algorithmic functioning of contract performance, monitoring, and related actions, operations, and outcomes. Such algorithms may be used to: form contracts (e.g. other parties using the system and method), including adding parties or replacing existing parties (assignment or novation); determine open terms ("gap fill") in response to data, including updating existing terms such as price (quantitative) and text (qualitative) (e.g., change choice of law in response to new state legislation, change currency, add warranty disclaimer language); determine when to take an action (e.g., send notice, terminate, find a new counterparty); determine how to monitor or analyze a counterparty's performance (or status); renegotiate existing terms including existing algorithms; and/or perform other suitable calculations or functions.

As an example of algorithmic decision making, if supplier's goods are highly defective and below a defined industry average/metric, an algorithm in the rules engine may determine that a supplier be replaced with another qualifying supplier.

Figure 11:
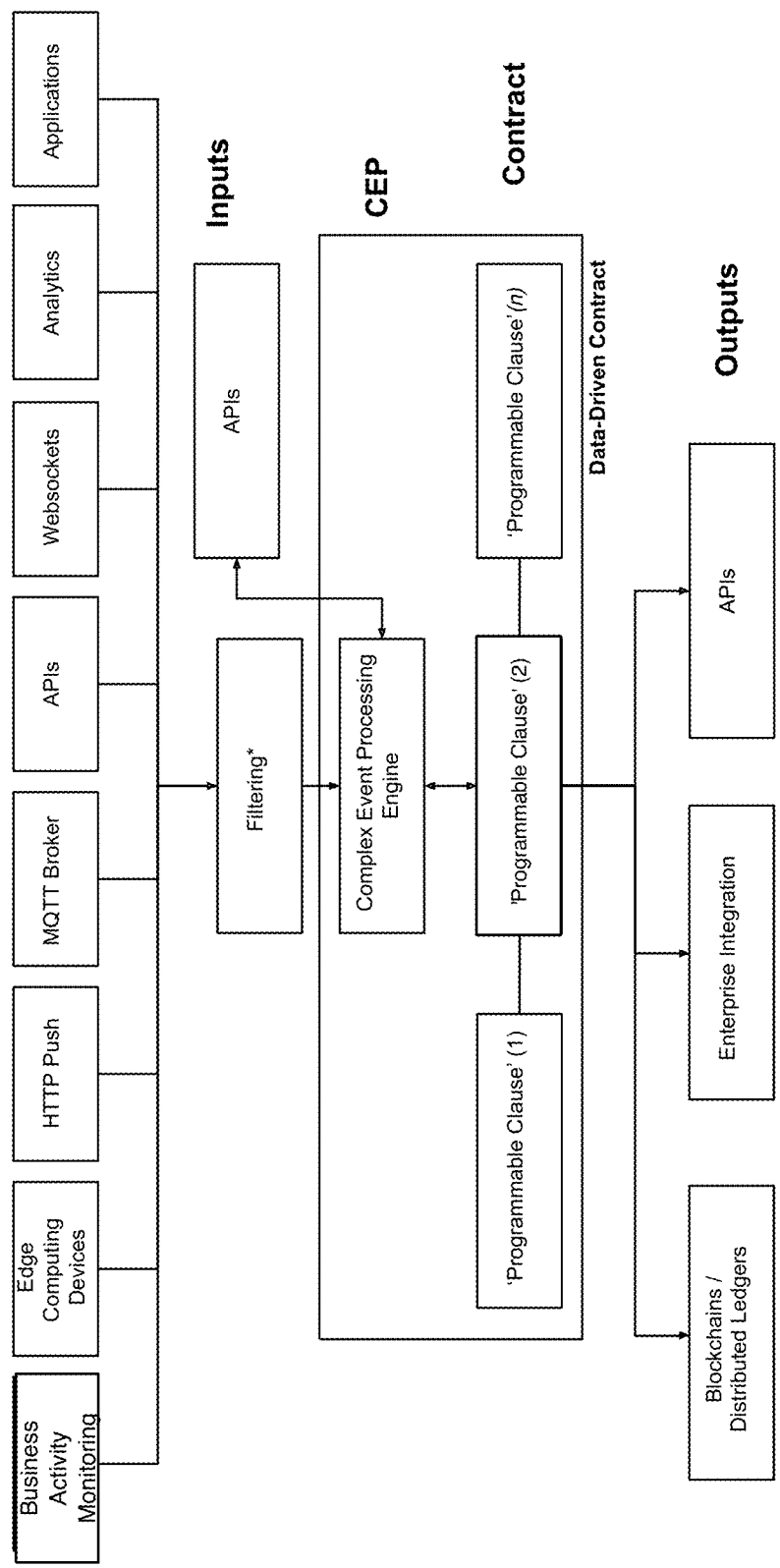
FIGS. 11 and 12 are schematic representations of variations of executing resulting actions of a contract rule.
Figure 12:
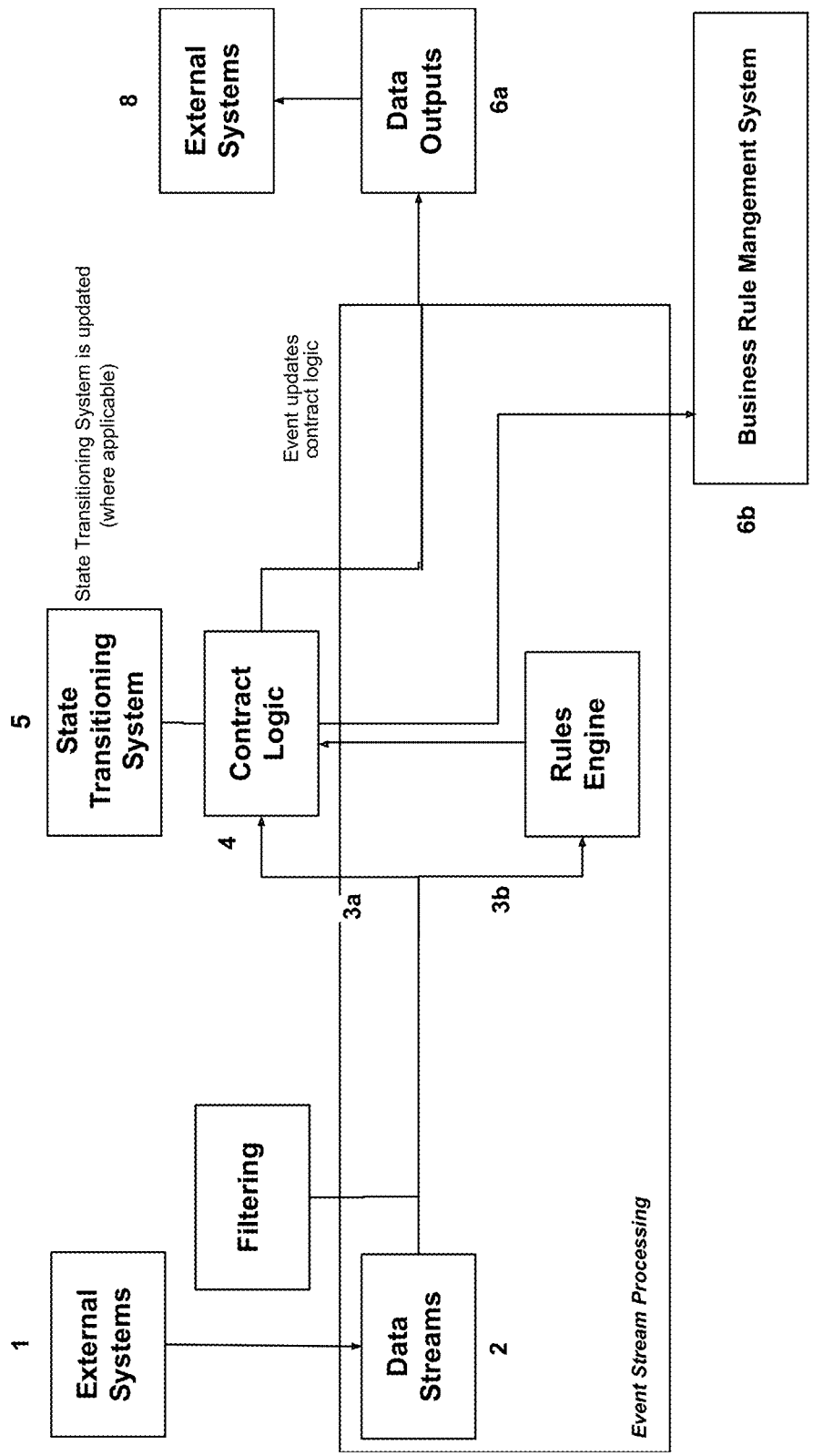

In one variation, a contract rule defines actions within the rules engine such that the event processing engine internally executes resulting actions, as shown in FIG. 11. In this variation, the contract rules and the actions triggered by those rules are fully integrated into the event processing engine. The actual logic executed and the actions performed are not encapsulated by the contract rule but can be delegated to an outside resource when an event occurs. In another variation, a rules engine external to the contract rules is acted upon by the contract rules and drives the associated operations and actions, as shown in FIG. 12. The system and method may additionally include a business rule management system, which can function to execute business rules. Business rules are typically relatively high level statements of company policies, logic and decision making that may not, or only indirectly, relate to or incorporate contract rules. Business rules may also be used to automate user actions under contracts or by using contract data. For example, a business rule may be used to automate termination of a contract if certain conditions are met (e.g., if a supply contract is in a validly terminable state based upon its performance and a specified level of a product is displayed on a IMS system). A business rule management system may operate on top of data and events of the system but without being defined by a data-driven contract. For example, a business rule that gives a discount to large volume transactions is itself not enforceable. However, that rule likely also finds expression in a supply agreement's pricing schedule. A party can utilize business rules to define business logic that can execute in combination with execution of a data-driven contract.

Similarly workflow rules may also be automate actions in respect of contracts that are not defined in the contract themselves. For example, where a price changes in a contract or an invoice is payable under a contract due to delivery being completed, then this may be used by a user's external systems (e.g. accounting/invoicing systems) by the contract being connected to these systems unilaterally by the user, rather than being specified in the contract. One specific embodiment may involved contract output data being pushed to the event processing engine and this being pushed (e.g. via API) to external systems such as accounting systems, ERP systems, databases, and any other suitable resource/system/application.

6. Method for Constructing and Executing a Data-Driven Contract

As shown in FIG. 7A, a method for creating and executing data-driven contracts with programmable clauses can include providing a contract management platform S100 constructing a data-driven contract with a set of programmable clauses S200 and executing the data-driven contract S300.

The method can function to enable contracts to be at least partially, if not completely, autonomous or self-managing, and the method can facilitate the creation of a computationally managed data object defining a document representing dynamic contract terms and conditions. The data-driven contract of the method and more specifically, the programmable clauses can be integrated with a multitude of data sources, software applications, devices, business process management systems, BDL systems, and/or other systems. Leveraging integrations between programmable clauses and BDL systems, the method enables a contract lifecycle management solution of enabling a data-driven contract to manage a legally enforceable contract that includes integration with BDL scripts and/or other BDL applications. Additionally or alternatively, the method can enable data-driven contracts and more specifically programmable clauses to be integrated with internet connected devices and services (e.g., IoT devices, or API-based data platforms), which can enable a level of automation for operations defined through a data-driven contract and also enable dynamic state of a legally enforceable agreement managed through the data-driven contract. The method can additionally function to provide a more accessible interface for utilizing data-driven contractual agreements between a set of entities. More generally, the method can enable the customized formation and management of a data-driven contract that utilizes at least a subset of the capabilities and operations as described herein.

Block S100, which includes providing a contract management platform, functions to operate an application, service, and/or computing platform to at least partially host, manage, and/or otherwise facilitate the operations relating to a data-driven contract. Data-driven contracts are preferably constructed and/or executed through the contract management platform through S200 and S300 respectively. The contract management platform preferably offers user or programmatic interfaces for user interactions. Data-driven contracts may be dynamic and should be substantially responsive to events. Accordingly, providing a contract management platform can include continuously or periodically operating computational resources in the management of a data-driven contract.

The contract management platform can be substantially similar to the contract management platform described above. In one implementation, the contract management platform can be implemented on a cloud distributed computing platform. The contract management platform may alternatively be implemented through a hosted or local computing platform. Alternative implementations of a contract management platform may include a peer-to-peer computing infrastructure with client applications facilitating user interface interactions. As examples, the contract management platform may be hosted in a centralized fashion using HTTP or distributed fashion (e.g. using IPFS) or a combination. In preferred implementations, the contract management platform is accessible through a web application and/or a native application.

Figure 7B:
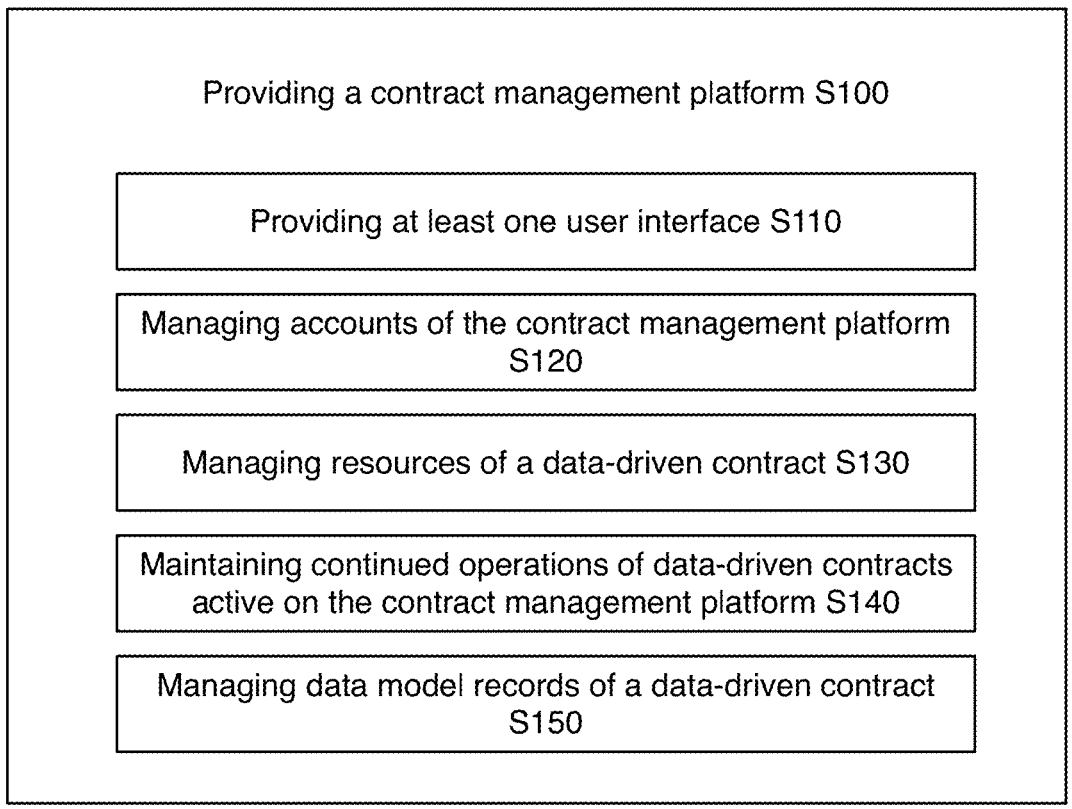

Providing a contract management platform S100 can additionally include providing at least one user interface S110 as shown in FIG. 7B. A user interface can be provided for user input or review during formation, execution, renegotiation and amendment, or termination. In particular, the contract management platform provides a contract editor interface wherein a number of interface elements are provided for constructing, editing, or otherwise configuring a data-driven contract to facilitate in Block S200. Providing such a contract editor interface can include presenting clause templates, which may include programmable clause templates as well as natural language clause templates. Providing a contract editor interface can additionally include a programmable clause editor, which can facilitate configuring programmable logic, configuring legal logic, configuring external integrations, configuring connected clause integrations, and/or setting other suitable aspects of the programmable clause. The contract editor interface can be a graphical user interface, a text editor interface, a programmatic interface, or any suitable type of interface. Providing a review interface can function to facilitate monitoring the post-formation state of a data-driven contract. This can similarly be offered as a graphical user interface or as a programmatic API. The review interface can serve as a dashboard for reviewing the state of a data-driven contract. The history of a data-driven contract and other aspects may additionally be explored. A review interface can additionally facilitate review of multiple contracts. For example, a business administrator may be able to access a review interface to see a summary of hundreds of active contracts, notifications of any changes, current state of terms, and other suitable details.

Providing a contract management platform S100 can include managing accounts of the contract management platform S120 as shown in FIG. 7B. Accounts can be personal accounts, business accounts, and/or any suitable type of account. The contract management platform is preferably multitenant in the sense that multiple independent accounts can use the platform independently such as by having individual account configurations, independent. Alternative implementations can host and operate the contract management platform as a single tenant or limited account implementation. The accounts of the contract management platform can be used by entities that interact with a data-driven contract. Accounts may be used by designers or editors (e.g., lawyers) of a data-driven contract, by developers interfacing or performing interactions with data-driven contracts, by involved parties in the data-driven contract, and/or other suitable entities.

Providing a contract management platform S100 can include managing resources of a data-driven contract S130 as shown in FIG. 7B, which functions to managing computing and data resources used in performing. As one challenge, multiple data-driven contracts will share computing resources. Managing resources of a data-driven contract can facilitate scaling and reliability of the platform for forming and executing data-driven contracts. A data-driven contract is preferably continuously or at least periodically maintained. As described herein the contract management platform may be integrated with various inputs and outputs, and Block S100 can include maintaining external programmatic interface, which may include managing data connections to network-connected devices (e.g., IoT devices, sensor networks, and/or other suitable devices) and API-enabled data platforms (e.g., web platforms for various functionality such as data logging, invoicing tools, payment tools, or any suitable type of platform).

A processing engine for processing and executing a data-driven contract is an additional resource that is managed. In one implementation, processing engine service instances can be automatically scaled according to processing load to execute active data-driven contracts. In a CEP variation, the processing engine can be a CEP engine.

The contract management platform may additionally include maintaining continued operations of data-driven contracts active on the contract management platform S140 as shown in FIG. 7B. This can include maintaining caching services, queuing services, and backup services used in ensuring that data-driven contracts operating on the contract management platform experience minimal downtime during failures or performance issues with various aspects of the system. A cache may be used as a temporary storage solution. For example, an inbound data cache may temporarily store inbound data if the data cannot be immediately processed according to a data-driven contract. A queuing service may be used in balancing load of an internal service. For example, output transactions being sent to an external blockchain may be initially queued if a rate limit to a particular BDL service is reached and dequeued to distribute tasks performed over a BDL service protocol.

Providing a contract management platform S100 can additionally include managing data model records of a data-driven contract S150 as shown in FIG. 7B. As described above, a data-driven contract may include a set of programmable clauses and optionally a set of natural language clauses. Programmable clauses can include programmable logic, legal logic, external integrations, clause integrations, and/or other components. These elements of a data-driven contract are preferably modeled, stored, and managed through various data storage solutions of the contract management platform. In addition to storing the current state, an auditable record of past state, inputs and outputs related to a data-driven contract can be managed so that the history of a data-driven contract can be fully reviewed and verified. Preferably a contract versioning system as described above and/or an event stream versioning system (either with or without various BDL implementations, e.g. to store data inputs and outputs, and perform transactions) may be employed in tracking contract history.

Providing a contract management platform can additionally include providing a dashboard of data-driven contract analytics. Analytics could be real-time. The analytics could be at a contract level or a multi-contract/enterprise level. The dashboard of data-driven contract analytics can present data, state updates, and other information relating to one or more data-driven contract.

Block S200, which includes constructing a data-driven contract with a set of programmable clauses, functions to build or customize a data-driven contract with the functionalities described herein. As described above, the data-driven contract can enable clauses to be dynamic and to interface with various services, applications, systems and/or network-connected devices, BDLs, legal references, other clauses, and/or other suitable integrations.

Constructing a data-driven contract can be achieved through a graphical user interface or a programmatic interface of the contract management platform such as those provided in block S100. Various forms of graphical user interfaces may be provided to target different types of users. In one variation, the user may be a skilled professional such as a legal expert (e.g., a lawyer) and/or a developer. Such a skilled professional may construct a highly customized data-driven contract. In other variations, partially or template data-driven contracts may provide a standard starting point with only particular aspects customized by a user. A template data-driven contract may be more approachable by a user without legal or programming skill. For example, a company set up a number of standard contracts, then a salesperson, a customer, or any suitable user can go in and set some basic properties to setup a customized data-driven contract. If this example standard contract was a standard shipping contract, it may require a user to define variables (e.g. prices, dates, quantities etc.), add authentication information or other information to integrate a shipment tracking data input for one or more programmable clauses. Likewise, template programmable clauses may be used to enable users to form contracts with data-driven or computable functionality. Template programmable clauses may be available through the contract management platform in clause libraries. Clause libraries are preferably filterable repositories of clauses; which may be in natural language or programmable form. Template programmable clauses may be added to existing contracts or used to build contracts de novo. Template programmable clauses may be configured with variables, integrations and the logic may be edited or configured. Programmable clauses may also be composed from portions of templated logic (e.g. sub-clauses). Such sub-clauses may be analogous to sentences or sentence fragments in natural language contracts.

The programmatic interface may be usable by a service, application, or a user. The programmatic interface may enable the development of specialized editing tools by various outside entities. A specialized editing tool may be developed by a particular company or user for their particular needs. In another variation, data-driven contracts may be automatically be generated by a network connected service or application.

Figure 7C:
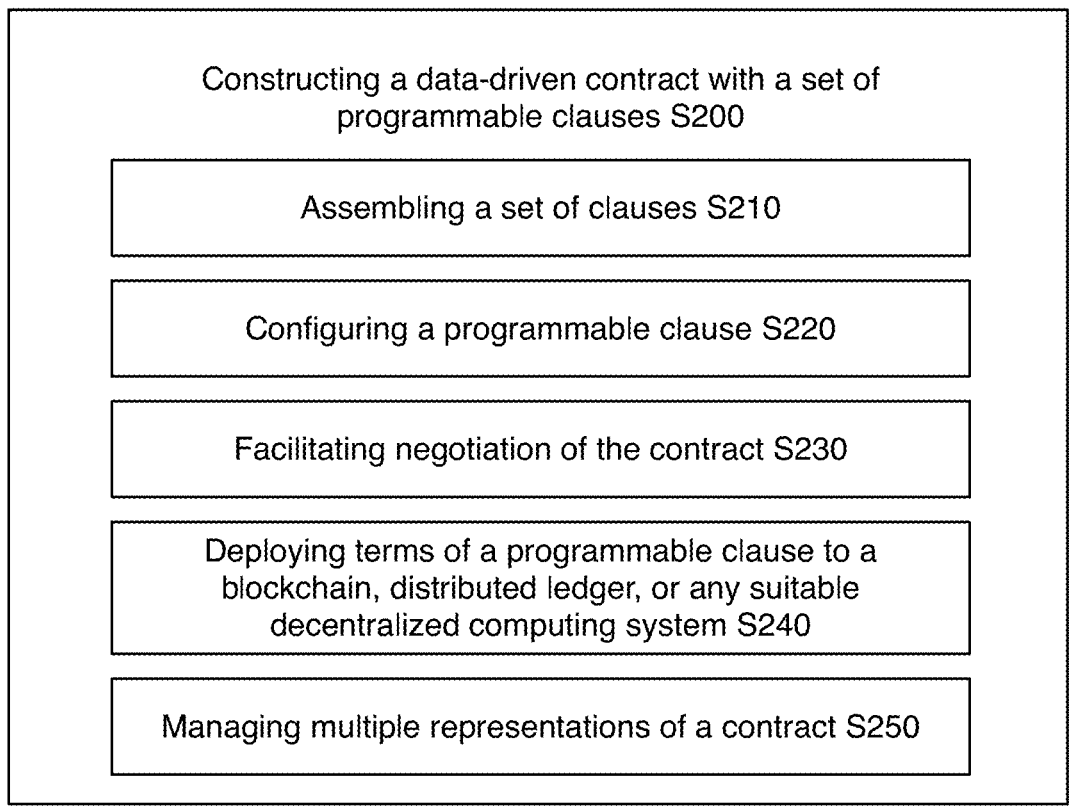

Constructing a data-driven contract preferably includes assembling a set of clauses S210 as shown in FIG. 7C. Preferably, at least a subset of the clauses are programmable clauses. Another subset of the clauses may be natural language clauses. As one example, a data-driven contract can be a data object defined document that includes a number of natural language clauses and at least one programmable clause. In another example, a data-driven contract can be a data object defined document that includes only programmable clauses. While a preferred embodiment can include distinct separation between clauses, an alternative approach may enable a data-driven contract to be constructed as self-contained document wherein functionality of programmable clauses are integrated into the body of the data-driven contract document. In such a self-contained variation, the natural language clauses and programmable clauses may be alternatively described as natural language contract content and programmable contract content. Assembling a set of clauses can include organizing and structuring the clauses so they can be ordered in a document representation. Assembly of the set of clauses will additionally include configuring a programmable clause S220. Preferably, each programmable clause will need some form of configuring. In some cases, a programmable clause template as discussed below may include preset or default configuration. Assembly of the set of clauses may additionally include specifying natural language content of a natural language clause and adding the natural language clause to the data-driven contract. However, it is generally through the configuring of a programmable clause that the dynamic/ 'self-managing', data-driven, and integration features of the data-driven contract can be established.

Figure 7D:
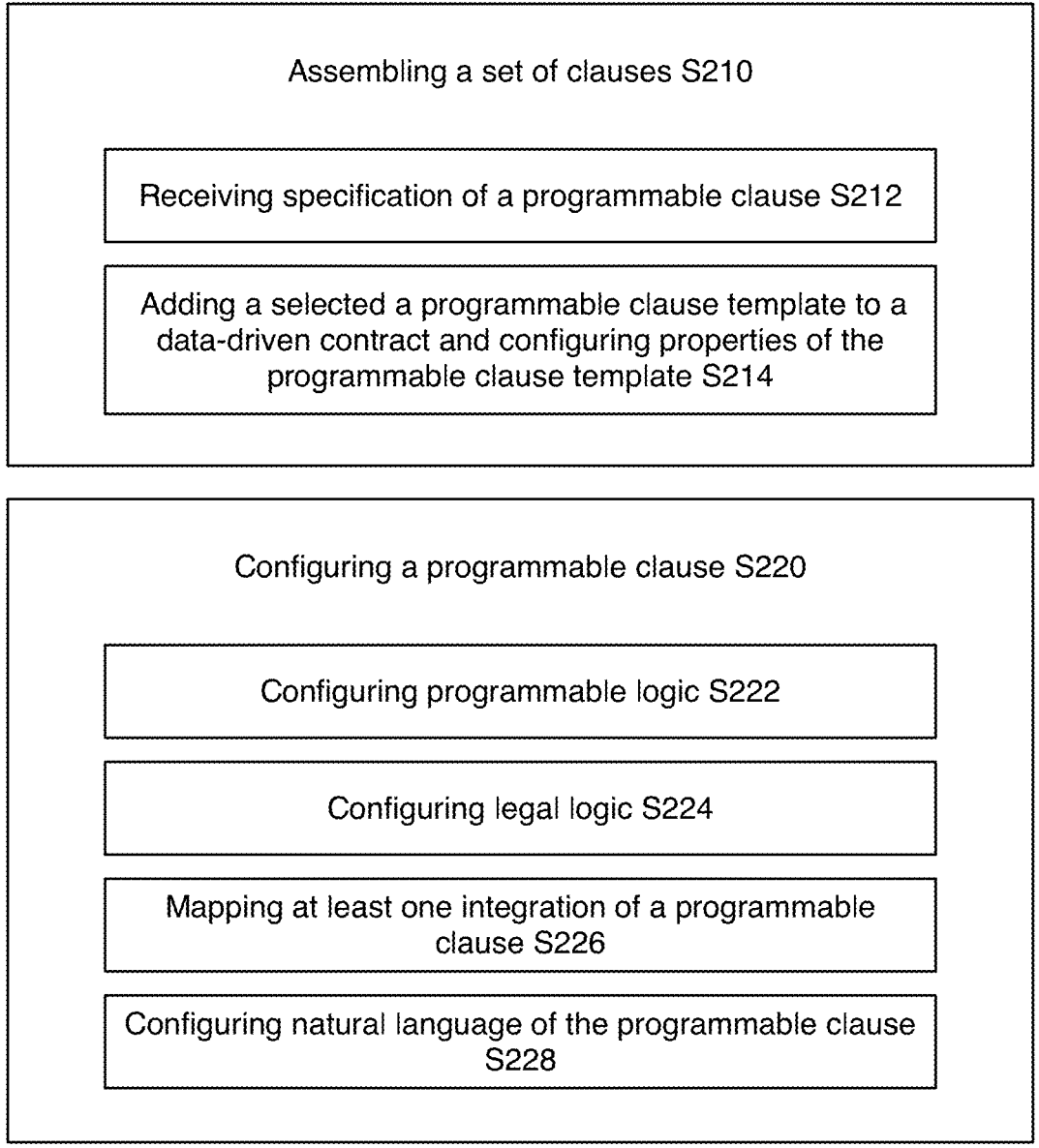

A programmable clause may be configured in a variety of approaches. Configuring a programmable clause can include receiving specification of a programmable clause S212 and/or adding a selected programmable clause template to a data-driven contract and configuring properties of the programmable clause template S214 as shown in FIG. 7D. As discussed above various mediums of interfaces may be used. Both variations, S212 and S214, may be used in configuring programmable logic, configuring legal logic, mapping at least one integration of a programmable clause, and/or enabling other potential capabilities of a programmable clause.

Block S212, which includes receiving specification of a programmable clause, functions to have functionality of a programmable clause characterized through an interpretable data representation. More generally specification will be received for a set of programmable clauses used in a data-driven contract. As discussed, programmable clauses and associated programmable logic may be written, formed, or expressed using various programming paradigms or languages. Potential programming paradigms or languages used in specifying a programmable clause can include object-oriented languages, metaprogramming, functional languages, procedural languages, declarative languages, natural language, and/or any suitable interpretable format.

Block S214, which includes adding a selected programmable clause template to a data-driven contract and configuring properties of the programmable clause template, functions to use partially configured programmable clauses to provide a framework of functionality that may be then customized for a particular instance. A library of various partially or fully configured programmable clause objects can be instantiated within the data-driven contract. In a graphical user interface, block S214 may be achieved through a drag-and-drop interface or any suitable WYSIWYG type interface. In a programmatic interface, block S214 may include receiving a programmable clause definition file, which may be uploaded, transmitted through an API, or provided in any suitable manner. A programmable clause definition file can be a script, application code, markup language document, a configuration file, and/or any suitable machine-readable data object that can be used to at least partially define aspects of a programmable clause instance. Programmable clauses can have various configurable resource interfaces and/or properties. The resource interfaces and properties may be customized through an interface.

Configuring a programmable clause may include various sub-steps depending on the functionality requirements of a particular instance of programmable clause, and may include processes such as: configuring programmable logic S222, configuring legal logic S224, mapping at least one integration of a programmable clause S226, and configuring natural language of the programmable clause S228 as shown in FIG. 7D.

Block S222, which includes configuring programmable logic, functions to define execution processes of the programmable clause. As discussed, programmable clauses and associated programmable logic may be written, formed, or expressed using various programming paradigms or languages. Potential programming paradigms or languages used in specifying a programmable clause can include object-oriented languages, metaprogramming, functional languages, procedural languages, declarative languages, natural language, and/or any suitable interpretable format. In some implementations, programmable logic may additionally be used in configuring other aspects such as contract rules, legal logic, external integrations, internal integrations, and/or other suitable aspects. Programmable logic may additionally other mechanisms may additionally be used in configuring legal logic S224. A programmable clause can additionally include natural language content that can be configured.

In addition to programmable logic, legal logic can additionally be specified. Block S224, which includes configuring legal logic, functions to enable dynamic incorporation of legal references, as aforementioned. Legal logic may be part of configured programmable logic, but may alternatively be distinct Legal logic may alternatively or additionally be applied to enabling other legal based features. In one implementation, legal references may be stored and maintained within the contract management platform, but a legal reference may alternatively be an outside resource. When the language of a legal reference changes (e.g., a regulatory limit changes), the change can be pushed or pulled from a programmable clause that includes a legal reference to that resource. In some scenarios, data or information may be extracted through the natural language of the legal reference. In other scenarios, the natural language content of a legal reference may be extracted. In other variations, it may be particular properties defined in a legal reference. For example, policies, regulation, statutes, case law or other resources specifying particular values may be incorporated and converted into a variable usable by the programmable clause.

Block S226, which includes mapping at least one integration of a programmable clause, functions to establish relationships between the programmable clause and other resources. Mapping (or "connecting") an integration of a programmable clause can include establishing input(s) and/or output(s). An input integration is preferably a channel through which outside data or communication can be received and applied in processing a programmable clause. An output integration can be a channel through which data and/or communication can be triggered from the contract management platform. Integrations are preferably used within the programmable logic. Programmable logic can be configured for updating terms or conditions of a clause. Programmable logic can be configured for performing one or more actions such as updating a resource through an output integration.

Integrations can be external integrations wherein an external integration establishes a connection with a resource outside the contract management platform. External integrations can include connections to network-connected devices (e.g., an IoT device), edge computing device, an API-based platform, BDL system, ESP/CEP system, database, and/or any suitable computing resource connected to the contract and/or contract management platform through a communication network. Connections to external data sources may be facilitated through API integrations, callback URIs, data streams, messaging/communication protocols, and/or any suitable programmatic interface. As one particular aspect, an integration can establish an input and/or output connection with one or more BDL systems. In one example, data from IoT devices may be appended to a BDL, and an external integration with the BDL can access this data as an input to a programmable clause.

An integration could alternatively be an internal integration. For example, the integration could be a contract/clause integration that connects a clause with another clause. Through contract integrations clauses may be able to extract data from other clauses (e.g., through an input contract integration) and/or update properties of another clause (e.g., an output contract integration) and/or through reference of objects common to more than one clause. Another example of an integration can be connecting a programmable clause in another contract. For example, a pricing programmable clause object can be an input to or referenced by another programmable clause. Yet another type of internal integration can be a platform integration. Some data inputs may be supplied by the party through a platform interface such as a graphical user interface (e.g., web application) or a programmatic interface (e.g., API). In this way, a party can update information or trigger actions (e.g., make function calls to a programmatic clause) that then results in a state update. For example, a shipping address of a business may be used by a pricing clause. A party could easily update the shipping address of the business in graphical user interface and the pricing clause automatically updates. A programmable clause may include any suitable number and/or combination of integrations.

Block S228, which can include configuring natural language of the programmable clause. A programmable clause may include a natural language component. In one implementation, a templating language can be used to incorporate some of the dynamic variables of the programmable clause or the data-driven contract into the content of the natural language portion of the programmable clause. A templating language can use particular syntax or tags to invoke different programmable clause features. In one variation, word processor or document editor can enable inserting or editing programmable clauses.

In one variation, block S200 can include facilitating negotiation of the contract S230. Various participants can participate in editing, approving, and/or signing off on aspects of a contract. Before a contract is finalized and ready for use, the various aspects may be approved through electronic (including cryptographic) or physical signatures and/or initialing. Facilitating negotiation of the contract can include receiving and accepting execution authorization by involved parties of the data-driven contract and formalizing the data-driven contract as a contractual agreement. As part of formalizing agreement, an electronic signature is preferably applied to a representation of the data-driven contract. As the signature is applied to a data-driven contract the defined dynamic nature and integration of the data-driven contact is similarly an agreed upon aspect. Because dynanism is agreed, the data-driven contract can show its real-time state. An electronic signature can comply with electronic signature standards of the appropriate regions and, for example, may use digital signatures as a mechanism for proof of authenticity, data integrity, and non-repudiation of the data-driven contract. More than one signature type may be used in a given implementation. For example, a cryptographic signature with a public/private key pair and e-signature may be used together to facilitate cryptographic state updates while complying with applicable e-signature regulations, laws and requirements. The electronic signature can be applied to at least one representation mode of the data-driven contract, preferably one that represents the natural language legal content and the programmable aspects of the programmable clause(s).

Negotiation and amending of a contract can additionally be facilitated after a contract has been in active use.

Since the data-driven contract may have a wide variety of conditions to consider, a contract condition simulator tool may be used in efficiently representing various scenarios. Sample inputs may be automatically generated and/or supplied by a user. For example, before a supplier agrees to a production contract, the supplier could review a set of various scenarios and how that impacts the dynamic terms of a contract.

In one variation, block S200 can include deploying terms of a programmable clause to a BDL or any suitable decentralized computing system S24o. The BDL preferably decreases or eliminates trust in a given entity with respect to the representation of transacted information. A BDL can be used to establish verifiable record of the terms, inputs to, execution, and/or state of a contract. In one implementation, at least a portion of the data-driven contract can be deployed to a BDL as a form of version control. Such versioning may be performed during creation of the data-driven contract or during execution of the contract in Block S30o. For example, tracked changes to a data-driven contract including input data, output data/transactions, state updates, and other aspects can be committed to the BDL as an immutable history. In one implementation, the State Transitioning System described above or git-based versioning may additionally or alternatively be used. Preferably, a distributed and immutable versioning system is used, but any suitable versioning of the contract state may alternatively be used.

Figures 22A, 22B:
FIGS. 22A-C are screenshot representations of exemplary graphical representations of programmable clauses.
Figure 22C:
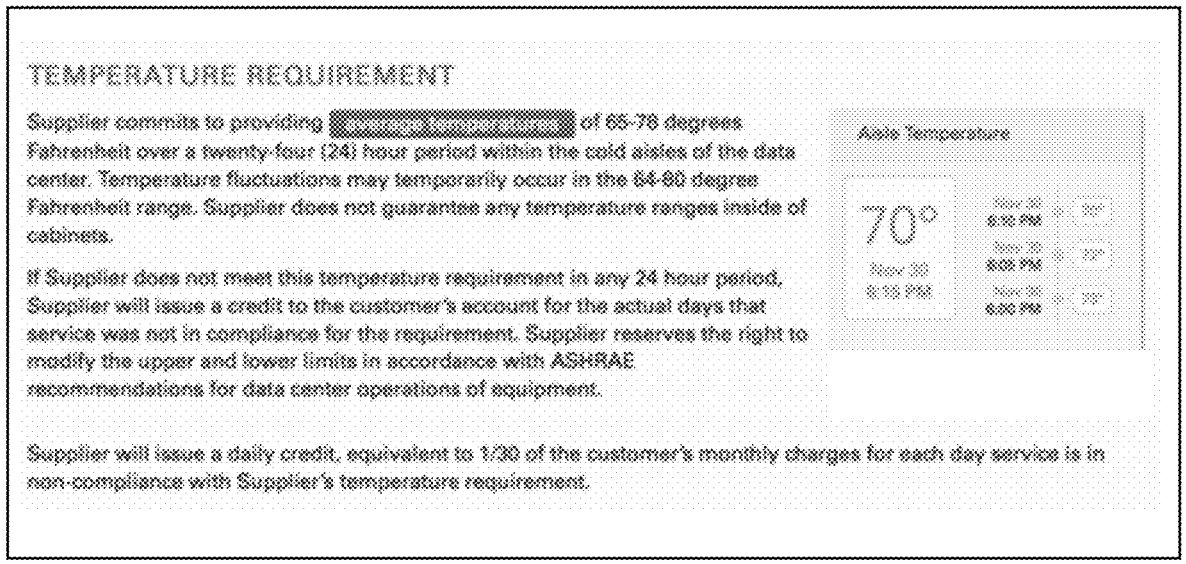

Block S200 can additionally include managing multiple representations of a contract S250. One potential benefit of the method is that various representations of a contract can be used to adjust use of the contract for various audiences. In one variation, the multiple representations can include a diagrammatic representation (e.g., a clause-block representation), a natural language representation, and/or a programmatic representation. Hybrid representations of two or more of these representations may also be used. As shown in the exemplary screenshots of clause representations FIGS. 22A, 22B, and 22C, a hybrid representation of a data-driven contract can reflect natural language content alongside data-driven content of programmable clauses. Such representation can be updated in real-time and can include content such as data analytics, infographics, data or contract history, party input controls (e.g., ability to update data, issue a state update, sign a state update), and/or other suitable elements.

Different representations of a contract may be used at different stages of constructing a data-driven contract, and different entities may use different representations depending on their objectives and role. The representations described herein are sample implementations and are not intended to limit the system and method to these implementations of representing a data-driven contract.

A diagrammatic representation is preferably a high-level visual overview of the contract. In one preferred implementation, the diagrammatic representation is a 'clause-block' representation, where clauses are visual units that can be configured and integrated. Clauses may be represented in a condensed form. The clause-block representation may be particularly useful for a non-legal and a non-technical professional wanting to understand the general terms of a contract. The clause-block representation can additionally be used in a graphical user interface for simplified graphical assembly as shown in the exemplary graphical user interface of FIG. 6.

A natural language representation can function as a legal document representation. As one potential benefit, the natural language representation may adapt, or otherwise help, the data-driven contract for use with legacy systems where they expect a static document. Dynamic elements of the contract can be represented in written form. For example, a dynamic pricing variable can be integrated into natural language content that states a pricing value, wherein the pricing value can change. In some cases, programmatic representation may be used in parts of the natural language representation. In one variation, the natural language representation can additionally be rendered as a current state representation wherein inactive contractual clause options are hidden, condensed, or otherwise minimized to emphasize the current contractual obligations. The current state can dynamically update based on the inputs of the programmable clauses. Graphics may be embedded or otherwise applied to this representation (e.g. widgets, graphs, charts, execution histories, etc.). In some variations, a natural language representation can be an editable interface representation. Programmable clause syntax rules may be used to invoke programmable clause functionality through natural language. A user can edit a substantially natural language representation of a programmable clause to define functionality. As another variation, a clause-block may be integrated into a natural language representation. Such a hybrid may enable standard legal natural language to be presented alongside more dynamic contract state that may be represented through a clause block.

A programmatic representation can function as a definitive characterization or source code of the data-driven contract. A programmatic representation can be edited to obtain a wide variety of customization freedom. A programmatic representation may be represented in a variety of formats. A programmatic representation of a data-driven contract may be specified in some parts through a scripting language or a markup language such as object-oriented languages, metaprogramming, functional languages, procedural languages, declarative languages, a domain specific language, and/or any suitable format. Parts of the programmatic representation may additionally include BDL script code to define how parts of a programmable clause may be deployed and managed on one or more BDLs. In some instances, a programmable clause may be fully characterized through a BDL script. The programmatic representation may be a single data object. In another variation, the programmatic representation can include a set of data objects that cooperatively define the data-driven contract. In one variation, it can include the representation of the contract over its entire lifetime. Additionally, the history of input and output events may be another part of the programmatic representation, which may be used to determine the state of the data-driven contract at various moments.

The method can additionally facilitate switching between representations. Edits in one representation may be applied to other representations. In another variation, one representation may link to other representations.

Figure 7E:
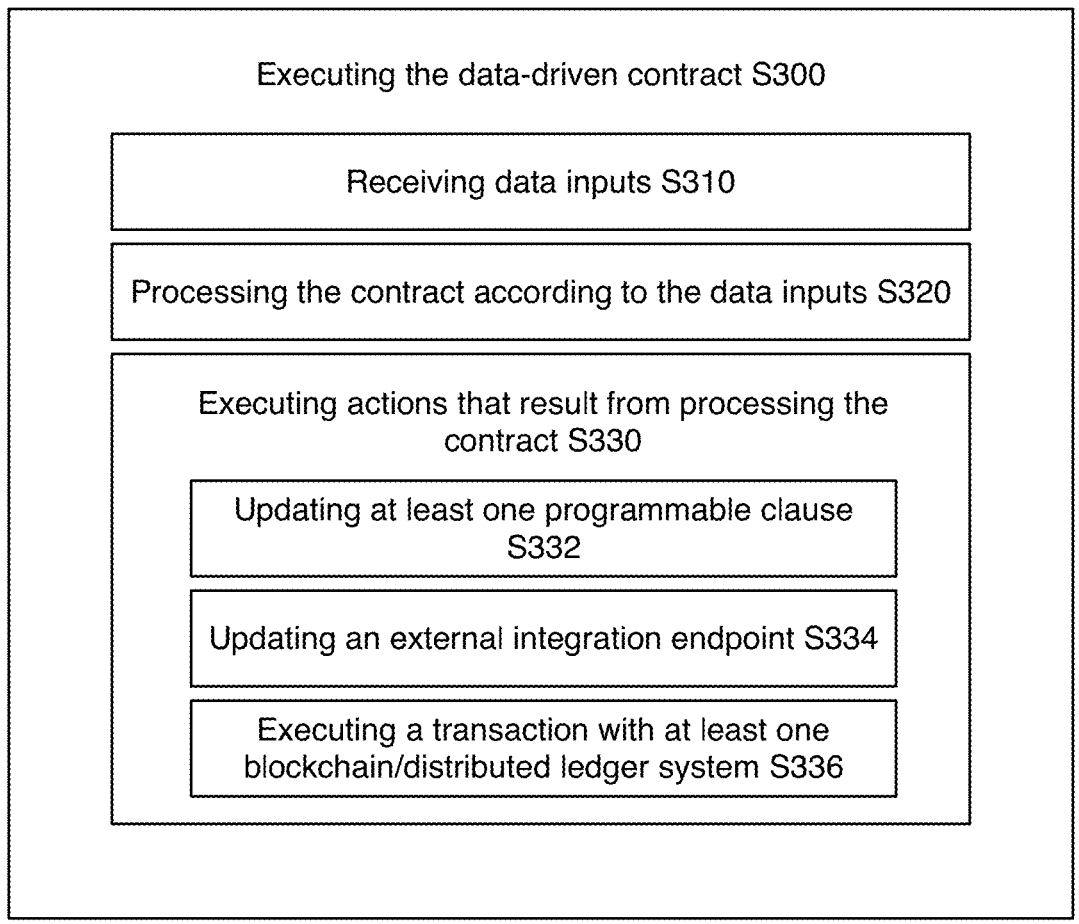

Block S300, which includes (but is not limited to) executing the data-driven contract, functions to process or enforce a data-driven contract. In one variation, executing the data-driven contract can include receiving data inputs S310, processing the contract according to the data inputs S32o, executing actions that result from processing the contract S33o as shown in FIG. 7E. In one variation, the execution of the data-driven contract is performed primarily within the platform. In another variation, part or all of the processing can be deployed for execution on a BDL. The data-driven contract may alternatively be processed within a virtual machine, within a container, in a distributed system, and/or through any suitable system.

Block S310, which includes receiving data inputs, functions to obtain data from outside sources. The data inputs are preferably configured for a programmable clause as described above. Data may be updated through polling, periodically requesting data updates form a data source. Data may alternatively be pushed or actively sent to the platform. A live data stream may also be established with the external integration, and incoming data can be received over the live data stream. Integrations (external and/or internal) can in some ways serve to act as function calls to a programmable clause. For example the receiving of a data input may be specifically configured to trigger a function call. Received data may be handled in various ways. In one variation, received data is processed immediately as it is received. In another variation, received data is logged. The data can be logged within the platform, an outside service, and/or stored through a distributed ledger. An event system may then be used to notify a processing engine that new, unprocessed data is awaiting processing. Complex event processing may be an alternative approach through which data can be received and used to determine if and when processing should occur and by which data-driven contract or programmable clause.

Block S320, which includes processing the contract according to the data inputs, functions to perform application logic as prescribed by the programmable logic. In one variation, the platform can perform the processing. In another variation, a process or transaction can be deployed to a BDL for processing in a distributed architecture approach in combination with Block S330. In yet another variation, the platform itself is hosted within a distributed computing architecture. Typically, a hybrid approach is utilized wherein a portion of processing is performed within the platform and a subset of processing tasks are deployed to a distributed computing system in the manner stated herein. As two examples, programmable logic may be defined in a procedural or declarative format.

In a variation with procedural logic, processing of the contract or at least of the procedural logic can include executing processes in a defined sequence. In one instance, procedural logic may define a state machine of logical states and transitions between those states for a programmable clause and/or other aspects of the data-driven contract.

In a variation with declarative logic, processing of the contract or at least of the declarative logic can include reasoning upon the declarative logic and determining a proper sequence of steps. Declarative logic preferably can define actions without specifying a defined sequence. Declarative logic may be defined by explicit formal statements. A logic-based programming language may be particularly well suited for declarative logic and in implementing dynamic legal contracts because the particular order of the facts and other information as they are stored in the knowledge base is not relevant due to the defeasible inference process being able to determine the proper order of contracting processes, operations, and actions.

Block S330, which includes executing actions that result from processing of the contract, functions to perform or act upon the outputs generated through processing the data-driven contract or programmable clause. Executing actions can include updating at least one programmable clause S332, updating an external integration endpoint S334, and more specifically executing a transaction with at least one BDL system S336.

Block S332, which includes updating at least one programmable clause, functions to alter the state of the data-driven contract. This can involve altering the terms or conditions that are active for the current state of the data-driven contract. For example, the current pricing may change when particular conditions are satisfied. Those conditions could be detected through external integrations with a programmable pricing clause. In one variation, a programmable clause may update its own state. In another variation, a second programmable clause may be updated based on the execution of an action by a first programmable clause. The contract management platform may additionally enable one data-driven contract to alter other data-driven contracts. In some cases updating a programmable clause can include updating a variable or metric. In another version, updating a programmable-clause can include altering natural language actively reflected in than active representation of the data-driven contract.

Block S334, which includes updating an external integration endpoint, functions to interface with other resources based on execution of the contract. As one potential distinguishing aspect, the data-driven contract can be used as a central computational resource in managing operations and contractual obligations. Other resources, systems, services, devices, and events can be driven based on the state of the contract. Updating an output can include transmitting data to another source, issuing programmatic directives, sending a notification, or performing other suitable actions. External sources may receive the information through their API, a URI callback/webhook, a data stream, a notification, or any suitable communication channel. A service, application, platform, system, device, and/or communication endpoint may be an output destination.

As described above, the method may be applied to substantially any legal contractual relationships, including managing a contract related to a supply chain. An instance of the method applied to such a supply chain contract can include the data-driven contract integrating data about the quality of goods based on data received from an IoT platform and/or edge computing devices (directly or stored on a BDL, event store/database, etc.), and/or integrating data from an analytics platform that indicates broader measures of the goods' performance, such as how they compare to previously purchased goods or those from other suppliers, other market-related conditions, and/or predictive analytics. The contract price may subsequently increase or decrease based upon the data about the quality of the goods. For example, a clause may make provision for the price may decrease if the data about quality indicates that the goods are of lower quality than indicated and/or if the goods are not performing as well as the supplier's marketplace competitors. Likewise, the current state of the warranty terms may adjust in response to the data about quality received from the performance clause. Quality data may also incorporate data relating to shipping and operational conditions such as temperature and humidity. For example, a data-driven contract can integrate with supply chain management, IoT, and/or logistics systems and services to retrieve data about shipping status and quality, such as by using the key transportation mode to obtain data about the goods' transportation mode and container type to retrieve data about the type of container used. As one example of how to integrate with an IoT platform, quality data may be integrated through an IoT platform, which can enable the integration of real-time product data to the API of the data-driven contract. Data relating to the price of the contract would output to and update an accounting API in regards to invoices, costs, and other accounting terms, terms, and statements. In one possible use case, the accounting API of an outside account platform could be used. Updated price terms may use the HTTP PUT and/or POST methods of the accounting API to send updated information to the accounting platform. The data-driven contract could also affect payment to the supplier through integration with a payment API where the contract price is an attribute of the API object that indicates the amount to be paid by the buyer based upon the state of the data-driven contract. For example, a payment API may be used to initiate a payment from the buyer to the supplier using the current contract, invoice, or purchase order price by making a payment API request to the payment API with the API request specifying the price. Payment may be initiated automatically or through user's signing the state change in the manner indicated above.

Updating of an external integration endpoint can be similarly applied to interfacing with one or more BDL. Block S336, which includes executing a transaction with at least one BDL system, functions to trigger BDL transactions or other actions on a BDL. In some cases executing a transaction can include deploying/invoking/calling/compiling a BDL script or leveraging any suitable use case of a BDL. Additionally, it can be noted that a data-driven contract and/or programmable clause can have external integrations/interface with multiple types of BDL systems. This may be used within a data-driven contract for defining cross-system interactions between BDLs that is managed by the data-driven contract.

Figure 13A:
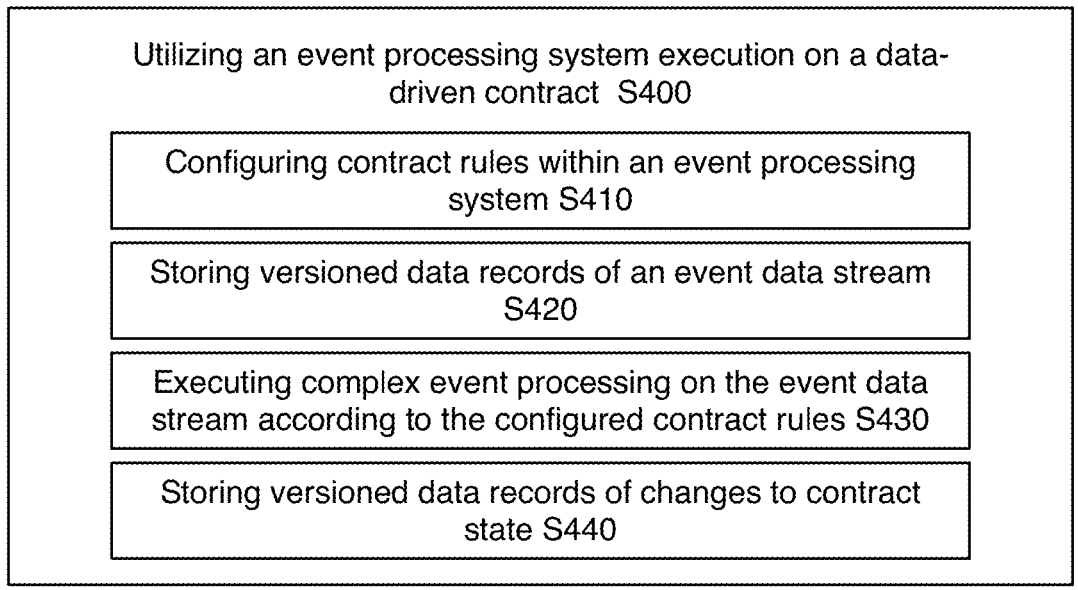
FIGS. 13A and 13B are flowchart representations of a method for utilizing an event processing system in executing a data-driven contract.
Figure 13B:
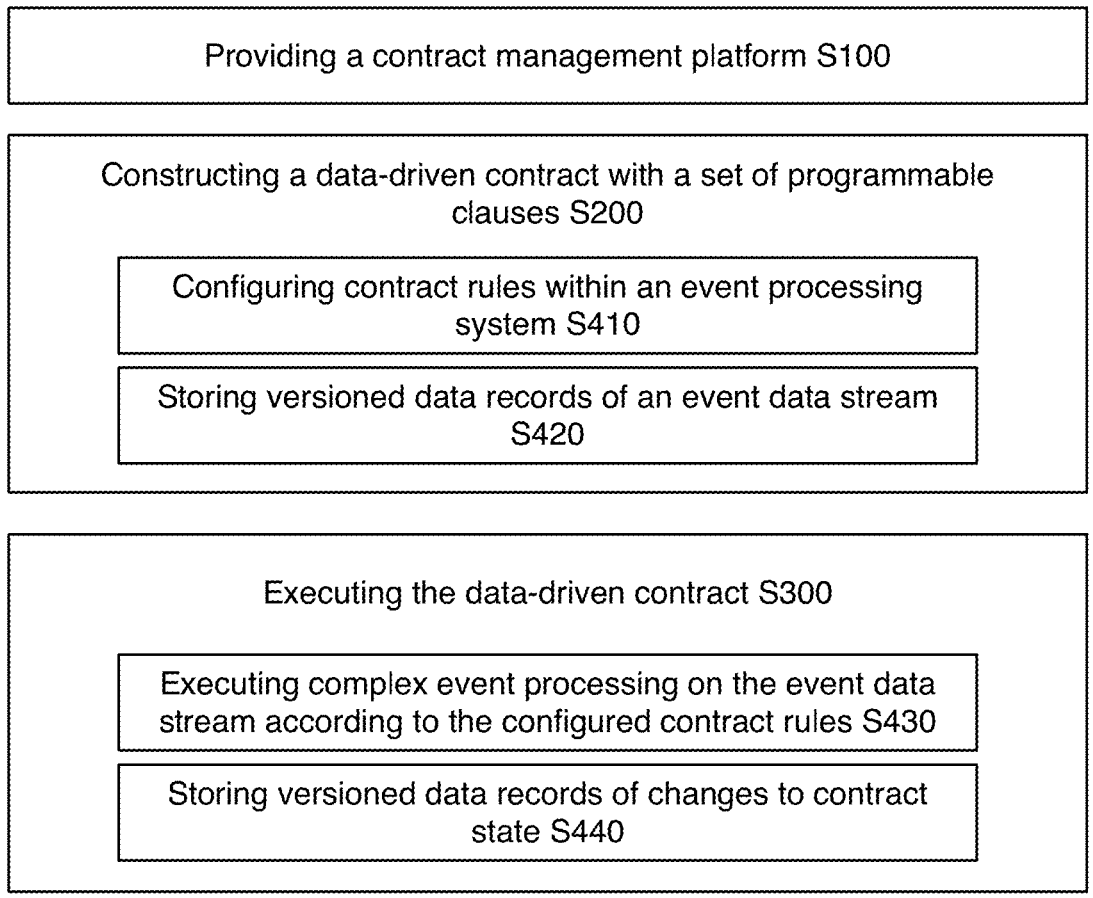

As shown in FIG. 13A, a method S400 for utilizing an event processing system for executing a data-driven contract S300 can include configuring contract rules within an event processing system S410; storing versioned data records of an event data stream S420; executing complex event processing on the event data stream according to the configured contract rules S430; storing versioned data records of changes to contract state S440. Method S400 is preferably one variation of method S300 and the processes and variations of each may be used in any combination. The methods S100, S200, and S300 are preferably implemented in combination with S400 as shown in FIG. 13B, but the method for event processing of a data-driven contract can alternatively be applied to alternative methods of creating or managing a computable contract. The method S400 is preferably implemented through a system substantially similar to the system described above and in particular the system components of an event stream versioning system, a contract state transitioning system, and an event processing engine.

Block S410, which includes configuring contract rules within an event processing system, functions to establish the logical objects used by a processing system in detecting events and triggering appropriate actions. The contract rules are preferably created or generated as part of a legal contract. More specifically, the contract rules define at least a portion of logic from a programmable clause of a data-driven contract. A domain specific language or any suitable programming language may be used. In one variation, the contract rules may define metaprogramming logic, wherein metaprogramming refers to a variety of ways a program has knowledge of itself and/or can manipulate itself, as mentioned herein. In some instances metaprogramming logic can be used to apply changes to itself in non-trivial manner. For example, metaprogramming logic can be used such that a data-driven contract can change another part of the logic of the data-driven contract. This can enable a level of flexibility to make decisions at runtime. A data-driven contract (or any suitable computable contract) can use a logic-based programming framework to state contract rules and then have a rules engine such as the event processing engine to reason upon the contractual rules in block S430 to determine the proper set of actions to perform. The reasoning can be performed according to defeasible logic/reasoning, procedural logic, and/or other forms of reasoning. Defeasible reasoning is characterized as a type of inferential reasoning that can be used to determine the proper sequence of steps to carry out in implementing a contract, including updating the terms of a programmable clause and sending data to external systems. A programmable clause written or associated with defeasible logic rule may avoid the problem of functional ordering or multi-threading, as all state-flow of the code can be defined two dimensionally. In alternative embodiments, the rules engine performing the defeasible reasoning, and/or the conclusions of its reasoning, may be executed or stored 'on' or 'off' of a BDL. In one embodiment, the rules-engine may itself be a BDL script or series of scripts that is executed and/or stored on a BDL.

Block S420, which includes storing versioned data records of an event data stream, functions to preserve a record of ingested data inputs used in updating a data-driven contract. The data inputs provided through the event data stream can alter the terms and conditions of a data-driven contract and/or result in executing actions, thus a verifiable record that can be audited and assessed by involved parties is an integral part of executing a data-driven contract. A BDL, database/event store with cryptographic record keeping functionality or other appropriate data storage mechanism may be used. The event data stream can be any suitable set of data inputs. The data rate of a data input can vary depending on the type. Versioning of the event data stream preferably creates a record tied to a particular time. Various approaches may be used storing a versioned data record, but the event stream versioning system and the contract state versioning system preferably use a DAG that includes content-addressed objects with Merkle links connecting the objects. Such a Merkle DAG approach is preferably substantially similar to the system described above. In one variation, the data input into an event processing engine can use cryptographic/'Merklized' data records. The method may additionally include filtering event data streams. Filtering of an event data stream can occur before or after being stored to a versioned data record.

Block S430, functions to execute complex event processing on the event data stream according to the configured contract rules, functions to detect conditions in the event data streams that would result in some action based on the contract rules. The contract rules may be defined using various forms of programmable logic, as stated herein. Executing complex event processing can include detecting general patterns or conditions in the event data stream. In some variations, complex algorithms may be utilized in detecting a condition. A specified action is preferably initiated upon detecting a condition of a contract rule. An action can include augmenting the terms and conditions of a programmable clause. An action could additionally or alternatively include executing an outside action such as communicating with a third party service/resource over an API. The complex event processing can operate within a virtual machine, a container computation engine, or any suitable computing environment.

Block S440, which includes storing versioned data records of changes to contract state, functions to establish a verifiable record of the state of a data-driven contract. Storing versioned data records preferably documents changes to the effective terms and conditions clauses. Storing versioned data records can additionally include documenting the metadata of inputs that triggered the change event and/or actions performed in response to a detected condition. As with the event data stream, the contract state is preferably stored using a DAG that includes Merkle links/edges between different contract state objects. A programmable clause can relate to one or more contract state objects in a Merkle DAG data structure. A version history of a data-driven contract may be updated by (a) the user signing a state update or (b) automated state updates of the data-driven contract during execution. Storing version data records may use the State Transitioning Engine described above, which can provide a cryptographically secure record of each data-driven contract, ensuring that the state of the contract is verifiable at any given point in time and that all historical changes to a contract are auditable by the parties or any interested third party.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method implemented at one or more computing systems having one or more processors and one or more non-transitory storage media, the method comprising:
   constructing, by at least one of the one or more processors, a data-driven contract by:
      assembling a set of clauses comprising a set of programmable clauses and a set of natural language clauses, wherein each programmable clause is associated with programmable logic, and wherein assembling the set of clauses comprises:
         mapping at least one integration of a plurality of integrations to a programmable clause, wherein each of the plurality of integrations is configured to integrate an external computing resource into the programmable clause; and
         adding a natural language clause; and
   executing, by the at least one processor, the data-driven contract by:
      receiving data from the external computing resource using the at least one integration mapped to the programmable clause;
      executing, by the at least one processor, programmable logic associated with the programmable clause based on the received data;
      determining a contract state based in part on a result of execution of the programmable logic, the determining the contract state including:
         continuously querying a streaming data being received in connection with the executing of the data-driven contract;
         identifying one or more sequences of events associated with the contract state in the streaming data; and
         executing one or more actions in accordance with one or more predefined rules to determine the contract state, the predefined rules being derived from the programmable logic;
      determining that the contract state is in compliance with a requirement of the data-driven contract; and
      responsive to determining that the contract state is in compliance with the requirement of the data-driven contract, cryptographically storing, by the at least one processor, the contract state as a part of a history of the data-driven contract to a blockchain.

2. The method of claim 1, wherein executing the associated programmable logic further comprises executing actions that result from the programmable logic.

3. The method of claim 2, wherein executing the actions comprises: a first programmable clause updating an external integration endpoint, a second programmable clause updating at least one programmable clause that is not the second programmable clause, and a third programmable clause executing a transaction with at least one distributed ledger system.

4. The method of claim 1, wherein the integration mapped to the programmable clause is an external integration that establishes an outside resource as an input of the programmable clause.

5. The method of claim 1, wherein a second integration mapped to the programmable clause is an external integration that establishes an outside resource as an output of the programmable clause.

6. The method of claim 4, wherein the external integration is to a network-connected device.

7. The method of claim 5, wherein the external integration establishes connection to a first external distributed ledger system.

8. The method of claim 7, further comprising mapping at least a second external integration with a second external distributed ledger system, wherein the first external distributed ledger system and the second external distributed ledger system are distinct systems.

9. The method of claim 8, further comprising configuring a distributed ledger script configured to be deployed to the first external distributed ledger system through the external integration.

10. The method of claim 1, wherein at least one integration of the plurality of integrations is an internal integration with a second programmable clause, and wherein executing the data-driven contract comprises the programmable clause updating the second programmable clause through the internal integration.

11. The method of claim 1, further comprising accepting execution authorization by at least two parties and applying an electronic signature of the two parties to the data-driven contract.

12. The method of claim 1, further comprising presenting a dashboard of analytics relating to the data-driven contract.

13. A non-transitory computer-readable medium comprising memory with instructions encoded thereon, the instructions, when executed, causing one or more processors to:
   construct a data-driven contract by:
      assembling a set of clauses comprising a set of programmable clauses and a set of natural language clauses, wherein each programmable clause is associated with programmable logic, and wherein assembling the set of clauses comprises:
         mapping at least one integration of a plurality of integrations to a programmable clause, wherein each of the plurality of integrations is configured to integrate an external computing resource into the programmable clause; and
         adding a natural language clause; and
   execute the data-driven contract by:
      receiving data from the external computing resource using the at least one integration mapped to the programmable clause;
      executing programmable logic associated with the programmable clause based on the received data;

determining a contract state based in part on a result of execution of the programmable logic, the determining the contract state including:

continuously querying a streaming data being received in connection with the executing of the data-driven contract;

identifying one or more sequencies of events associated with the contract state in the streaming data; and executing one or more actions in accordance with one or more predefined rules to determine the contract state, the predefined rules being derived from the programmable logic;

determining that the contract state is incompliance with a requirement of the data-driven contract; and responsive to determining that the contract state is in compliance with the requirement of the data-driven contract, cryptographically storing the contract state as a part of a history of the data-driven contract to a blockchain.

14. The non-transitory computer-readable medium of claim 13, wherein the instructions to execute the associated programmable logic further comprise instructions to execute actions that result from the programmable logic.

15. The non-transitory computer-readable medium of claim 14, wherein executing the actions comprises: a first programmable clause updating an external integration endpoint, a second programmable clause updating at least one programmable clause that is not the second programmable clause, and a third programmable clause executing a transaction with at least one distributed ledger system.

16. The non-transitory computer-readable medium of claim 13, wherein the integration mapped to the programmable clause is an external integration that establishes an outside resource as an input of the programmable clause.

17. The non-transitory computer-readable medium of claim 13, wherein a second integration mapped to the programmable clause is an external integration that establishes an outside resource as an output of the programmable clause.

18. The non-transitory computer-readable medium of claim 17, wherein the external integration establishes connection to a first external distributed ledger system.

19. The non-transitory computer-readable medium of claim 13, wherein an integration mapped to the programmable clause is an internal integration with a second programmable clause, and wherein the instructions to execute the data-driven contract comprise instructions to update the second programmable clause through the internal integration.

20. A system, comprising:
a memory with instructions encoded thereon;
one or more processors, that when executing the instructions, are caused to perform operations comprising:

constructing a data-driven contract by:
assembling a set of clauses comprising a set of programmable clauses and a set of natural language clauses, wherein each programmable clause is associated with programmable logic, and wherein assembling the set of clauses comprises:

mapping at least one integration of a plurality of integrations to a programmable clause, wherein each of the plurality of integrations is configured to integrate an external computing resource into the programmable clause; and adding a natural language clause; and executing the data-driven contract by:
receiving data from the external computing resource using the at least one integration mapped to the programmable clause;

executing its associated programmable logic associated with the programmable clause based on the received data;

determining a contract state based in part on a result of execution of the programmable logic, the determining the contract state including:

continuously querying a streaming data being received in connection with the executing of the data-driven contract;

identifying one or more sequencies of events associated with the contract state in the streaming data; and executing one or more actions in accordance with one or more predefined rules to determine the contract state, the predefined rules being derived from the programmable logic;

determining that the contract state is in compliance with a requirement of the data-driven contract; and responsive to determining that the contract state is in compliance with the requirement of the data-driven contract, cryptographically storing the contract state as a part of a history of the data-driven contract to a blockchain.

* * * * *